(12) United States Patent
Harmsen et al.

(10) Patent No.: US 12,283,066 B2
(45) Date of Patent: *Apr. 22, 2025

(54) SYSTEMS AND METHODS FOR DYNAMIC OBJECT TRACKING USING A SINGLE CAMERA MOUNTED ON A VEHICLE

(71) Applicant: Iris Automation, Inc., San Francisco, CA (US)

(72) Inventors: Alexander Harmsen, San Francisco, CA (US); James Howard, San Francisco, CA (US); Patricio Alejandro Galindo, San Francisco, CA (US)

(73) Assignee: Iris Automation, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,844

(22) Filed: Mar. 13, 2023

(65) Prior Publication Data

US 2023/0281850 A1 Sep. 7, 2023

Related U.S. Application Data

(63) Continuation of application No. 17/322,574, filed on May 17, 2021, now Pat. No. 11,605,175, which is a
(Continued)

(51) Int. Cl.
  *G06T 7/579* (2017.01)
  *G05D 1/00* (2006.01)
  (Continued)

(52) U.S. Cl.
  CPC ........... *G06T 7/579* (2017.01); *G05D 1/0094* (2013.01); *G05D 1/106* (2019.05); *G06F 18/22* (2023.01);
  (Continued)

(58) Field of Classification Search
  CPC ......... G06T 7/579; G06T 7/292; G06T 17/05; G06T 2207/10028; G06T 2207/30252;
  (Continued)

(56) References Cited

U.S. PATENT DOCUMENTS 5,761,326 A * 6/1998 Brady ................... G06V 10/82
                                                    382/104
6,731,819 B1   5/2004 Fukushima et al.
(Continued)

OTHER PUBLICATIONS

Andrew Nolan et al: "Obstacle mapping module for quadrotors on outdoor Search and Rescue operations", International Micro Air Vehicle Conference and Flight Competition (IMAV2013), Sep. 17, 2013 (Sep. 17, 2013), pp. 1-10, XP055360604, Toulouse, France.
(Continued)

*Primary Examiner* — Solomon G Bezuayehu
(74) *Attorney, Agent, or Firm* — Foley & Lardner LLP

(57) ABSTRACT

A self-contained, low-cost, low-weight guidance system for vehicles is provided. The guidance system can include an optical camera, a case, a processor, a connection between the processor and an on-board control system, and computer algorithms running on the processor. The guidance system can be integrated with a vehicle control system through "plug and play" functionality or a more open Software Development Kit. The computer algorithms re-create 3D structures as the vehicle travels and continuously updates a 3D model of the environment. The guidance system continuously identifies and tracks terrain, static objects, and dynamic objects through real-time camera images. The guidance system can receive inputs from the camera and the onboard control system. The guidance system can be used to assist vehicle navigation and to avoid possible collisions. The guidance system can communicate with the control system and provide navigational direction to the control system.

20 Claims, 29 Drawing Sheets

Related U.S. Application Data continuation of application No. 15/383,939, filed on Dec. 19, 2016, now Pat. No. 11,010,910.

(60) Provisional application No. 62/269,557, filed on Dec. 18, 2015, provisional application No. 62/269,625, filed on Dec. 18, 2015.

(51) Int. Cl.

| | |
|---|---|
| *G06F 18/22* | (2023.01) |
| *G06T 7/292* | (2017.01) |
| *G06T 17/05* | (2011.01) |
| *G06V 10/42* | (2022.01) |
| *G06V 10/46* | (2022.01) |
| *G06V 20/00* | (2022.01) |
| *G06V 40/20* | (2022.01) |
| *H04N 7/18* | (2006.01) |
| *H04N 13/271* | (2018.01) |
| *G08G 1/16* | (2006.01) |
| *G08G 3/02* | (2006.01) |
| *G08G 5/04* | (2006.01) |

(52) U.S. Cl.
CPC .............. *G06T 7/292* (2017.01); *G06T 17/05* (2013.01); *G06V 10/42* (2022.01); *G06V 10/462* (2022.01); *G06V 20/00* (2022.01); *G06V 40/20* (2022.01); *H04N 7/183* (2013.01); *H04N 13/271* (2018.05); *G06T 2207/10028* (2013.01); *G06T 2207/30252* (2013.01); *G08G 1/16* (2013.01); *G08G 3/02* (2013.01); *G08G 5/04* (2013.01)

(58) Field of Classification Search
CPC ...... G05D 1/0094; G05D 1/106; G06F 18/22; G06V 10/42; G06V 10/462; G06V 20/00; G06V 40/20; H04N 7/183; H04N 13/271; G08G 1/16; G08G 3/02; G08G 5/04
See application file for complete search history.

(56) References Cited

U.S. PATENT DOCUMENTS

| | | | |
|---|---|---|---|
| 9,171,464 B2 | 10/2015 | Khetan et al. | |
| 9,222,795 B1 | 12/2015 | Gerlach | |
| 9,517,767 B1 | 12/2016 | Kentley et al. | |
| 9,632,502 B1* | 4/2017 | Levinson ................. | G06N 7/01 |
| 10,204,278 B2* | 2/2019 | Silver .................. | G06F 18/2415 |
| 10,332,265 B1* | 6/2019 | Hoffmann .............. | G06V 20/64 |
| 10,444,018 B2* | 10/2019 | Miller .................... | G06F 3/012 |
| 10,445,885 B1 | 10/2019 | Nathan et al. | |
| 2002/0180870 A1* | 12/2002 | Chen ...................... | H04N 5/144 |
| | | | 348/E5.065 |
| 2005/0104964 A1* | 5/2005 | Bovyrin ................. | G06V 10/28 |
| | | | 348/143 |
| 2006/0098886 A1* | 5/2006 | De Haan .............. | H04N 19/527 |
| | | | 382/253 |
| 2007/0121998 A1* | 5/2007 | Stein ...................... | G06V 10/36 |
| | | | 382/218 |
| 2007/0153213 A1 | 7/2007 | Huang et al. | |
| 2008/0046150 A1* | 2/2008 | Breed .................. | B60R 21/0134 |
| | | | 701/45 |
| 2008/0240588 A1 | 10/2008 | Tsoupko-Sitnikov et al. | |
| 2008/0278487 A1* | 11/2008 | Gobert .................. | G06V 40/161 |
| | | | 348/E13.02 |
| 2009/0016599 A1* | 1/2009 | Eaton .................... | G06N 3/044 |
| | | | 382/159 |
| 2009/0161911 A1* | 6/2009 | Shih ........................ | G06T 7/254 |
| | | | 382/103 |
| 2009/0169067 A1* | 7/2009 | Chang .................. | G06V 40/173 |
| | | | 382/118 |
| 2009/0244291 A1* | 10/2009 | Saptharishi .......... | H04N 23/611 |
| | | | 348/222.1 |
| 2009/0245573 A1 | 10/2009 | Saptharishi et al. | |
| 2009/0257621 A1* | 10/2009 | Silver .................... | G06V 10/751 |
| | | | 382/103 |
| 2010/0027839 A1* | 2/2010 | Sikka ...................... | G06T 7/246 |
| | | | 382/103 |
| 2010/0142542 A1 | 6/2010 | Van Wie et al. | |
| 2010/0231721 A1* | 9/2010 | Meloche .................. | G06T 7/30 |
| | | | 348/143 |
| 2010/0271484 A1 | 10/2010 | Fishwick et al. | |
| 2011/0013836 A1* | 1/2011 | Gefen ..................... | G06T 7/248 |
| | | | 382/171 |
| 2011/0142283 A1* | 6/2011 | Huang .................... | G06T 7/254 |
| | | | 382/103 |
| 2011/0184605 A1 | 7/2011 | Neff | |
| 2011/0206124 A1* | 8/2011 | Morphet ................ | H04N 5/145 |
| | | | 375/E7.123 |
| 2011/0255748 A1* | 10/2011 | Komoto ................. | G06V 40/20 |
| | | | 382/103 |
| 2012/0017152 A1 | 1/2012 | Matsuda et al. | |
| 2012/0106797 A1* | 5/2012 | Wang ...................... | G06F 18/22 |
| | | | 382/103 |
| 2012/0147152 A1 | 6/2012 | Vogiatis et al. | |
| 2012/0195471 A1 | 8/2012 | Newcombe et al. | |
| 2012/0243802 A1* | 9/2012 | Fintel .................... | H04N 5/2625 |
| | | | 382/284 |
| 2012/0306734 A1* | 12/2012 | Kim ........................ | G06T 7/75 |
| | | | 345/156 |
| 2013/0050502 A1* | 2/2013 | Saito ....................... | G06T 7/20 |
| | | | 348/169 |
| 2013/0182904 A1 | 7/2013 | Zhang et al. | |
| 2013/0208948 A1* | 8/2013 | Berkovich ........... | H04N 13/204 |
| | | | 348/46 |
| 2013/0257851 A1 | 10/2013 | Lee et al. | |
| 2013/0328925 A1* | 12/2013 | Latta ...................... | G06F 3/017 |
| | | | 345/633 |
| 2014/0063005 A1 | 3/2014 | Ahn et al. | |
| 2014/0064554 A1* | 3/2014 | Coulter .................. | G06T 7/254 |
| | | | 382/294 |
| 2014/0091937 A1* | 4/2014 | Pratt ....................... | G06T 7/246 |
| | | | 340/670 |
| 2014/0132758 A1* | 5/2014 | Saptharishi ........... | G06V 20/54 |
| | | | 348/149 |
| 2014/0168461 A1* | 6/2014 | Dani ....................... | G06T 7/246 |
| | | | 348/222.1 |
| 2014/0253737 A1 | 9/2014 | Kempinski | |
| 2014/0334668 A1 | 11/2014 | Saund | |
| 2014/0363100 A1* | 12/2014 | Usikov ................... | G06T 7/579 |
| | | | 382/285 |
| 2014/0369552 A1* | 12/2014 | Sheu ...................... | G06T 7/194 |
| | | | 382/103 |
| 2015/0098645 A1 | 4/2015 | Leung | |
| 2015/0110344 A1 | 4/2015 | Okumura | |
| 2015/0146921 A1* | 5/2015 | Ono ....................... | G06V 40/10 |
| | | | 382/103 |
| 2015/0151725 A1* | 6/2015 | Clarke .................... | G01C 21/30 |
| | | | 701/28 |
| 2015/0170367 A1* | 6/2015 | Nachman ............... | G06V 20/20 |
| | | | 348/135 |
| 2015/0206313 A1* | 7/2015 | Reif ....................... | G06F 3/017 |
| | | | 382/103 |
| 2015/0219758 A1* | 8/2015 | Gammenthaler ...... | G01S 13/867 |
| | | | 342/107 |
| 2015/0298621 A1 | 10/2015 | Katoh | |
| 2015/0332463 A1 | 11/2015 | Galera et al. | |
| 2015/0348276 A1* | 12/2015 | Wang ...................... | G06T 7/11 |
| | | | 382/173 |
| 2016/0018822 A1 | 1/2016 | Nevdahs et al. | |
| 2016/0103213 A1* | 4/2016 | Ikram .................... | G01S 13/42 |
| | | | 342/105 |
| 2016/0119607 A1 | 4/2016 | Konno | |
| 2016/0165246 A1* | 6/2016 | Nagumo ............... | H04N 19/117 |
| | | | 375/240.25 |
| 2016/0171332 A1* | 6/2016 | Kawano ................. | G06T 7/215 |
| | | | 382/173 |
| 2016/0210512 A1* | 7/2016 | Madden ................ | G06V 20/52 |

(56) References Cited

U.S. PATENT DOCUMENTS

| | | | |
|---|---|---|---|
| 2016/0231746 | A1 | 8/2016 | Hazelton et al. |
| 2016/0292872 | A1 | 10/2016 | Hammond et al. |
| 2016/0335510 | A1* | 11/2016 | Gupta .................. G06V 20/58 |
| 2016/0378118 | A1* | 12/2016 | Zeng ........................ B60D 1/36 |
| | | | 701/28 |
| 2016/0379074 | A1 | 12/2016 | Nielsen et al. |
| 2017/0010618 | A1 | 1/2017 | Shashua et al. |
| 2017/0069108 | A1 | 3/2017 | Su |
| 2017/0094245 | A1 | 3/2017 | Barakat et al. |
| 2017/0124476 | A1* | 5/2017 | Levinson ............... G06V 20/58 |
| 2017/0140231 | A1* | 5/2017 | Chen .................. G06F 18/2415 |
| 2017/0225678 | A1* | 8/2017 | Bariant ................. B60W 30/06 |
| 2017/0228885 | A1* | 8/2017 | Baumgartner ....... H04N 13/204 |
| 2017/0352136 | A1* | 12/2017 | Uliyar .................... H04N 25/53 |
| 2018/0199025 | A1* | 7/2018 | Holzer .................. G05D 1/652 |
| 2018/0239955 | A1* | 8/2018 | Rodriguez ........... G06V 40/171 |
| 2019/0012761 | A1* | 1/2019 | Risinger ................... G06T 1/20 |
| 2019/0384294 | A1* | 12/2019 | Shashua ............... G06V 20/584 |
| 2020/0111231 | A1* | 4/2020 | Nathan .................. G06V 20/52 |

OTHER PUBLICATIONS

Bay, H., Tuytelaars T., Van Goo, L.: SURF: Speeded Up Robust Features. pp. 1-14(2006).

Byrne, J., Cosgrove, M., Mehra, R.: Stereo Based Obstacle Detection for Unmanned Air Vehicle. (2006) IEEE International Conference on Robotics & Automation.

Call, B., Beard, R. W., Taylor, C., and Barber, B.: Obstacle avoidance for unmanned air vehicles using image feature tracking. (2006) In Proceedings of AIAA Conference on Guidance, Navigation, and Control, Keystone, CO.

Copertari L.: Stereoscopic vision for depth perception. Unidad Académica de Ingeniería Eléctrica (2007).

Doppelmann, Hueting, Latour, van der Veen, Stereo Vision Using the OpenCV Library, Jun. 2010).

European Office Action on EP 16836214.3 DTD Nov. 26, 2020.

Farneback, G.: Two-Frame Motion Estimation Based on Polynomial Expansion. (2003).

Felzenszwalb, P., Huttenlocher, D.: Efficient Graph-Based Image Segmentation. International Journal of Computer Vision, vol. 59, No. 2, September (2004).

Final Office Action on U.S. Appl. No. 15/383,939 DTD Jan. 18, 2019.

Final Office Action on U.S. Appl. No. 15/383,939 DTD Aug. 18, 2020.

Foreign Action other than Search Report on CA DTD Dec. 11, 2023.

Foreign Action other than Search Report on CA Appl. 3008886 DTD Feb. 28, 2023.

Foreign Action other than Search Report on EP DTD Oct. 26, 2022.

Foreign Action other than Search Report on EP DTD Jul. 17, 2024.

Hartigan, J. A., Wong, M. A.: Algorithm AS 136: A K-Means Clustering Algorithm. (1979) Journal of the Royal Statistical Society, Series C 28 (1): 100-108.JSTOR 2346830.

Hirschmuller, H., et al., "Real-Time Correlation-Based Stereo Vision with Reduced Border Errors," Intl. J. of Computer Vision, 47(1/2/3):229-246 (2002).

International Preliminary Report on Patentability for PCT/US2016/067567 mailed Jun. 28, 2018.

International Search Report and Written Opinion for PCT Application No. PCT/US2016/067567 dated Jun. 21, 2017.

Lee, D., Merell, P., Wei, Z., Nelson, B.: "Two-frame Structure fromMotion Using Optical Flow Probability Distributions for Unmanned Air Vehicle Obstacle Avoidance," (2010) Journal for Machine Vision and Applications.

Lieberknecht, et al.: "RGB-D camera-based parallel tracking and meshing", Mixed and Augmented Reality (ISMAR), 2011 10th IEEE International Symposium On, IEEE, Oct. 26, 2011, pp. 147-155, XP032201445.

Marion Daniela Koelle: "Optical Flow-based Occlusion Geometries for Augmented Reality Navigation Systems", Master thesis, Jun. 14, 2013 (Jun. 14, 2013), pp. 1-130, XP055360603, Tu Monchen.

Marion Daniela Koelle: "Optical Flow-based Occlusion Geomtetries for Augmented Reality Navigation Systems", Master thesis, Jun. 14, 2013, pp. 1-130, XP055360603, Retrieved from the internet: URL: http://www.eislab.fim.uni-passau.de/files/publications/2013/thesis_koelle_compressed.pdf.

Nolan, et al., "Obstacle mapping module for quadrotors on outdoor Search and Rescue Operations", International Micro Air Vehicle Conference and Flight Competition (IMAV2013), Sep. 17, 2013, pp. 1-10, XP055360604, Toulouse, France; Retrieved from the Internet: URL: http://www.fp7-icarus.eu/sites/fp7-icarus.eu/files/publications/Obstacle mapping module for quadrotors on.pdf.

Non-Final Office Action on U.S. Appl. No. 15/383,934 DTD May 3, 2018.

Non-Final Office Action on U.S. Appl. No. 15/383,939 DTD Mar. 13, 2020.

Non-Final Office Action on U.S. Appl. No. 15/383,939 DTD Jul. 25, 2019.

Non-Final Office Action on U.S. Appl. No. 15/383,939 DTD Sep. 19, 2018.

Non-Final Office Action on U.S. Appl. No. 16/363,786 DTD Jun. 18, 2020.

Non-Final Office Action on U.S. Appl. No. 16/363,786 DTD Dec. 4, 2020.

Non-Final Office Action on U.S. Appl. No. 17/322,574 DTD Jun. 6, 2022.

Notice of Allowance on U.S. Appl. No. 15/383,934 DTD Nov. 6, 2018.

Notice of Allowance on U.S. Appl. No. 15/383,939 DTD Jan. 8, 2021.

Notice of Allowance on U.S. Appl. No. 16/363,786 DTD Mar. 31, 2021.

Notice of Allowance on U.S. Appl. No. 17/322,574 DTD Nov. 9, 2022.

Scherer, S., et al., "Flying Fat and Low Among Obstacles: Methodology and Experiments," Intl. J. of Robotics Research (2008).

Sebastian Lieberknecht et al: "RGB-D camera-based parallel tracking and meshing", Mixed and Augmented Reality (ISMAR), 2011 10th IEEE International Symposium On, IEEE, Oct. 26, 2011 (Oct. 26, 2011), pp. 147-155, XP032201445, DOI: 10.1109/ISMAR.2011. 6092380 ISBN: 978-1-4577-2183-0.

\* cited by examiner

1200

RECEIVE A SEQUENCE OF IMAGES INCLUDING A FIRST IMAGE CAPTURED AT A FIRST TIME AND A PLURALITY OF SECOND IMAGES CAPTURED AFTER THE FIRST TIME
1205

RECEIVE MOTION DATA OF A MOVABLE ENTITY
1210

TRACK MOVEMENT OF AT LEAST A SUBSET OF A FIRST PLURALITY OF PIXELS OF THE FIRST IMAGE ACROSS THE SEQUENCE OF IMAGES
1215

ESTIMATE, USING THE RECEIVED MOTION DATA, A DEPTH VALUE FOR EACH TRACKED PIXEL OF THE SUBSET OF THE FIRST PLURALITY OF PIXELS
1220

GENERATE, USING THE ESTIMATED DEPTH VALUE FOR EACH PIXEL OF THE SUBSET OF THE FIRST PLURALITY OF PIXELS, A KEYFRAME TO POPULATE A POINT CLOUD
1225

GENERATE, USING THE GENERATED KEYFRAME, A 3D WORLD MODEL OF AN ENVIRONEMNT OF THE MOVABLE ENTITY
1230

RECEIVE A SEQUENCE OF IMAGES CAPTURED BY AN IMAGE CAPTURE DEVICE MOUNTED ON A MOVABLE ENTITY
1505

IDENTIFY, ACROSS THE REMAINING IMAGES OF THE SEQUENCE OF IMAGES, PIXELS INCLUDED IN THE REMAINING IMAGES THAT HAVE PARAMETER VALUES THAT ARE STATISTICALLY SIMILAR TO THE DETERMINED PARAMETER VALUES
1510

IDENTIFY A PLURALITY OF POINTS OF INTEREST ON THE FIRST IMAGE, EACH POINT OF INTEREST OF THE PLURALITY OF POINTS OF INTEREST MAPPED TO A RESPECTIVE PIXEL OF THE FIRST PLURALITY OF PIXELS
1515

DETERMINE PARAMETER VALUES FOR THE PIXELS TO WHICH THE PLURALITY OF POINTS OF INTEREST ARE MAPPED
1520

IDENTIFY, ACROSS THE REMAINING IMAGES OF THE SEQUENCE OF IMAGES, PIXELS INCLUDED IN THE REMAINING IMAGES THAT HAVE PARAMETER VALUES THAT ARE STATISTICALLY SIMILAR TO THE DETERMINED PARAMETER VALUES
1525

TRACK, ACROSS THE REMAINING IMAGES OF THE SEQUENCE OF IMAGES, FOR EACH IDENTIFIED POINT OF INTEREST, MOVEMENT OF THE POINT OF INTEREST BY DETERMINING LOCATIONS OF THE IDENTIFIED PIXELS HAVING THE PARAMETER VALUES STATISTICALLY SIMILAR TO THE PIXEL TO WHICH THE POINT OF INTEREST IS MAPPED IN THE REMAINING IMAGES
1530

DETERMINE A CONFIDENCE SCORE OF THE POINT OF INTEREST INDICATING A LIKELIHOOD THAT THE POINT OF INTEREST REPRESENTS A MOVING OBJECT
1535

DETERMINE THAT AT LEAST ONE POINT OF INTEREST OF THE PLURALITY OF POINTS OF INTEREST REPRESENTS A MOVING OBJECT RESPONSIVE TO DETERMINING THAT THE CONFIDENCE SCORE OF THE POINT OF INTEREST SATISFIES A THRESHOLD VALUE
1540

IDENTIFY, FROM AT LEAST ONE IMAGE OF THE SEQUENCE OF IMAGES, A PLURALITY OF PIXELS THAT REPRESENT THE DYNAMIC OBJECT REPRESENTED BY THE POINT OF INTEREST
1545

IDENTIFY A PIXEL CORRESPONDING TO A DYNAMIC OBJECT BASED ON A MOVEMENT OF THE PIXEL ACROSS A PLURALITY OF IMAGES
2005

IDENTIFY, FROM THE PIXEL, A PLURALITY OF PIXELS CORRESPONDING TO THE DYNAMIC OBJECT
2010

DETERMINE VISUAL CHARACTERISTICS OF THE DYNAMIC OBJECT BASED ON THE OUTLINE DEFINED BY THE IDENTIFIED PLURALTIY OF PIXELS
2015

DETERMINE A TYPE OF THE DYNAMIC OBJECT ACCORDING TO THE VISUAL CHARACTERISTICS
2020

DETERMINE AN ABSOLUTE DISTANCE FROM THE MOVING ENTITY (VEHICLE)
2025

DETERMINE A PREVIOUS PATH OF THE DYNAMIC OBJECT BASED ON THE MOVEMENT OF THE PIXEL ACROSS THE PLURALITY OF IMAGES
2030

GENERATE, BASED ON THE TYPE OF THE DYNAMIC OBJECT, THE ABSOLUTE DISTANCE AND THE PREVIOUS PATH, A PREDICTED TRAJECTORY OF THE DYNAMIC OBJECT
2035

FIG. 20

SYSTEMS AND METHODS FOR DYNAMIC OBJECT TRACKING USING A SINGLE CAMERA MOUNTED ON A VEHICLE

RELATED APPLICATIONS

The present application is a continuation of U.S. patent application Ser. No. 17/322,574, filed May 17, 2021, which is a continuation of U.S. patent application Ser. No. 15/383,939, filed Dec. 19, 2016, which claims priority to U.S. Provisional Patent Application No. 62/269,557, filed on Dec. 18, 2015, entitled "COLLISION AVOIDANCE AND GUIDANCE SYSTEM AND DEVICE FOR UNMANNED VEHICLES" and to U.S. Provisional Patent Application No. 62/269,625, filed on Dec. 18, 2015, entitled "REAL-TIME VISUAL SITUATIONAL AWARENESS SYSTEM." The disclosures of the above-identified provisional applications are considered part of and are incorporated by reference in this patent application.

FIELD

The present disclosure relates to a system and device for collision avoidance and guidance of vehicles.

BACKGROUND

Self-driving cars are taking to the road and autonomous aircrafts are rapidly filling the skies for recreational, commercial and military purposes. The aircraft used are autonomous Unmanned Aerial Vehicles (UAVs), meaning their onboard control systems are capable of making real time decisions independently without relying on human assistance. Usually a nominal flight altitude of 50 m is sufficient to avoid collision with most static obstacles. However, there could be buildings, trees, wires, telephone poles, and terrain features that cannot be predetermined through current out-of-date maps and data provided through a route planner. This fact, compounded with the rapid increase in near (100 m) air traffic density, calls for onboard collision avoidance capabilities that enable UAVs to move around obstacles and other dynamics objects.

Current systems such as LIDAR and RADAR are used by military and large commercial or research aircraft. However, these are often too expensive for smaller UAVs and therefore there is a large and growing need for low-cost, light-weight solution.

SUMMARY

According to one aspect, a method for generating a 3D world model, includes receiving, by a computing device including one or more processors, from an image capture device mounted on a movable entity, a sequence of images including a first image captured at a first time and a plurality of second images captured after the first time, the first image of the sequence of images including a first plurality of pixels having respective parameter values, the plurality of second images each including a respective second plurality of pixels having respective parameter values. The method includes identifying, by the computing device, motion data of the movable entity. The method includes tracking, by the computing device, movement of at least a subset of the first plurality of pixels of the first image across the sequence of images. The method includes estimating, by the computing device responsive to tracking the subset of the first plurality of pixels and using the received motion data, a depth value for each pixel of the subset of the first plurality of pixels. The method also includes generating, by the computing device, using the estimated depth value for each pixel of the subset of the first plurality of pixels, a keyframe to populate a point cloud including a plurality of points, each point corresponding to a respective pixel of the subset of the first plurality of pixels.

In some implementations, the method includes generating a 3D world model using the generated keyframe. In some implementations, identifying, by the computing device, motion data of the movable entity includes receiving at least one of velocity data or acceleration data of the movable entity.

In some implementations, the method includes associating, by the computing device, to each image of the sequence of images, a respective velocity of the movable entity corresponding to a time the image was captured by the image capture device.

In some implementations, tracking, by the computing device, movement of at least a subset of the first plurality of pixels of the first image across the sequence of images includes tracking, by the computing device, movement of at least a subset of the first plurality of pixels of the first image across the sequence of images using the respective parameter value of the pixel.

In some implementations, estimating, by the computing device, a depth value for each pixel of the subset of the first plurality of pixels includes estimating the depth value for each pixel of the subset of the first plurality of pixels using at least one of velocity data or acceleration data of the movable entity. In some implementations, the method also includes publishing, by the computing device, a depth map including the estimated depth values for each pixel of the subset of the first plurality of pixels of the first image being tracked across the sequence of images, the depth map including, for each tracked pixel, absolute distance information calculated based on a distance the tracked pixel moved across the sequence of images and the velocity data of the movable entity.

In some implementations, the sequence of images includes a first sequence of images. In some implementations, the method includes receiving, by the computing device, a second sequence of images after the first sequence of images and updating the keyframe responsive to receiving each image of the second sequence of images. In some implementations, the keyframe includes a first keyframe and the method includes updating, by the computing device, the point cloud with a second keyframe, the second keyframe generated using the first keyframe and a subset of the second sequence of images captured after the first keyframe is generated.

According to one aspect, a system for generating a 3D world model includes a hardware processor and a memory coupled to the at least one processor. The system includes an image receiver configured to receive, from an image capture device mounted on a movable entity, a sequence of images including a first image captured at a first time and a plurality of second images captured after the first time, the first image of the sequence of images including a first plurality of pixels having respective parameter values, the plurality of second images each including a respective second plurality of pixels having respective parameter values. The system includes a motion data receiver configured to receive motion data of the movable entity. The system includes a pixel movement tracker configured to track movement of at least a subset of the first plurality of pixels of the first image across the sequence of images. The system includes a depth value estimator configured to estimate, responsive to the tracked subset of the first plurality of pixels and using the received motion data, a depth value for each pixel of the subset of the first plurality of pixels. The system also includes a keyframe generator configured to generate, using the estimated depth value for each pixel of the subset of the first plurality of pixels, a keyframe to populate a point cloud including a plurality of points, each point corresponding to a respective pixel of the subset of the first plurality of pixels.

In some implementations, the system includes a 3D world model generator configured to generate a 3D world model using the generated keyframe.

In some implementations, the motion data includes at least one of velocity data or acceleration data of the movable entity. In some implementations, the image receiver is configured to associate, to each image of the sequence of images, a respective velocity or acceleration of the movable entity corresponding to a time the image was captured by the image capture device. In some implementations, the pixel movement tracker is configured to track the movement of at least the subset of the first plurality of pixels of the first image across the sequence of images using the respective parameter values of the subset of the first plurality of pixels.

In some implementations, the depth value estimator is configured to estimate the depth value for each pixel of the subset of the first plurality of pixels using velocity data of the movable entity and the keyframe generator is further configured to publish a depth map including the estimated depth values for each pixel of the subset of the first plurality of pixels of the first image being tracked across the sequence of images, the depth map including, for each tracked pixel, absolute distance information calculated based on a distance the tracked pixel moved across the sequence of images and the velocity data of the movable entity, the absolute distance information between the movable entity and the dynamic object.

In some implementations, the sequence of images includes a first sequence of images and the image receiver is further configured to receive a second sequence of images after the first sequence of images and the keyframe generator is further configured to update the keyframe responsive to receiving each image of the second sequence of images.

In some implementations, the keyframe includes a first keyframe and wherein the keyframe generator is further configured to update the point cloud with a second keyframe, the second keyframe generated using the first keyframe and a subset of the second sequence of images captured after the first keyframe is generated.

According to one aspect, a computer readable storage medium including computer-executable instructions stored thereon, which when executed by a computer, causes the computer to receive, from an image capture device mounted on a movable entity, a sequence of images including a first image captured at a first time and a plurality of second images captured after the first time, the first image of the sequence of images including a first plurality of pixels having respective parameter values, the plurality of second images each including a respective second plurality of pixels having respective parameter values. The computer is further caused to receive motion data of the movable entity. The computer is further caused to track movement of at least a subset of the first plurality of pixels of the first image across the sequence of images. The computer is further caused to estimate, responsive to tracking the subset of the first plurality of pixels and using the received motion data, a depth value for each pixel of the subset of the first plurality of pixels. The computer is further caused to generate, using the estimated depth value for each pixel of the subset of the first plurality of pixels, a keyframe to populate a point cloud including a plurality of points, each point corresponding to a respective pixel of the subset of the first plurality of pixels.

In some implementations, the motion data of the movable entity includes velocity data of the movable entity. The computer readable storage medium having further computer-executable instructions stored thereon, which when executed by the computer, causes the computer to associate, to each image of the sequence of images, a respective velocity of the movable entity corresponding to a time the image was captured by the image capture device.

In some implementations, estimating a depth value for each pixel of the subset of the first plurality of pixels includes estimating the depth value for each pixel of the subset of the first plurality of pixels using velocity data of the movable entity. The computer readable storage medium having further computer-executable instructions stored thereon, which when executed by the computer, causes the computer to publish a depth map including the estimated depth values for each pixel of the subset of the first plurality of pixels of the first image being tracked across the sequence of images, the depth map including, for each tracked pixel, absolute distance information calculated based on a distance the tracked pixel moved across the sequence of images and the velocity data of the movable entity.

In some implementations, the sequence of images includes a first sequence of images. The computer readable storage medium having further computer-executable instructions stored thereon, which when executed by the computer, causes the computer to receive a second sequence of images after the first sequence of images and update the keyframe responsive to receiving each image of the second sequence of images.

According to one aspect, a method for dynamic object tracking includes receiving, by a computing device including one or more processors, a sequence of images captured by an image capture device mounted on a movable entity. The method includes identifying, by the computing device, a first image of the sequence of images including a first plurality of pixels, the first image captured by the image capture device at a first time. The method includes identifying, by the computing device using one or more image analysis techniques, a plurality of points of interest on the first image, each point of interest of the plurality of points of interest mapped to a respective pixel of the first plurality of pixels. The method includes determining, by the computing device, parameter values for the pixels to which the plurality of points of interest are mapped. The method includes identifying, by the computing device, across the remaining images of the sequence of images, using the determined parameter values for the pixels to which the plurality of points of interest identified on the first image are mapped, pixels included in the remaining images that have parameter values that are statistically similar to the determined parameter values, the identified pixels included in the remaining images representing the points of interest identified on the first image. The method includes tracking, by the computing device, across the remaining images of the sequence of images, for each identified point of interest, movement of the point of interest by determining locations of the identified pixels having the parameter values statistically similar to the pixel to which the point of interest is mapped in the remaining images. The method includes determining, by the computing device, a confidence score of the point of interest indicating a likelihood that the point of interest represents a dynamic object by comparing, for each image of at least a subset of the remaining images, a distance between a first location within the image at which the pixel representing the point of interest was expected to be located and a second location within the image at which the pixel representing the point of interest was located. The method includes determining, by the computing device, that at least one point of interest of the plurality of points of interest represents a dynamic object responsive to determining that the confidence score of the point of interest satisfies a threshold value. The method also includes identifying, by the computing device, from at least one image of the sequence of images, a plurality of pixels that represent the dynamic object represented by the point of interest.

In some implementations, the method includes identifying additional points of interest in the remaining images of the sequence of images and tracking across the remaining images, movement of the additional points of interest to identify additional dynamic objects in the sequence of images.

In some implementations, the method includes receiving, by the computing device, velocity or acceleration data of the movable entity and associating, by the computing device, to each image of the sequence of images, a velocity or acceleration at which the movable entity is moving at the time the image of the sequence of images was captured. In some implementations, determining the confidence score of the point of interest by comparing, for each image of at least a subset of the remaining images, the first location within the image at which the pixel representing the point of interest was expected to be located and the second location within the image at which the pixel representing the point of interest was located includes determining, by the computing device, the first location based on the velocity data of the movable entity.

In some implementations, identifying, by the computing device, from at least one image of the sequence of images, the plurality of pixels that represent the dynamic object represented by the point of interest includes identifying, by the computing device, a subset of pixels and their corresponding parameter values adjacent to the point of interest representing the dynamic object, tracking, by the computing device, for each of the subset of pixels, movement of the pixels across a second sequence of images received by the computing device subsequent to the first sequence of images, comparing, by the computing device, across the second sequence of images, a displacement of the subset of pixels adjacent to a point of interest to the movement of the pixel representing the point of interest and identifying, responsive to determining that the displacement of the subset of pixels is statistically similar to the movement of the pixel representing the point of interest, that the subset of pixels define a shape of the movable entity.

In some implementations, the method includes receiving, by the computing device, velocity or acceleration data of the movable entity, determining, by the computing device, a trajectory of the movable entity using the velocity data of the movable entity, determining, by the computing device, based on a trajectory of motion of the dynamic object represented by the point of interest across the sequence of images and the determined trajectory of the movable entity, that the movable entity and the dynamic object are on a collision path and transmitting, by the computing device, data to the movable entity, receipt of the data configured to cause the movable entity to alter the trajectory of the movable entity to avoid a collision with the dynamic object.

In some implementations, the method includes determining, by the computing device, that at least one point of interest of the plurality of points of interest represents a dynamic object responsive to determining that the confidence score of the point of interest satisfies a threshold value includes determining, based on the comparing, that the distance between the first location and the second location exceeds a predetermined minimum distance.

In some implementations, the at least one point of interest includes a first point of interest and the method further includes determining, by the computing device, that a second point of interest of the plurality of points of interest represents a static object responsive to determining that the confidence score of the second point of interest fails to satisfy a threshold value based on the distance between the first location and the second location repeatedly being less than the predetermined maximum distance.

According to one aspect, a system for dynamic object tracking includes a hardware processor, a memory coupled to the at least one processor, the memory storing instructions, which when executed by the processor, causes the processor to receive a sequence of images captured by an image capture device mounted on a movable entity, identify a first image of the sequence of images including a first plurality of pixels, the first image captured by the image capture device at a first time, identify, using one or more image analysis techniques, a plurality of points of interest on the first image, each point of interest of the plurality of points of interest mapped to a respective pixel of the first plurality of pixels, determine parameter values for the pixels to which the plurality of points of interest are mapped, identify, across the remaining images of the sequence of images, using the determined parameter values for the pixels to which the plurality of points of interest identified on the first image are mapped, pixels included in the remaining images that have parameter values that are statistically similar to the determined parameter values, the identified pixels included in the remaining images representing the points of interest identified on the first image, track, across the remaining images of the sequence of images, for each identified point of interest, movement of the point of interest by determining locations of the identified pixels having the parameter values statistically similar to the pixel to which the point of interest is mapped in the remaining images, determine a confidence score of the point of interest indicating a likelihood that the point of interest represents a dynamic object by comparing, for each image of at least a subset of the remaining images, a distance between a first location within the image at which the pixel representing the point of interest was expected to be located and a second location within the image at which the pixel representing the point of interest was located, determine that at least one point of interest of the plurality of points of interest represents a dynamic object responsive to determining that the confidence score of the point of interest satisfies a threshold value and identify, from at least one image of the sequence of images, a plurality of pixels that represent the dynamic object represented by the point of interest.

In some implementations, the processor is further configured to identify additional points of interest in the remaining images of the sequence of images and track, across the remaining images, movement of the additional points of interest to identify additional dynamic objects in the sequence of images.

In some implementations, the processor is further configured to receive velocity or acceleration data of the movable entity and associate, by the computing device, to each image of the sequence of images, a velocity or acceleration at which the movable entity is moving at the time the image of the sequence of images was captured.

In some implementations, to determine the confidence score of the point of interest by comparing, for each image of at least a subset of the remaining images, the first location within the image at which the pixel representing the point of interest was expected to be located and the second location within the image at which the pixel representing the point of interest was located, the processor is further configured to determine the first location based on the velocity data of the movable entity.

In some implementations, to identify, from at least one image of the sequence of images, the plurality of pixels that represent the dynamic object represented by the point of interest, the processor is further configured to identify a subset of pixels and their corresponding parameter values adjacent to the point of interest representing the dynamic object, track, for each of the subset of pixels, movement of the pixels across a second sequence of images received by the computing device subsequent to the first sequence of images, compare, across the second sequence of images, a displacement of the subset of pixels adjacent to a point of interest to the movement of the pixel representing the point of interest and identify, responsive to determining that the displacement of the subset of pixels is statistically similar to the movement of the pixel representing the point of interest, that the subset of pixels define a shape of the movable entity.

In some implementations, the processor is further configured to receive velocity or acceleration data of the movable entity, determine a trajectory of the movable entity using the velocity data of the movable entity, determine, based on a trajectory of motion of the dynamic object represented by the point of interest across the sequence of images and the determined trajectory of the dynamic object, that the movable entity and the dynamic object are on a collision path; and provide data to the movable entity, receipt of the data configured to cause the movable entity to alter the trajectory of the movable entity to avoid a collision with the dynamic object.

In some implementations, to determine that at least one point of interest of the plurality of points of interest represents a dynamic object responsive to determining that the confidence score of the point of interest satisfies a threshold value, the processor is further configured to determine, based on the comparing, that the distance between the first location and the second location exceeds a predetermined minimum distance.

In some implementations, the at least one point of interest includes a first point of interest, the method further comprising determining, by the computing device, that a second point of interest of the plurality of points of interest represents a static object responsive to determining that the confidence score of the second point of interest fails to satisfy a threshold value based on the distance between the first location and the second location repeatedly being less than the predetermined maximum distance.

According to one aspect, a computer readable storage medium including computer-executable instructions stored thereon, which when executed by a computer, causes the computer to receive a sequence of images captured by an image capture device mounted on a movable entity, identify a first image of the sequence of images including a first plurality of pixels, the first image captured by the image capture device at a first time, identify, using one or more image analysis techniques, a plurality of points of interest on the first image, each point of interest of the plurality of points of interest mapped to a respective pixel of the first plurality of pixels, determine parameter values for the pixels to which the plurality of points of interest are mapped, identify, across the remaining images of the sequence of images, using the determined parameter values for the pixels to which the plurality of points of interest identified on the first image are mapped, pixels included in the remaining images that have parameter values that are statistically similar to the determined parameter values, the identified pixels included in the remaining images representing the points of interest identified on the first image, track, across the remaining images of the sequence of images, for each identified point of interest, movement of the point of interest by determining locations of the identified pixels having the parameter values statistically similar to the pixel to which the point of interest is mapped in the remaining images, determine a confidence score of the point of interest indicating a likelihood that the point of interest represents a dynamic object by comparing, for each image of at least a subset of the remaining images, a distance between a first location within the image at which the pixel representing the point of interest was expected to be located and a second location within the image at which the pixel representing the point of interest was located, determine that at least one point of interest of the plurality of points of interest represents a dynamic object responsive to determining that the confidence score of the point of interest satisfies a threshold value and identify, from at least one image of the sequence of images, a plurality of pixels that represent the dynamic object represented by the point of interest.

In some implementations, the computer readable storage medium includes further instructions, which when executed by the computer, cause the computer to identify additional points of interest in the remaining images of the sequence of images and track, across the remaining images, movement of the additional points of interest to identify additional dynamic objects in the sequence of images.

In some implementations, the computer readable storage medium includes further instructions, which when executed by the computer, cause the computer to receive velocity or acceleration data of the movable entity and associate, by the computing device, to each image of the sequence of images, a velocity or acceleration at which the movable entity is moving at the time the image of the sequence of images was captured.

In some implementations, to determine the confidence score of the point of interest by comparing, for each image of at least a subset of the remaining images, the first location within the image at which the pixel representing the point of interest was expected to be located and the second location within the image at which the pixel representing the point of interest was located, the processor is further configured to determine the first location based on the velocity data of the movable entity.

According to one aspect, a self-contained, low-cost, low-weight guidance module for unmanned vehicles is provided. The guidance module can include an optical camera, a case, a processor, a connection between the processor and an on-board control system of the vehicle, and one or more computer algorithms running on the processor. The guidance module can be integrated with the control system of the vehicle through "plug and play" functionality or a more open Software Development Kit. The computer algorithms can be configured to cause the processor of the guidance module to re-create 3D structures as the vehicle travels and continuously update a 3D model of the environment. The guidance module is configured to continuously identify and track terrain, static objects, and dynamic objects through real-time camera images. The guidance module can receive inputs from a camera mounted on or otherwise configured to move with the vehicle and an onboard control system. The guidance module can be used to assist vehicle navigation and to avoid possible collisions. The guidance module is configured to establish one or more connections between the guidance module and the control system or an interface to the control system for sending commands directly to the control system or the interface, and providing navigational direction to the control system. In some implementations, the vehicle can be a drone, a car, a truck, a water vehicle, an aerial vehicle or any other movable entity that has a control system that can control the movement of the movable entity. In some implementations, the control system can be a flight controller or an autopilot module of the vehicle.

The guidance module is configured to recognize environments from an image stream and is able to optimize for various environmental conditions for more effective interpretation. A mapping solution is provided whereby monocular camera images are translated and correlated in 3D-space and over time to create near real-time depth maps of the environment. The guidance module can measure confidence at each tracked pixel and uses this to be able to track dynamic and static objects. Additionally, dynamic objects are identified using filtering techniques and prominent objects are tracked across consecutive frames of the image stream. From the identified dynamic and static objects, the distance and depth to each object can be calculated by the guidance module. With the calculated 3D information of each identifiable object in the environment, the guidance module can be used for applications such as collision avoidance to keep unmanned vehicles safe during operations.

Using a purely electro-optical sensing approach, a very robust understanding of the environment can be achieved. This approach allows the guidance module to be implemented at a very low monetary cost and does not require very much power as it is a passive sensing system.

According to one aspect, a device for using camera images in a guidance system includes a processor; a camera; an enclosure; and a data connection to a control system of a movable entity. The device receives camera images from the camera and processes the images to generate a 3D world model, track dynamic movement, and update a situational awareness model for communicating collision avoidance instructions to the control system.

According to one aspect, a navigation and safety tool for an unmanned vehicle includes a method for sensing and avoiding terrain, obstacles, and dynamic objects in the path of motion, and a method for navigating around obstacles to provide uninterrupted operation.

According to one aspect, a self-contained low-cost, low-weight collision avoidance module includes a continuous stream of live images, onboard processing to create real-time 3D environment maps and to locate other moving objects, an intuitive application programming interface, and a navigation solution for any unmanned vehicle.

According to one aspect, a modular design allowing ultimate system flexibility, includes an interchangeable camera module, an interchangeable processing unit, and continuously or periodically updated algorithms providing more efficient visual interpretation.

According to one aspect, a unique control system interface includes a stream of 3D point clouds, a stream of depth maps of the current frame and a continuous navigational command. In some implementations, depth maps include 2D depth information relative to a specific camera pose. In some implementations, 3D point clouds can include 3D structures generated from a single seed point at which a system, such as the guidance system, was initialized.

According to one aspect, a real-time visual situational awareness system includes a continuous stream of live images, an unsupervised scene filtering and structuring algorithm, a system to create real-time 3D static maps, a confidence measurement algorithm and dynamic object tracking for full environment perception.

According to one aspect, a unique scene filtering and structuring algorithm includes a scene recognition and quality estimator, an algorithm to extract appropriate information about the current environment, and an unsupervised machine learning technique for matching scene qualities and creating appropriate classifiers.

According to one aspect, a system for creating real-time 3D maps includes a simultaneous localization and mapping algorithm based on monocular optical flow, and confidence measurement algorithm to be able to extract uncertain areas of the depth map.

According to one aspect, a dynamic object tracker for full environment perception, comprising a blob filter algorithm, a contrast ratio filter and a kalman filter for blending direct measurements with indirect confidence measurements. In some implementations, the dynamic object tracker for full environment perception can include one or more of a point of interest indicator, a feature descriptor, a corner detector, among others. In some implementations, the dynamic object tracker for full environment perception can include an impulse response filter or infinite response filter a sensor fusion filter.

According to one aspect, a dynamic object tracker for full environment perception can include an initial position seed, a position tracking algorithm and a trajectory generation algorithm.

BRIEF DESCRIPTION OF THE DRAWINGS

Embodiments of the present disclosure will now be described, by way of example only, with reference to the attached Figures, wherein:

FIG. 12 is a flowchart depicting a method for updating a static 3D world model, according to a non-limiting embodiment;

FIG. 15 is a flowchart depicting a method for updating a dynamic object tracking model, according to a non-limiting embodiment;

FIG. 20 is a flowchart depicting a method for generating a predicted trajectory of an object, according to a non-limiting embodiment;

DETAILED DESCRIPTION

For purposes of reading the description of the various embodiments below, the following descriptions of the sections of the specification and their respective contents may be helpful:

Section A describes aspects of a guidance device and a guidance system, in accordance with some embodiments;

Section B describes a guidance device for use with control systems of a variety of different vehicles, in accordance with some embodiments;

Section C describes an overview of a situational awareness model for communicating collision avoidance instructions to a control system, in accordance with an embodiment;

Section D describes systems and methods for generating and updating a static 3D world model, according to a non-limiting embodiment, in accordance with an embodiment.

Section E describes systems and methods for dynamic object tracking using a dynamic object tracking model, in accordance with an embodiment;

Section F describes systems and methods for updating a real-time situational awareness model, in accordance with an embodiment; and Section G describes systems and methods for trajectory mapping, in accordance with an embodiment;

Section H describes systems and methods for collision avoidance, in accordance with an embodiment; and Section I describes systems and methods for mapping control signals to vehicle motion based on image data, in accordance with an embodiment; and Section J describes a computing environment which may be useful for practicing embodiments described herein.

A. Guidance Device and Guidance System

Figure 1:
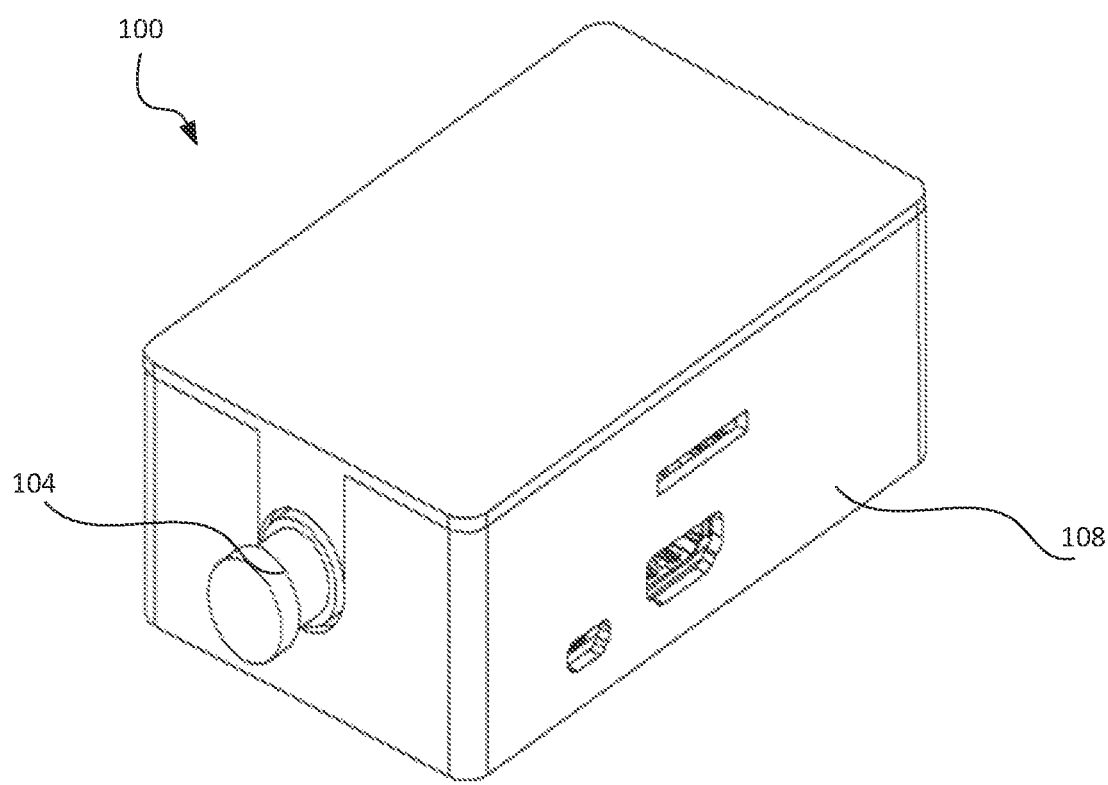
FIG. 1 depicts a perspective view of a guidance device, self-contained and enclosed, according to a non-limiting embodiment.
Figure 2:
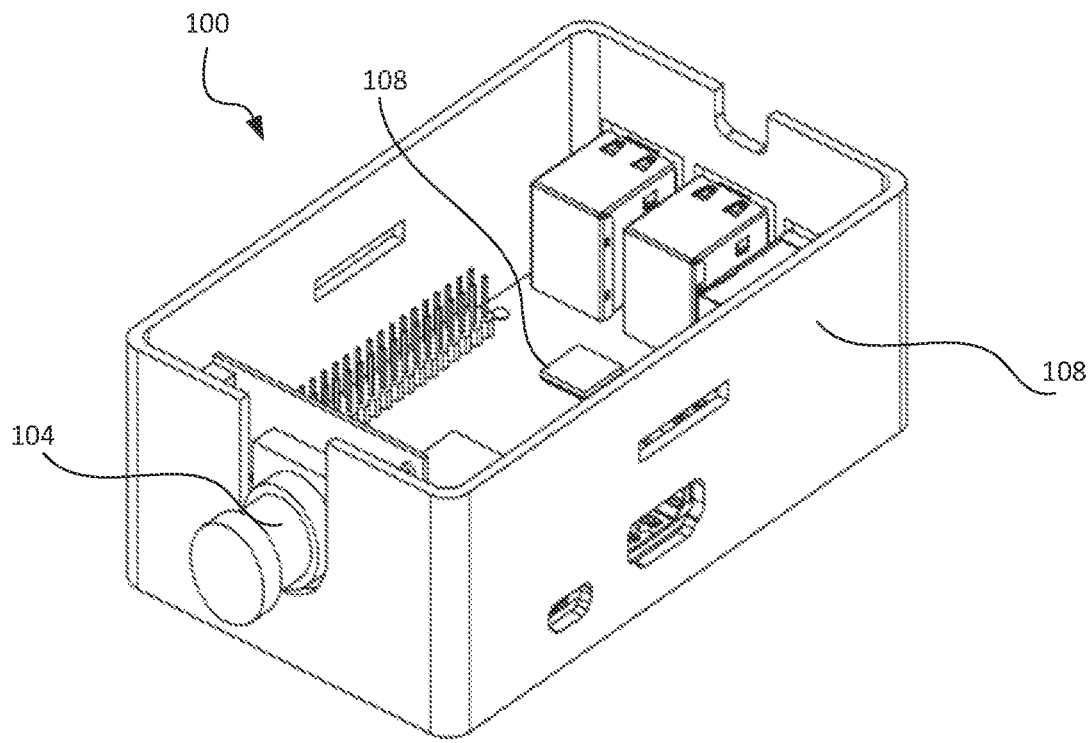
FIG. 2 depicts a perspective view of the device of FIG. 1 with case open, showing the components of the processor, according to a non-limiting embodiment.

FIG. 1 is a perspective view of a guidance device 100 according to a non-limiting embodiment. FIG. 2 depicts a perspective view of the device 100 of FIG. 1 with case open, showing the components of the processor, according to a non-limiting embodiment. The guidance device 100 comprises a processor 102, a camera 104, a connection 106 (not shown), a case or housing 108, and a mount 110 (not shown). These components allow for a self-contained, low-cost, low-weight guidance device, and also contribute to the modularity of the device, as discussed further below in FIGS. 7A and 7B. Although the guidance device 100 shows only one camera 104, in some implementations, the guidance device can include multiple cameras that can capture images that can be stitched or merged together to form a single image. In some implementations, the guidance device can include four cameras. The four cameras may be configured or arranged to capture images that can be stitched or merged together to form a 360 degree field of view. As used herein, an image is not limited to an image from a single camera, but rather, can include images captured from multiple cameras but stitched or merged together to form a single image.

The processor 102 can comprise a variety of hardware including, as non-limiting examples, an ODROID processor, a Raspberry Pi processor, a TEGRA X1 processor, a full computer, dedicated integrated circuit, FPGA or a microprocessor, and can include embedded storage, central processing unit, Random Access Memory, and other components. As a non-limiting example, the processor 102 can comprise the hardware configuration of a duo core 2 gigahertz processor and 2 GB of Random Access Memory, but it would be apparent to the person skilled in the art that other hardware configuration can suffice. In some embodiments, the processor 102 can include or be a part of a computing system, such as the computing system 2100 described below with respect to FIGS. 24A and 24B.

The processor 102 is configured to work in conjunction with camera 104 for collecting images. As a non-limiting example, the camera 104 can have a resolution of 5 megapixels, but it would be apparent to the person skilled in the art that other camera resolutions can suffice.

The connection 106 can comprise a serial connection. As a non-limiting example, the connection 106 can comprise an RX-TX serial connection or a Bluetooth serial connection, but it would be apparent to the person skilled in the art that another form of communication can suffice. In some embodiments, the connection can include any connection suitable to allow data to be communicated between the processor 102 and the camera 104 and can include one or more connections, such as those described in relation to the computing system 2300 described below with respect to FIGS. 24A and 24B. In some implementations, a universal asynchronous receiver/transmitter (UART) or a Controller Area Network (CAN) bus controller can connect to the control system of the vehicle and can send and receive data and instructions to and from the guidance device 100.

In some implementations, the guidance device can include one or more sensors that can be used to provide input data to the guidance device 100. In some implementations, the guidance device 100 can include an accelerometer for providing accelerometer data to the guidance device. In some implementations, the accelerometer data can be used to verify the acceleration data received from the control system of the vehicle. In some implementations, the accelerometer data can be used as the input data instead of the acceleration data received from the vehicle. In some implementations, the guidance device can include a gyroscope to determine position and/or orientation data of the vehicle. In some implementations, the guidance device can also include other types of sensors, for example, a sensor that can determine wind speed, which can be used as an input for determining route guidance and for estimating trajectories of the vehicle itself as well as dynamic objects identified in the view of the camera The limited number and size of components necessary contributes to the low cost and low weight feature of the device 100, which allows the device to be mass produced economically.

Figure 3:
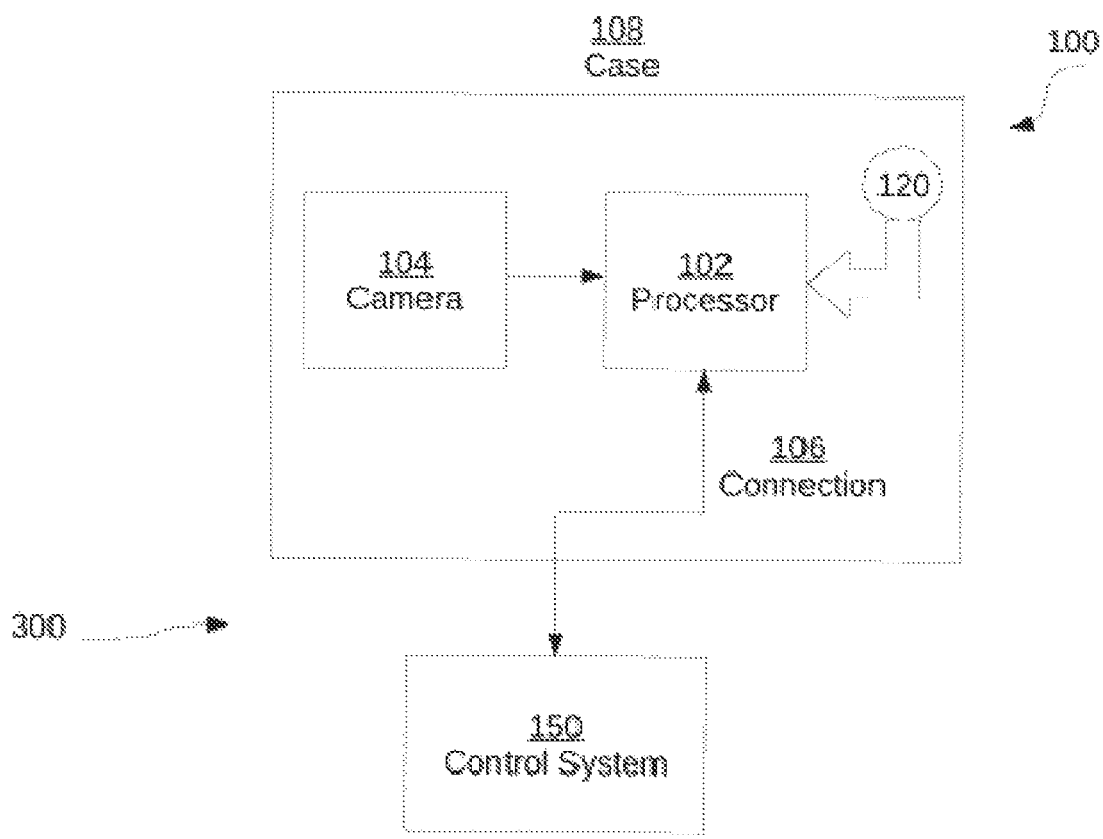
FIG. 3 is a schematic diagram of the components of a guidance system including the guidance device of FIG. 1, according to a non-limiting embodiment.

FIG. 3 is a schematic diagram of the components of a guidance system 300, according to a non-limiting embodiment. The guidance system 300 comprises the guidance device 100 of FIG. 1, and each of its components, and a control system 150 onboard an unmanned vehicle, for example, the vehicle shown in FIG. 4. In some implementations, the guidance system may not include a control system of a vehicle, but rather, may include an interface to communicate with a control system of a vehicle.

The processor 102 is loaded with software 120, which when executed on or by the processor 102, can cause the processor to perform the computer algorithms for updating the situational awareness model. The software 120 can include Simultaneous Localization and Mapping (SLAM) algorithms to create 3D depth maps of the environment in real-time. These depth maps are used to be able to determine possible collisions with the terrain or static obstacles in the path of the vehicle. The software can also include a dynamic tracking algorithm to track dynamic objects and fuse them into the environmental representation, as will be discussed with reference to FIGS. 13-16 below. This software is able to operate in different environments through a classification, filtering and matching step to be able to eliminate glare, lighting changes and other unstructured elements, allowing indoor and outdoor operation. This classification step can include an unsupervised machine learning algorithm that is trained on a set of unstructured environments.

The guidance device 100 being separate from the control system 150 allows the guidance system 300 to act as an emergency stop, safety system and navigational redundancy as the unmanned vehicle travels unaided through the world. The guidance device 100 outputs a stream of suggested navigation commands, coded to be interpreted by the control system 150. For example: "stop and hover", "navigate left 30 degrees", "slow down and make a 90 degree right turn and proceed". In some implementations, the guidance device can output other types of commands that can alter the trajectory of the vehicle without influencing the control system itself. For instance, the command can include deploying a parachute or activating some other device. In some implementations, the guidance device may send other types of commands, such as a message to the ground station/operator, an audible warning or a visual indicator that can indicate a potential collision. This navigation around obstacles can, in some implementations, be determined through visual servoing and extrapolation of the current vehicle position within the 3D environment map. The guidance device 100 being separate from the control system 150 allows for the independent verification of vehicle motion paths for increased safety and navigational accuracy. It should be appreciated that the guidance device 100 can be integral to the vehicle and the control system of the vehicle but still serve as a way to provide independent verification of the vehicle motion paths.

In one embodiment, the control system 150 can be an autopilot system associated with the unmanned vehicle. In another embodiment, the control system 150 can be an external middle layer between the guidance device 100 and the autopilot system of the unmanned vehicle. The middle layer may include an intermediate board or layer (for example, a processor or computer), which interprets the 3D depth maps in real-time and then further communicates the instructions to the autopilot. To facilitate the interpretation of the external middle layer, the module has an open Software Development Kit (SDK) and Application Programming Interface (API) which allows any programmer to interface with the operations of the perception module and have greater control over the navigation and information coming from the system. The API may be a part of the SDK but in some implementations, the SDK and the API may be independent.

The inputs from the connection 106 to the guidance device 100 can include velocity information from the control system 150 and camera images. In some embodiments, the inputs can include position data, acceleration data, or any other type of data that may be used to determine, derive or otherwise identify velocity information of the vehicle to which the guidance device is connected. The connection 106 can also be used to send navigation commands to the control system 150. In one embodiment, a cognitive flight executive onboard the unmanned vehicle makes the decision about how to respond to the information from the guidance device 100. In another embodiment, the guidance device 100 makes the decision. The processor 102 is sufficient to make navigation decisions in real-time given the navigation speed of the unmanned vehicle. In some embodiments, the guidance device 100 is on and active the entire time the unmanned vehicle is in motion.

The device 100 can be configured to be "plug and play" compatible with a control system 150 for ease of interchangeability between aerial, space, ground-based unmanned vehicles, water-based unmanned vehicles, amphibious vehicles, among others.

Figure 4:
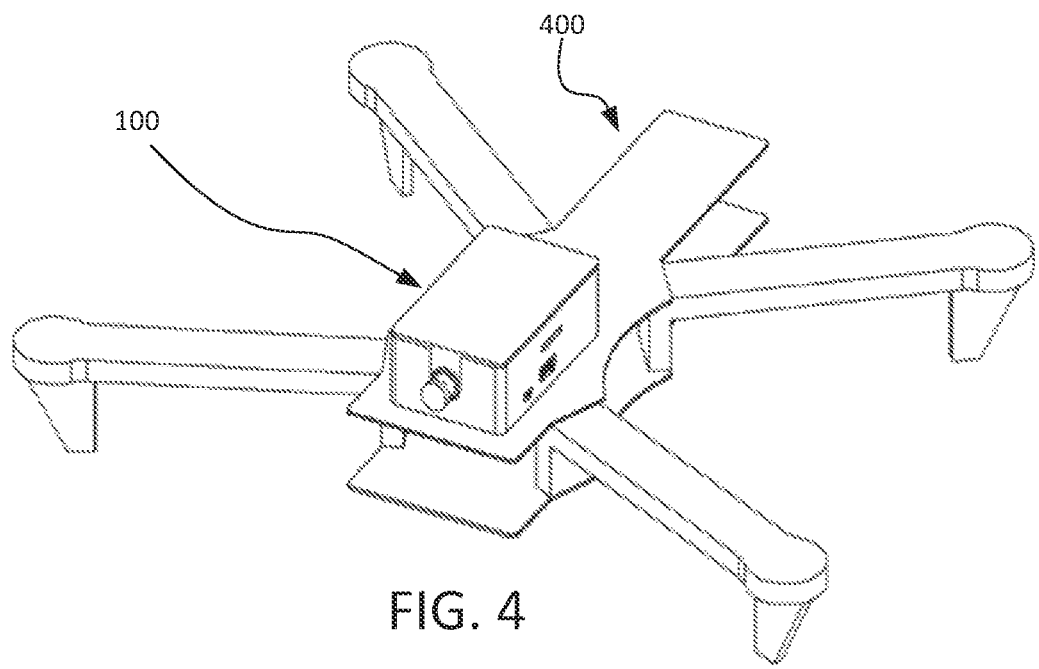
FIG. 4 depicts a perspective view of the device of FIG. 1 mounted on an unmanned vehicle, according to a non-limiting embodiment.

FIG. 4 depicts a perspective view of the device 100 mounted on an unmanned vehicle 400, according to a non-limiting embodiment. In the example embodiment shown, the unmanned vehicle is an unmanned aerial vehicle with a mount 110 (not shown). It should be appreciated that the guidance device 100 can be used in conjunction with any movable entity, for example, any vehicle or object whose motion can be controlled. In some embodiments, the vehicle can be a land based vehicle, such as a car, a truck, a van, a motorcycle, among others. In some embodiments, the vehicle can be an aerial vehicle, such as an aircraft, a helicopter, an aerial drone, among others. In some embodiments, the vehicle can be a manned vehicle. In some embodiments, the vehicle can be an unmanned vehicle.

Figure 5:
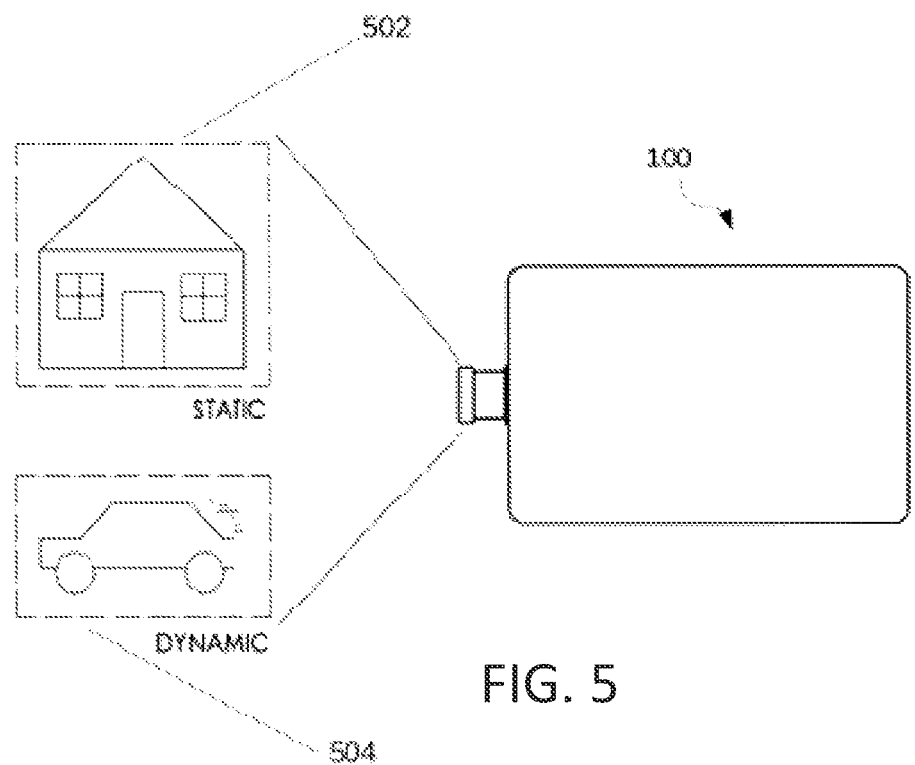
FIG. 5 is a schematic diagram of the device in FIG. 1 in an environment for 3D mapping terrain and objects, according to a non-limiting embodiment.

FIG. 5 is a schematic diagram of the device 100 in an environment for 3D mapping terrain and objects, according to a non-limiting embodiment. The device 100 is capable of recognizing that the static object 502 is static and that the dynamic object 504 is moving, as explained in greater detailed with reference to at least FIGS. 13-16 below.

Figure 6:
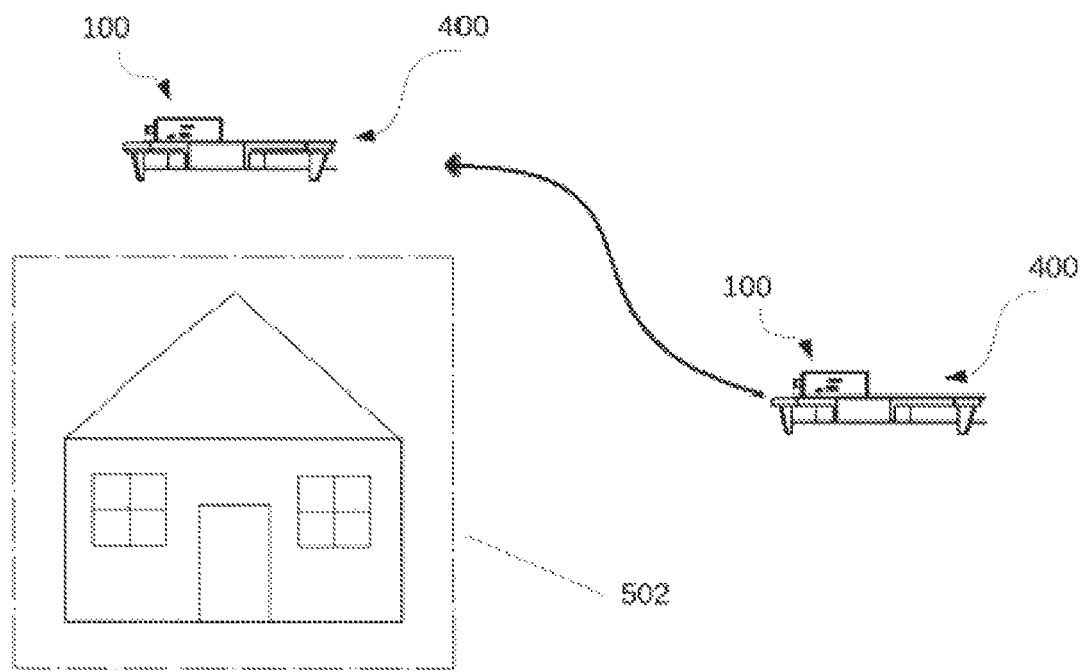
FIG. 6 is a schematic diagram of the device in FIG. 1 in an environment performing an avoidance maneuver, according to a non-limiting embodiment.

FIG. 6 is a schematic diagram of the device 100 mounted on an unmanned vehicle 400 in an environment performing an avoidance maneuver, according to a non-limiting embodiment. The device 100 is shown maneuvering around an object 502 after determining the relative trajectories of the device 100 and the unmanned vehicle 400, as explained in greater detailed below.

Figure 7A:
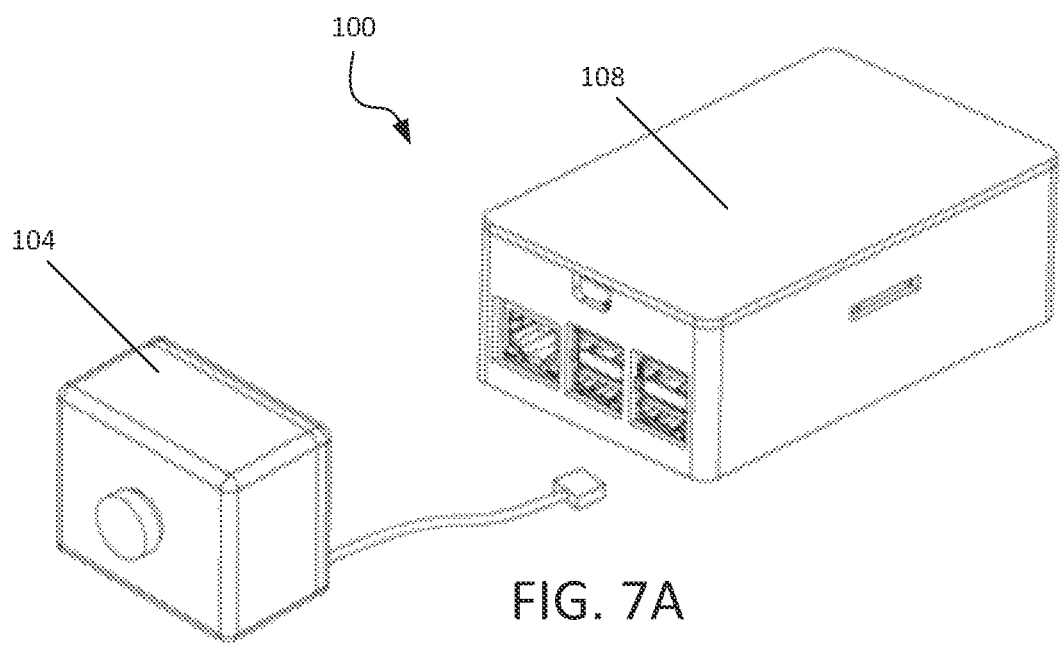
FIG. 7A is a perspective view of the device in FIG. 1 demonstrating the modularity of the system, according to a non-limiting embodiment.
Figure 7B:
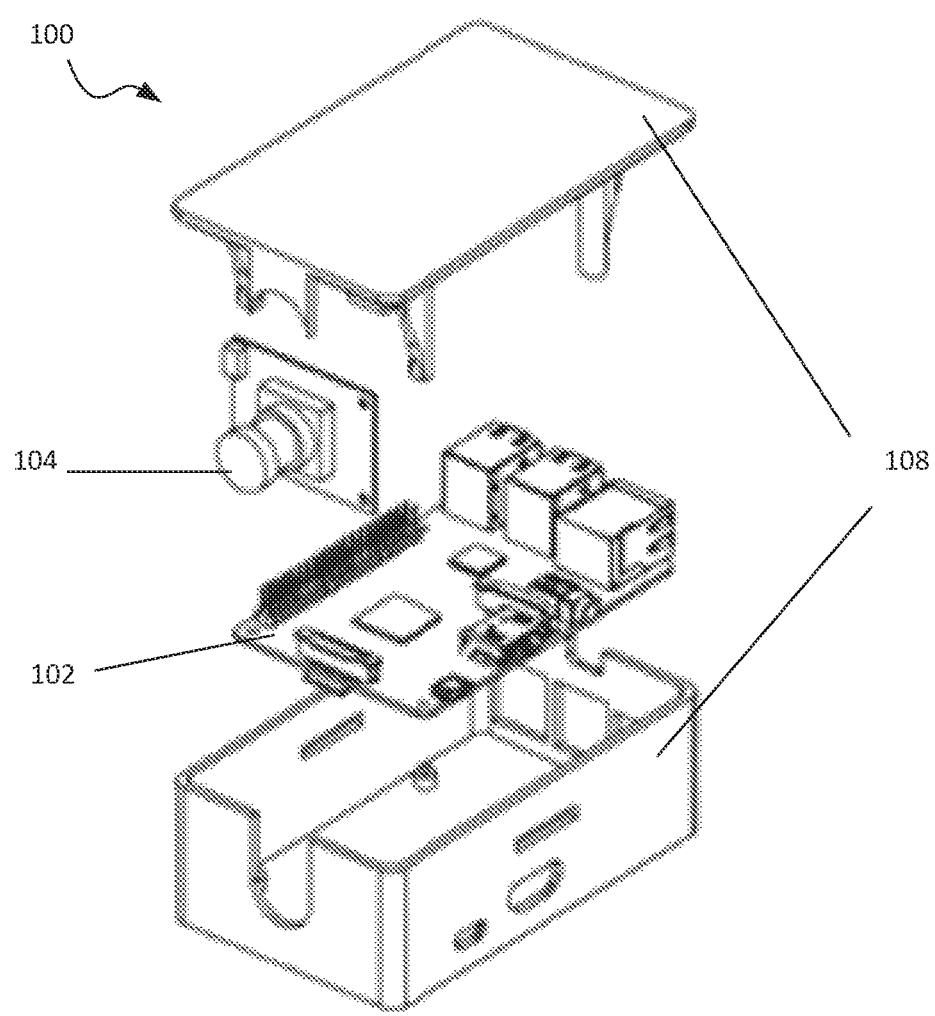
FIG. 7B is a perspective exploded view of the device shown in FIG. 7A demonstrating the modularity of the system, according to a non-limiting embodiment.

B. Modular Guidance System for Use with Control Systems of a Variety of Different Vehicles FIG. 7A is a perspective view of the device in FIG. 1 demonstrating the modularity of the system, according to a non-limiting embodiment. FIG. 7B is a perspective exploded view of the device shown in FIG. 7A. The processor 102, camera 104, connection 106 (not shown) and case 108 can be replaced, and any necessary software modifications can be made in order to interface with the control system 150 (not shown). The case 108 can be arranged to better integrate into a particular unmanned vehicle.

Additional components can be added to the device 100, including additional graphics processors, cooling systems, Integrated Circuits, FPGAs, GPS or an upgraded processor or camera (additional components not shown).

As will be described below, the guidance device can be deployed on a wide variety of vehicles. In some implementations, the guidance device can be configured to interface with one or more systems of the vehicle on which the guidance device is to be deployed. The systems can include a control system of the vehicle through which the guidance device can receive data as well as transmit instructions to initiate particular actions on the vehicle. In some implementations, the guidance device can be configured to receive control signals from the control system.

In some implementations, the control system of the vehicle can communicate with the guidance device via one or more interfaces. In some implementations, a universal asynchronous receiver/transmitter (UART) or a Controller Area Network (CAN) bus controller can connect to the control system of the vehicle and can send and receive data and instructions to and from the guidance device 100. The data can include accelerometer readings, gyroscope readings, heading information, speed, velocity or acceleration information, GPS position information, among others. In some implementations, the data can include a waypoint list indicating a trajectory of the vehicle, mode information and high level state information of the vehicle.

In some implementations, the guidance device, via the visual situational awareness system (shown in FIG. 8), can make specific API calls to communicate with the control system. In some implementations, the control system can push the information to the visual situational awareness system automatically or responsive to establishing a communication protocol between the visual situational awareness system and the control system of the vehicle. In some implementations, the visual situational awareness system can establish hooks into the control system to give and receive specific commands, instructions, requests, or responses. In some implementations, the control system can establish hooks into the visual situational awareness system to give and receive specific commands, instructions, requests, or responses.

Although various embodiments described herein refer to the guidance device as being a plug-and-play device that is compatible with a variety of different vehicles, the present disclosure is not limited to such embodiments. The present disclosure also contemplates a vehicle system that integrates one or more components or portions of the guidance device in one or more other subsystems of the vehicle system. In some implementations, a vehicle can utilize the guidance device to facilitate and effectuate changes in the trajectory of the vehicle, either by sending commands to a control system, or by providing the guidance device direct access to control a drive system of the vehicle. Other combinations or variations of the integration of the guidance device with other components of the vehicle are possible and contemplated.

Figure 8:
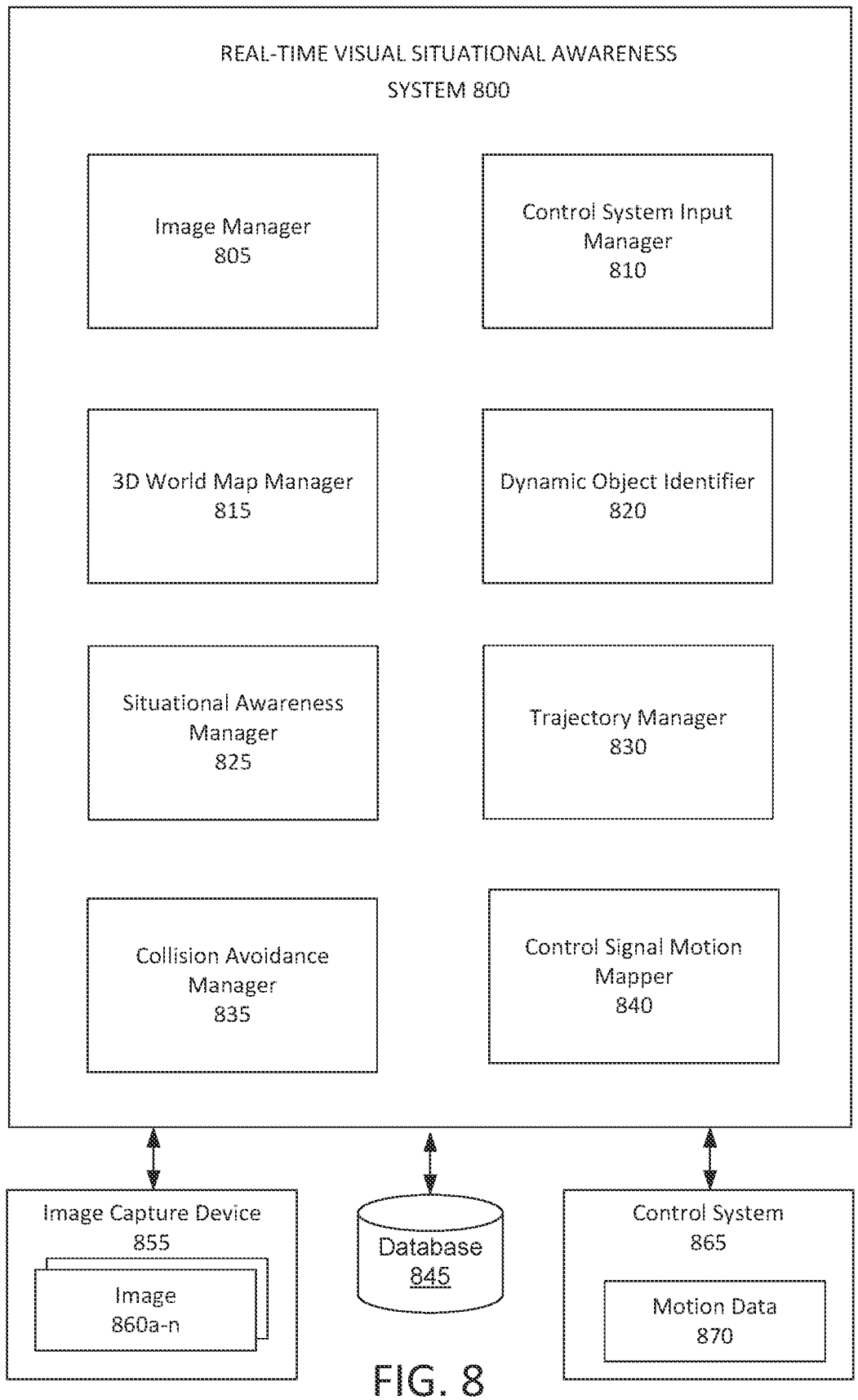
FIG. 8 is a block diagram illustrating components of a real time visual situational awareness system, according to a non-limiting embodiment.

C. Overview of a Situational Awareness Model for Communicating Collision Avoidance Instructions to a Control System FIG. 8 is a block diagram showing a real-time visual situational awareness system 800 configured to communicate with one or more image capture devices 855 and a control system 860 of a movable entity, such as a vehicle. The real-time visual situational awareness system 800 can include one or more of an image manager 805, a control system input manager 810, a 3D world map manager 815, a dynamic object tracker 820, a situational awareness manager 825, a trajectory manager 830, a collision avoidance manager 835 and a control signal motion mapper 840. The real-time visual situational awareness system 800 can be executed on a processor onboard a vehicle. In some implementations, the real-time visual situational awareness system 800 can be the software 120 loaded on the processor 102 described with respect to FIGS. 1-5. The image manager 805, the control system input manager 810, the 3D world map manager 815, the dynamic object tracker 820, the situational awareness manager 825, the trajectory manager 830, the collision avoidance manager 835 and the control signal motion mapper 840 can include or execute at least one computer program or at least one script. The image manager 805, the control system input manager 810, the 3D world map manager 815, the dynamic object tracker 820, the situational awareness manager 825, the trajectory manager 830, the collision avoidance manager 835 and the control signal motion mapper 840 can each be separate components, a single component, or part of another system. In some implementations, the image manager 805, the control system input manager 810, the 3D world map manager 815, the dynamic object tracker 820, the situational awareness manager 825, the trajectory manager 830, the collision avoidance manager 835 and the control signal motion mapper 840 can include combinations of software and hardware, such as one or more processors configured to execute one or more scripts.

The real-time visual situational awareness system 800 can also include one or more content repositories or databases 845. The databases 845 can be local to the real-time visual situational awareness system 800. In some implementations, the databases 845 can be remote to the real-time visual situational awareness system 800 but can communicate with the visual situational awareness system 800 via a network. The databases 845 can include images, keyframes, pixel data, pre-stored settings, historical motion related information of the movable entity, among others, to facilitate the functionality of the real-time visual situational awareness system 800.

In some implementations, the one or more image capture devices 855 can include a camera, such as the camera 104 shown with respect to FIGS. 1-5. The image capture device 855 can be mounted on a movable entity. The real-time visual situational awareness system 800 can include or otherwise communicate with multiple image capture devices that can capture images that can be stitched or merged together to form a single image. In some implementations, the real-time visual situational awareness system 800 can include or otherwise communicate with two, three, four, five, six or more than six cameras. The multiple cameras may be configured or arranged to capture images that can be stitched or merged together to form a 360 degree field of view. As used herein, an image is not limited to an image from a single camera, but rather, can include images captured from multiple cameras but stitched or merged together to form a single image. The control system 860 can include an auto-pilot module configured to autonomously control the movable entity on which the image capture device 855 is mounted. The control system 860 can receive instructions from the real-time visual situational awareness system 800, which when executed by the control system 860, can cause the movable entity to maneuver within an environment or otherwise adjust a trajectory, speed or direction of the movable entity.

The image manager 805 can be configured to receive images 860a-n (hereinafter image or images 860) captured by the image capture device 855 (or multiple image capture devices). The images 860 can be a sequence of images 860. The images can form a video stream. The images may be received at a predetermined number of images per unit time. The predetermined number of images per unit time may be configurable to match the needs of the real-time visual situational awareness system 800. In some implementations, the image capture device 855 may transmit a continuous video stream and the image manager 805 may identify images from the video stream. In some implementations, the image manager 805 may select every nth frame of a video stream. In some implementations, the image manager 805 may discard the remaining image frames.

The image manager 805 can be configured to identify, from the images or via an initialization process, a type of camera from which the images are being received. In some implementations, the image manager 805 can determine various types of information from the images or through the initialization process that can be used by one or more modules of the real-time visual situational awareness system 800. For instance, the image manager 805 can determine a field of view of the camera from the images or receive the information from the camera or a system controlling the camera. In some implementations, the image manager 805 can identify or determine a zoom level of the camera, a configuration setting (for example, light setting, etc.) of the camera according to which the images are being captured, a frame rate, a resolution of the camera, a size of the images, among others.

The image manager 805 can be configured to process the images to match a desired image type that can be used by the other modules of the real-time visual situational awareness system 800. For instance, the image manager 805 can adjust a resolution of the images, adjust a size of the images, adjust a color intensity of the images, among others.

The image manager 805 can be configured to apply one or more filters to the images. In some implementations, the image manager 805 can apply one or more of a contrast ratio filter, a blob filter, or a kalman filter to the images. In some implementations, the image manager 805 can apply an object recognition function on the images to identify various objects from the image. In some implementations, the object recognition function can apply one or more filters to identify the various objects. In some implementations, the image manager 805 can apply one or more scene recognition algorithms to identify clouds in the field of view, the sun, as well as other objects that may not interfere with trajectory planning or route guidance of the vehicle but may be relevant for the various modules of the real-time visual situational awareness system 800.

The image manager 805 can be configured to associate each of the images with a timestamp identifying or otherwise associated with a time at which the image was captured. In some implementations, the image manager may assign an identifier to each image. In some implementations, the image manager may store, in the databases 845, entries for each of the images. Each entry may include the corresponding image, the timestamp, the assigned identifier, among other information, for instance, a zoom level, a resolution, frames per second, light intensity level, color saturation level, among others. In some implementations, one or more of the control system input manager 810, the 3D world map manager 815, the dynamic object tracker 820, the situational awareness manager 825, the trajectory manager 830, and the collision avoidance manager 835 can associate other information with each of the entries.

The control system input manager 810 can be configured to establish a communication interface through which the control system input manger 810 can communicate with the control system 865 of the movable entity. The control system input manager 810 may receive and transmit data to the control system 865. In some implementations, the control system input manager 810 can receive input data from the control system 865. The input data can include data pertaining to control instructions for controlling the movement or maneuvering of the movable entity. In some implementations, the input data can include motion data 870. In some implementations, the motion data 870 can include position data of the movable entity, velocity data of the movable entity, acceleration data of the movable entity, or any other data from which velocity data (or acceleration data or position data) of the movable entity can be derived. In some implementations, the input data can be received via an interface with the control system 865 of the movable entity. In some implementations in which the real-time visual situational awareness system 800 is a part of or otherwise integrally coupled to a vehicle, the control system input manager 810 may not be needed to establish the interface as the interfaces may already be established.

The 3D world map manager 815 can be configured to initialize, generate and update a 3D world map. The 3D world map manager 815 can provide the 3D world map for use in generating a situational awareness model in conjunction with a dynamic object tracking model that tracks dynamic objects. Further details regarding the 3D world map manger 815 are provided with respect to at least FIGS. 10-12.

The dynamic object identifier 820 can be configured to identify dynamic objects from a sequence of images based on movements of pixels across the sequence of pixels. The dynamic object identifier 820 can generate a dynamic object tracking model that can identify a plurality of dynamic objects identified in the sequence of images. In some implementations, the dynamic objects can be vehicles, birds, animals, persons, or other objects that may move of their own volition, or be caused to move via external influences, including the wind, gravity, among others. Additional details regarding the dynamic object identifier are provided below with respect to at least FIGS. 13-15.

The situational awareness manager 825 can be configured to generate a situational awareness model. The situational awareness model can be used for collision avoidance detection, autonomous navigation, among others. The situational awareness manager 825 can rely on outputs generated by the 3D world model manager 815, the dynamic object identifier 820 and the trajectory manager 830. Additional details regarding the dynamic object identifier are provided below with respect to at least FIGS. 16-18.

The trajectory manager 830 can be configured to generate a predicted trajectory of one or more dynamic objects identified by the dynamic object identifier 820 as well as the predicted trajectory of the vehicle on which the visual situational awareness system 800 is deployed. Additional details regarding the trajectory manager 830 are provided below with respect to at least FIGS. 19 and 20.

The collision avoidance manager 835 can be configured to determine whether a collision between the vehicle and one or more of the dynamic objects will occur and responsive to determining that a collision will occur, output an avoidance maneuver signal that will cause the vehicle to perform a maneuver to avoid the collision. Additional details regarding the collision avoidance manager 835 are provided below with respect to at least FIG. 21.

The control signal motion mapper 840 can be configured to map control signals to vehicle motion. In particular, the control signal motion mapper can receive control signals from a control system of the vehicle, determine changes across the sequence of images, determine a maneuver of the vehicle based on the determined changes and then correlate the received control signals to the maneuver of the vehicle. In this way, the control signal motion mapper can map the effect of certain control signals on the maneuverability of the vehicle. Additional details regarding the control signal motion mapper 840 are provided below with respect to at least FIGS. 22 and 23.

Figure 9A:
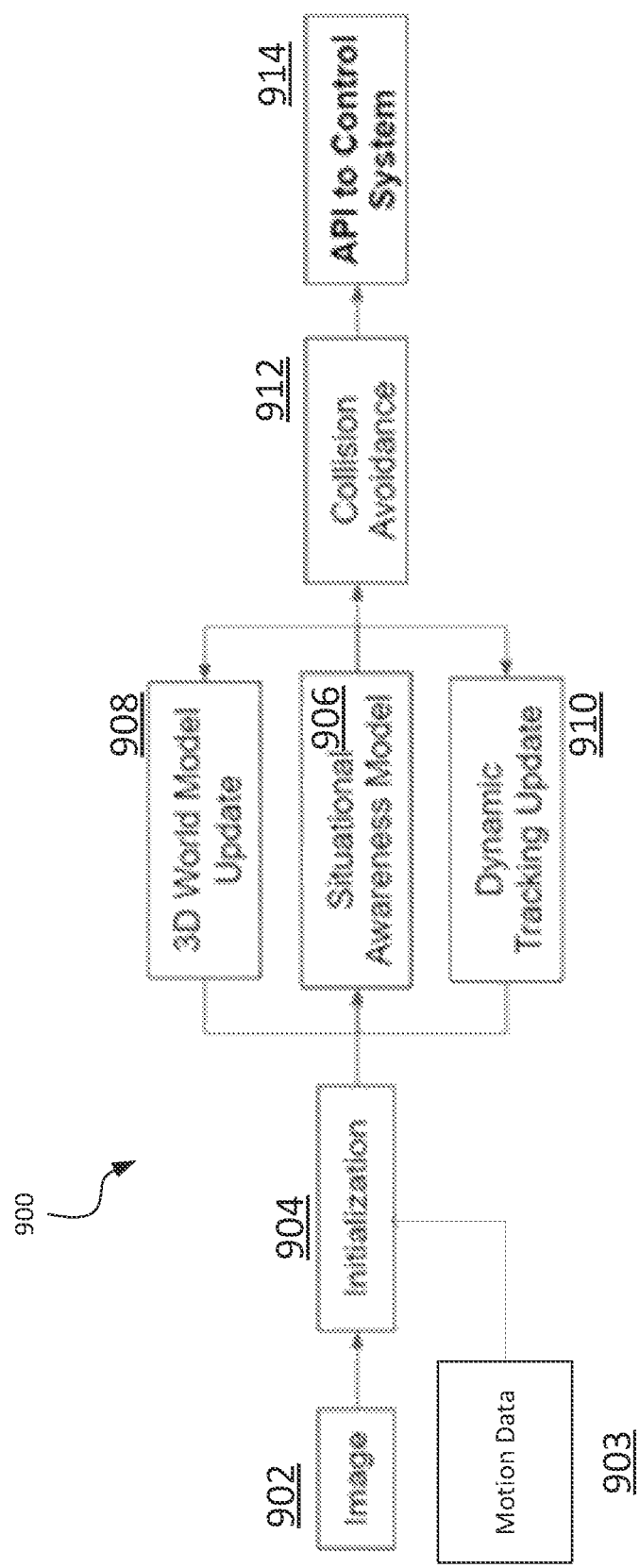
FIG. 9A is a block diagram illustrating a system architecture of the real time visual situational awareness system incorporated in the device shown in FIG. 1, according to a non-limiting embodiment.

FIG. 9A is a flowchart depicting a method 900 for updating a situational awareness model for communicating collision avoidance instructions to a control system, according to a non-limiting embodiment. It is to be emphasized, however, that method 900 need not be performed in the exact sequence as shown, hence the elements of method 900 are referred to herein as "blocks" rather than "steps".

At block 902, a set of images are sequentially captured. In one embodiment, the set of images can be captured by the camera 104 on the device 100. At block 903, motion data associated with the movable entity on which the guidance device 100 is deployed can be received.

At block 904, a situational awareness model is initialized. The camera 104 can capture an initial set of images that are used to generate a 3D world model. The initialization of a situational awareness model is similar to updating a situational awareness model, as described at block 904, with the added difference that the situational awareness model is being generated with a limited number of images. The added difference could include algorithmic shortcuts in which confidence is temporarily decreased in order to create a full map in a small number of steps.

At block 906, a situational awareness model is updated. Updating a situation awareness model comprises blocks 908 and 910, for updating a 3D world model and updating a dynamic tracking model, respectively, and feeding the situational awareness model to a collision avoidance module. Additional details for updating the 3D world model and for updating the dynamic tracking model are described herein in further detail.

At block 908, the 3D world model is updated. The 3D world model is updated by measuring the distance that each pixel of an image moves frame by frame, if the pixel moved at all. By comparing the rate at which the pixel moves to the known rate at which the vehicle is travelling, a 3D map of the environment can be generated. The 3D map of the environment can be generated using depth information of each pixel, which can be calculated using the known motion related information of the vehicle. In some embodiments, the motion related information can include a speed at which the vehicle is moving, a velocity of the vehicle, a displacement of the vehicle, or acceleration of the vehicle or any other data that can be used to derive the velocity of the vehicle. Traditionally, the optical flow method is used to calculate the speed of an object with the use of a stationary camera, whereas in this system, depth information is calculated using the known vehicle (and camera) motion related information. The process of updating the 3D world model is described in greater detail herein.

At block 910, the dynamic tracking model is updated. The dynamic tracking model is updated in two ways. First, if a pixel is moving quickly frame by frame, there is greater confidence that the pixel is representing a dynamic object. Second, a segmentation filter (for example, a "blob" filter, or any other suitable segmentation filter) is used that checks the grayscale contrast between sets of pixels. Where there is greater contrast, there is a greater likelihood that the set of pixels are representing a dynamic object. This object is then tracked from frame to frame, allowing for speed and position measurements to be updated. The process of updating the dynamic tracking model is described in greater detail herein.

At block 912, a collision avoidance decision is made. The collision avoidance decision can be based on a current trajectory of the vehicle. In some implementations, the collision avoidance decision can be based on a predicted trajectory of one or more dynamic objects tracked via the dynamic tracking model. In some implementations, the collision avoidance decision is made using the 3D world environment and the relative trajectories of the vehicle and the dynamic objects also identified in the 3D world environment. In some implementations, the collision avoidance decision is made using the 3D world environment and the trajectory of the vehicle and a static object identified within a particular position within the 3D world environment.

At block 914, a collision avoidance instruction is communicated to a control system such as the control system 150. For example, in practice, after creating the 3D depth maps and tracking dynamic objects, an Application Programing Interface (API), for example, the API that is part of the SDK referenced above, could suggest a course of action based on the object's relative location to the vehicle. This could be the distance and XYZ position of the closest ten obstacles with which the vehicle may collide, and the confidence intervals associated with these obstacles in one obstacle information array. The array could be represented as a set of point cloud models, depth maps, list of tracked objects or points, or in any other format that may be used for collision avoidance. The situational awareness system can be configured to run in parallel with the autopilot onboard any vehicle and offer navigational assistance and/or emergency control of the vehicle. For example: "stop and hover", "navigate left 30 degrees", "slow down and make a 90 degree right turn and proceed". In some implementations, the situational awareness system can output other types of commands that can alter the trajectory of the vehicle without influencing the control system itself. In some implementations, the trajectory of the vehicle can be altered even if it does not alter a direction of the vehicle. The vehicle's trajectory can be changed if the vehicle is slowed down or sped up such that the vehicle arrives at a particular location at a time different than a time at which the vehicle was previously expected to arrive. For instance, the command can include deploying a parachute or activating some other device. In some implementations, the situational awareness system may send other types of commands, such as an audible warning or a visual indicator that can indicate a potential collision. Additional details regarding each of the blocks 902-814 are provided herein.

Figure 9B:
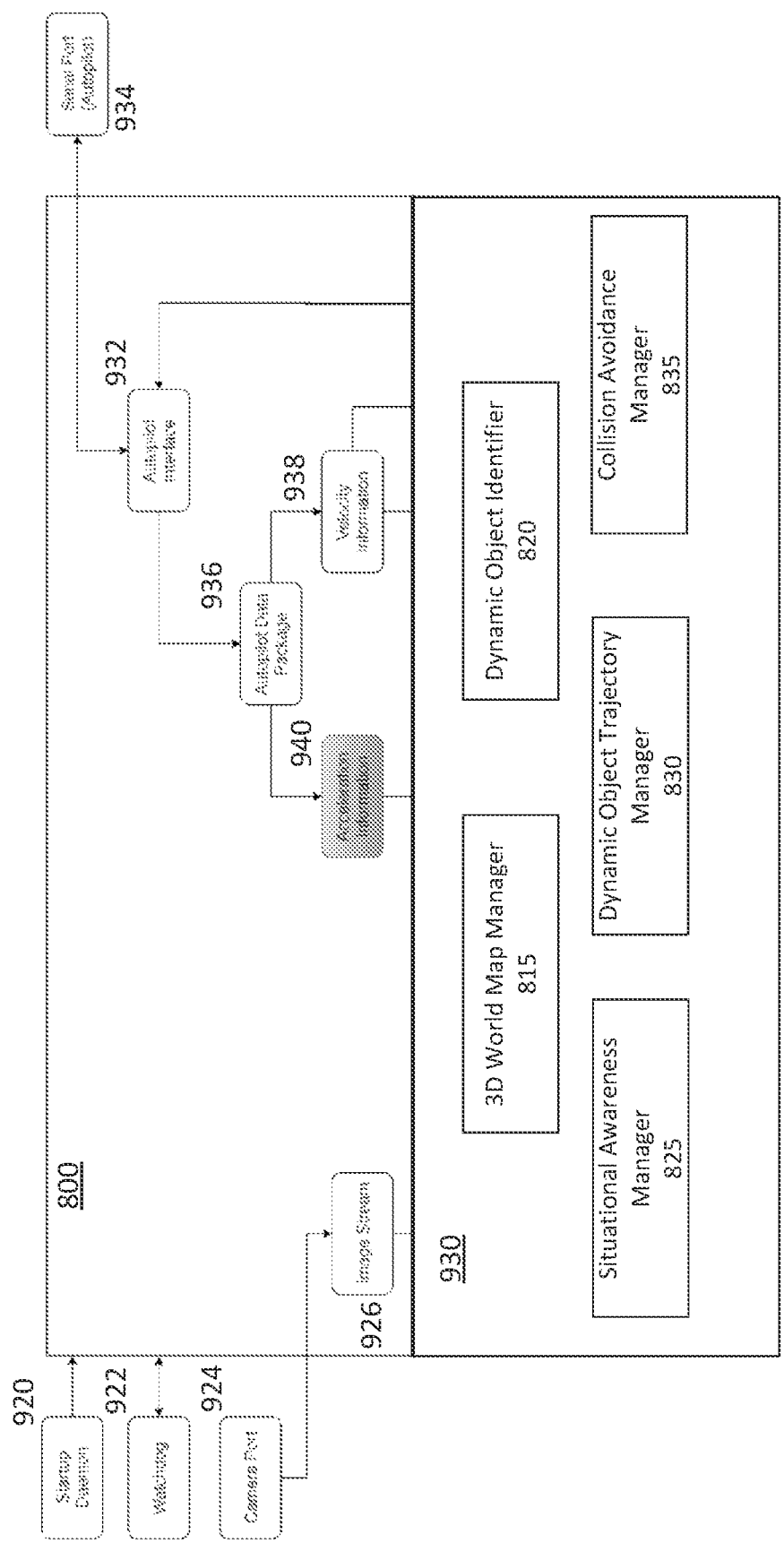
FIG. 9B is a block diagram illustrating a detailed flow of the real time visual situational awareness system incorporated in the device shown in FIG. 1, according to a non-limiting embodiment.

FIG. 9B is a block diagram illustrating aspects of the real time visual situational awareness system incorporated in the device shown in FIG. 1, according to a non-limiting embodiment. In some implementations, the real-time visual situational awareness system 800 can execute instructions described with respect to the flow shown in 9B. A startup daemon process 920 can execute on a processor to launch the real-time visual situational awareness system 800. A watchdog program 922 can communicate with the real-time visual situational awareness system 800. The watchdog program 922 can serve as an interface between one or more other systems of the movable entity or associated with the movable entity and the real-time visual situational awareness system 800. A camera port 924 can be communicatively coupled to an image capture device, such as the camera 104 and can provide an image stream 926 to the real-time visual situational awareness system 800. The image stream 926 can include a plurality of images. In some implementations, the image stream 926 can be or can include images from a real-time live video feed.

The real-time visual situational awareness system 800 can identify, from the image stream 926, each image and analyze the image for generating a 3D world model and for identifying dynamic objects. The real-time visual situational awareness system 800 may analyze multiple images of the image stream in parallel or may utilize pixel data from multiple images to generate the 3D world model or to identify dynamic objects.

The real-time visual situational awareness system 800 can also include an interface 932, such as an auto-pilot interface or a control system interface for establishing communications with a communications port 934 of an auto-pilot function or control system of the movable entity. The interface 932 can enable receiving an autopilot data package 936 from the communication port 934 of the auto-pilot function or control system of the movable entity. The autopilot data package 936 can include one or more of velocity information 938 or acceleration information 940 of the movable entity. In some implementations, the autopilot data package 936 can include any information from which the velocity information 938 or the acceleration information 940 can be derived or otherwise determined or estimated.

Referring now to block 930, a 3D world map manager, such as the 3D world map manager 815 can perform unsupervised scene recognition on each of the images. This can include applying various filters to the images to identify objects in the image and to classify them as static or dynamic objects and group pixels that represent a particular object together. An optical flow measurement function can be executed on the output of the unsupervised scene recognition function. The optical flow measurement function, which can be used to determine depth values can receive the velocity information 938 of the movable entity to determine the depth values of pixels tracked across images 928 of the image stream 926.

The optical flow measurement function can provide pixel position and movement information in conjunction with the depth value of the respective pixels to the keyframe update function, which can then update a keyframe based on the received pixel related data. The keyframe update function can update keyframes that are used to build the 3D world model. As more and more images are received and are processed, the 3D world model is improved by adding new pixel related data to the keyframes used to build the 3D world model.

In a separate but parallel process, the image stream 926 can also be processed to identify dynamic objects as described briefly above. Each image from the image stream 926 is processed by applying one or more different types of image filters, for example, a blob filter. The blob filter can be used to detect anomalies in the scene and segment possible moving targets. The blob filter can be used to identify sets of pixels ("blobs") in each image. The image can further be processed by a contrast ratio measurement function that can compare, for each blob, the contrast of the contents of the blob to pixels surrounding the blob to create a contrast ratio quantity. The real-time visual situational awareness system 800 can provide the contrast ratio quantity to a background subtraction function that can use the contrast ratio quantity for discarding objects which are not real threats and simply background noise. As each image is processed and the pixels are tracked across multiple images, each segmented blob can be given a certainty score that is based on the confidence measurement and contrast ratio. Each segmented blob is tracked to determine velocity, direction and distance from the movable entity. Where there is greater contrast, there may be a greater likelihood that the set of pixels is representing a dynamic object.

A dynamic tracking function performed by the dynamic object identifier 820 and/or the trajectory manager 830 can receive pixel data relating to the blobs and their respective contrast ratios from the background subtraction function. The dynamic tracking function can identify the pixels corresponding to dynamic objects based on the contrast levels of the pixels across the sequence of images. The dynamic tracking function can provide pixel information corresponding to the dynamic objects for inclusion into a world model that includes both static objects as well as the dynamic objects identified by the dynamic tracking function.

The world model that includes both static objects and dynamic objects is updated as more images are received and processed. The world model is updated using the acceleration data and velocity data being provided at various stages of the world model generation process performed by the 3D world map manager 815.

A trajectory propagation function executed by the trajectory manager 830 can be configured to generate predicted trajectories of the movable entity and the dynamic objects identified by the dynamic tracking function. The trajectory propagation function can aid in identifying or classifying the dynamic object into one of a plurality of different types of dynamic objects. In some implementations, a dynamic object classifier can classify the type of dynamic object. The trajectory propagation function can, from changes in the world model over time, generate a predicted trajectory for each dynamic object based on both the motion of the movable entity as well as the motion of the dynamic object.

The trajectory propagation function can provide trajectory information of the plurality of dynamic objects and/or the movable entity to a collision detection function. The collision detection function can receive velocity data 938, which the collision detection function 962 can use to determine if a collision is likely to occur between the movable entity and one or more of the dynamic objects based on the trajectories of the dynamic objects and the velocity of the movable entity. Responsive to the collision detection function detecting a potential collision event, the collision detection function can pass information to a navigation suggestion function, which can determine, based on the projected trajectories of the dynamic objects and the velocity of the movable entity, a maneuver the movable entity can perform to avoid the potential collision event. The navigation suggestion function can then generate one or more instructions to provide to the interface 932, to communicate with a control system or other system of the movable entity, the generated instruction to cause the movable entity to perform a maneuver to avoid the potential collision event.

It should be appreciated that the real-time visual situational awareness system 800 can continuously receive images from the camera port and the real-time visual situational awareness system 800 can repeatedly process each of the images to further update the keyframes and further improve the world model. As such, over time, the world model improves and the real-time visual situational awareness system 800 produces more accurate world maps as more data is received and processed.

D. Systems and Methods for Updating a Static 3D World Model

Figure 10:
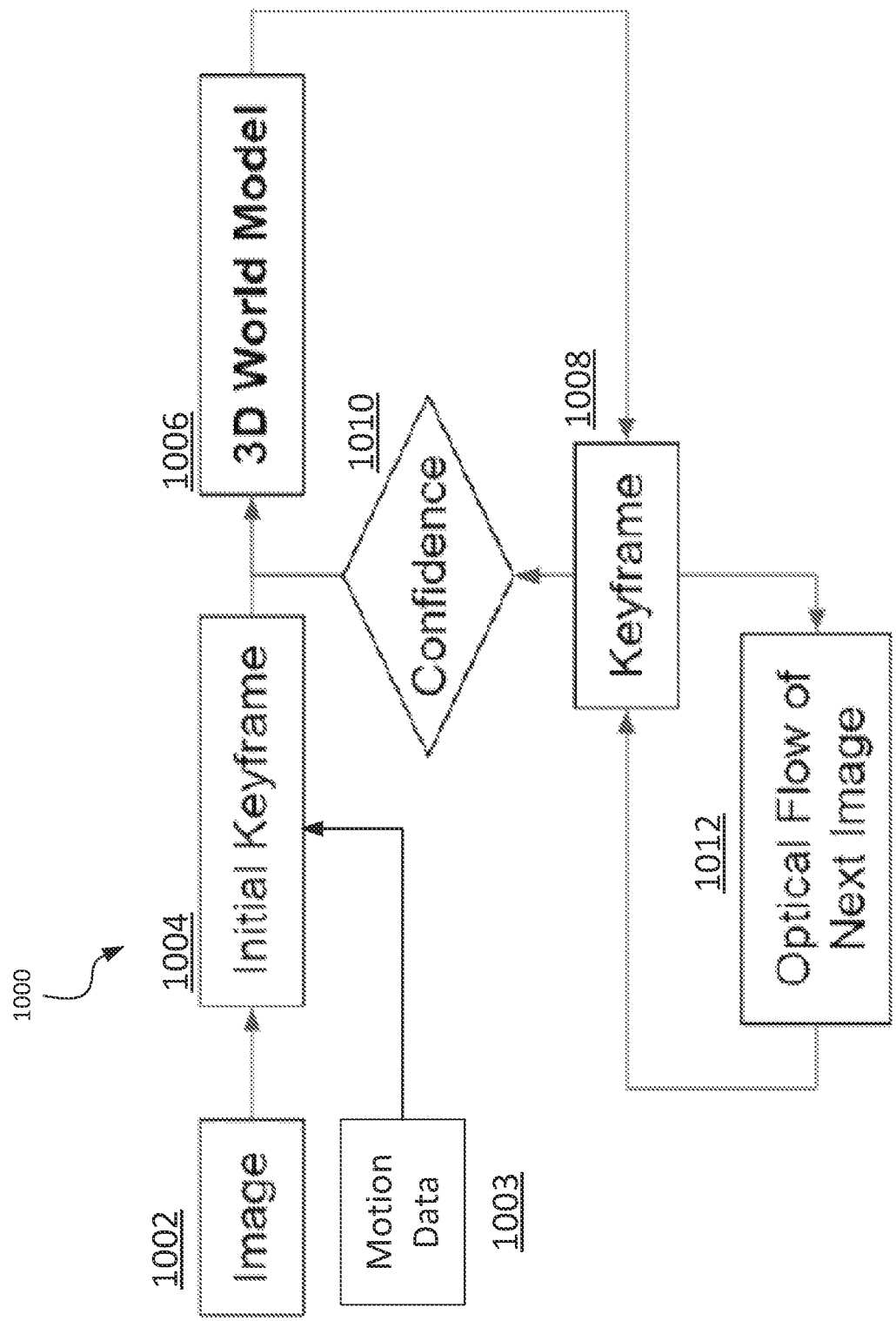
FIG. 10 is a flowchart depicting an overview for updating a static 3D world model, according to a non-limiting embodiment.

FIG. 10 is a flowchart depicting a method 1000 for updating a static 3D world model, according to a non-limiting embodiment. It is to be emphasized, however, that method 1000 need not be performed in the exact sequence as shown, hence the elements of method 1000 are referred to herein as "blocks" rather than "steps".

At block 1002, an image is captured. The image can be captured by the camera 104 on the device 100 and/or by image capture device 855. In some implementations, a monocular image setup is used in order to keep the system simple and reduce errors and limits associated with static baselines with fixed, multiple cameras. The knowledge of movement can be used in order to create dynamic baselines which extend the range over which depth calculations can be made. For example, the disparity information from stereo images can be recreated over time with a sequence of successive monocular images. At block 1003, motion data associated with the movable entity on which the guidance device 100 is deployed can be received.

At block 1004, the initial keyframe to populate the 3D world model is generated.

At block 1006, the 3D world model is stored as a sparse point cloud. The 3D world model can be continuously updated with each new keyframe. Each individually created depth map can be based on an original keyframe and the combination of a series of successive images. In order to calculate depth information, an optical flow algorithm can be employed to be able to determine individual pixel movement between each frame across the sequence of images At block 1008, the keyframe is continually updated as each new image is collected and fed into the keyframe at block 1012. These keyframes can be matched and also correlated in order to provide a real-time 3D map of the space being navigated. In some implementations, a reference keyframe is used and successive frames are tracked in order to simulate larger baselines and create a more accurate depth map. Once enough translation has led to an accurate depth map, the map can be added to the 3D world model and a new reference keyframe can be established. The method 1000 can allow for 3D depth maps to be published in real-time. In some implementations, the real-time nature of the method 1000 is important for continuous situational awareness, and can advantageously improve the performance of a system implementing the method 1000 at short range as well as at long range.

Existing featured SLAM systems may not be able to detect disturbances at the range that is possible with this situational awareness system because they typically utilize stereo vision and/or computer vision features, requiring more pixels and effectively cutting down spatial resolution. At sufficient processing speed, a system implementing method 1000 can outperform existing systems at close range because the lack of contrast is usually a detriment while this method 1000 needs only individual pixel information for tracking purposes.

Compared to existing photogrammetric range imaging algorithms, a system implementing method 1000 can be more robust and can increase the likelihood that all important elements of the image are being tracked. In some implementations, the featureless nature of the Simultaneous Localization and Mapping (SLAM) according to the present disclosure allows for better operation at larger distances and in less structured environments than existing approaches. Unlike other SLAM approaches, SLAM according implementations of the present disclosure takes the unique method of adding velocity data, and allows the depth maps to be published with absolute distances rather than needing loop closure to determine real depth. The confidence layer can allow for a unique approach to tracking dynamic objects within the environment which complements the contrast ratio approach, employed in parallel. The SLAM algorithms can provide a reliable static model and the dynamic tracking allows for changing information in the environment to be followed. Together, this can provide a very robust situational awareness layer for any robotic system.

In order to create absolute depth information, the system can take, as input, velocity data of the system. This velocity information and timing of the system can allow for a determination of the absolute rate of change of obstacles in the environment. The absolute rate of change, a core element of the depth maps created, corresponds directly to the absolute distances to the various objects which comprise the environment in the image.

At block 1010, a confidence value is attributed to every pixel that has moved between the current keyframe and the previous (reference) keyframe. In some implementations, each additional point is tracked in a 3D point cloud, which is continuously being updated with new keyframes. Each new, slightly adjusted point can be added through a position filter to the point cloud so that each new frame adds to the total confidence of the system. In some implementations, confidence is a local measurement dependent on the number of points which appear continuously in the same position and is tracked until that confidence decreases to below a set value, at which time the point is discarded, freeing up memory and additional, unnecessary processing. The confidence measurements and the overall accuracy of the system can increase as the movable entity approaches any possible objects and is able to communicate the threat with increasing accuracy. If a pixel has moved significantly, it may be more likely that the pixel represents an object that is dynamic. If a pixel has not moved significantly, it may be more likely that the object represented by the pixel is static.

Figure 11:
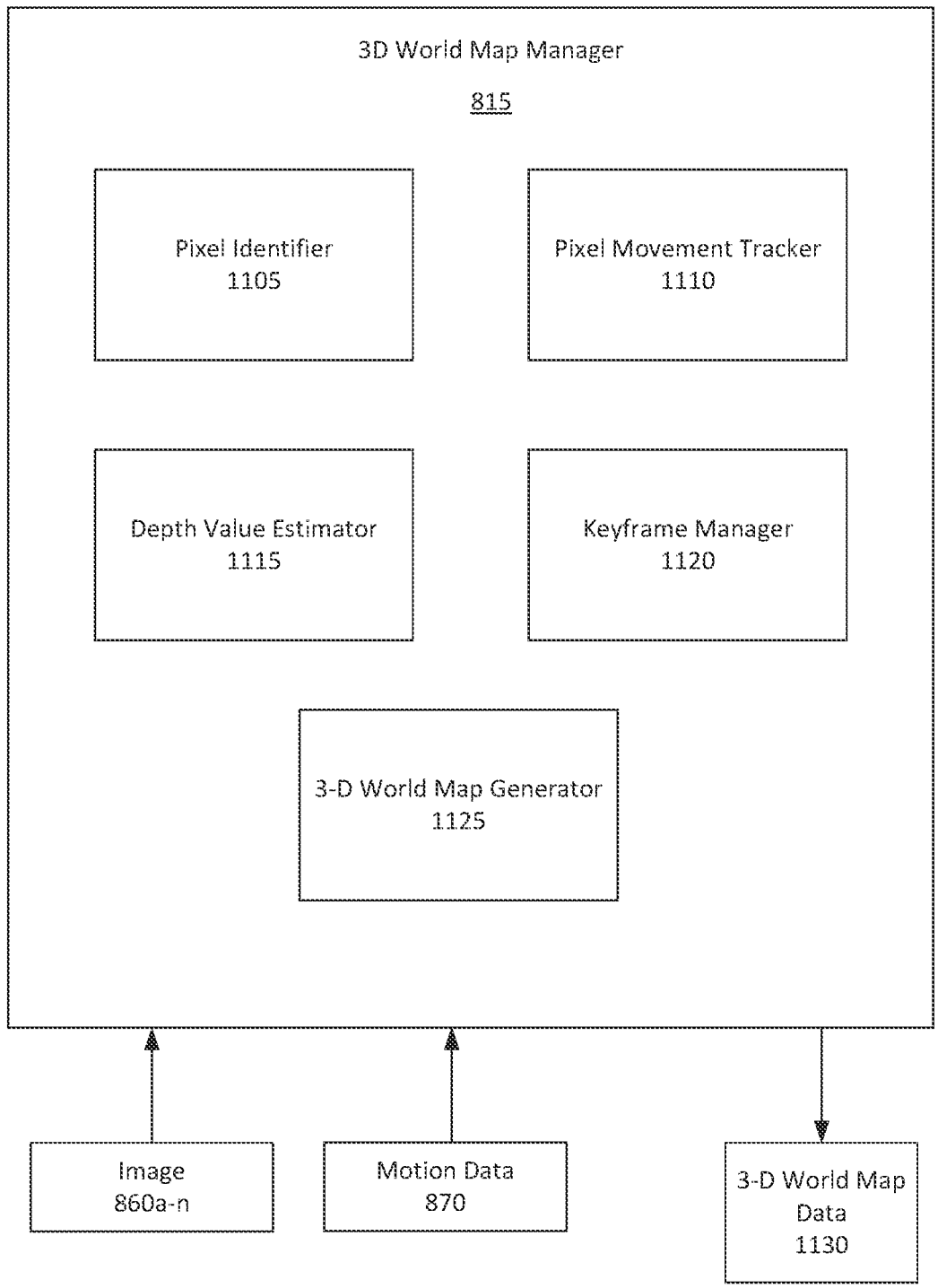
FIG. 11 is a block diagram depicting components of a 3D world map manager used in the real time visual situational awareness system shown in FIG. 8, according to a non-limiting embodiment.

FIG. 11 is a block diagram illustrating further details of the 3D world map manager 815, which can be configured to generate a 3D world model. The 3D world map manager 815 can include a pixel identifier 1105, a pixel movement tracker 1110, a depth value estimator 1115, a keyframe manager 1120, and a 3D world map generator 1125. The pixel identifier 1105, pixel movement tracker 1110, depth value estimator 1115, keyframe manager 1120, and 3D world map generator 1125 can include or execute at least one computer program or at least one script, and can include combinations of software and hardware, such as one or more processors configured to execute one or more scripts.

The 3D world map manager 815 is configured to receive a sequence of images 860*a-n*. For example, the 3D world map manager 815 can include an image receiver configured to receive the sequence of images. The sequence of images can be received from an image capture device mounted on a movable entity, such as the image capture device 855. The sequence of images can include a first image captured at a first time and a plurality of second images captured after the first time. For example, the sequence of images may be associated with sequential times or time stamps, such that the first image is captured at a first time prior to when the plurality of second images are captured. The image receiver can be configured to determine the time associated with each image from the sequence of images, such as by extracting the time from metadata transported with each image.

The first image 860*a* of the sequence of images 860*a-n* includes a first plurality of pixels. The plurality of second images 860*b-n* also each include a respective second plurality of pixels. Each image can be represented as an ordered or organized set or plurality of pixels, such as an arrangement of m-by-n pixels (e.g., m rows of pixels by n columns of pixels).

Each pixel (e.g., the first plurality of pixels, the respective second plurality of pixels) has or is associated with one or more respective parameter values. The parameter values can store, encode, or otherwise represent image information captured in each image. For example, the parameter values may be associated with one or more of a color, intensity, luminance, or other parameter representing image information or indicative of the light associated with the pixel captured in the image. In some implementations, each pixel is associated with a greyscale intensity value and one or more values representing color (e.g., representing color in an RGB color format).

The pixel identifier 1105 can be configured to identify the pixels of the sequence of images 860*a-n*. For example, the pixel identifier 1105 can be configured to extract the pixels from the sequence of images 860*a-n*. The pixel identifier 1105 can be configured to receive an image and extract the pixels from the image, such as by storing parameter value information for each pixel in an array, a map or other data structure corresponding to each image of the sequence of images 860*a-n*.

In some implementations, the pixel identifier 1105 is configured to selectively identify pixels. For example, the pixel identifier 1105 can be configured to apply a filter to the sequence of images 860*a-n* to selectively identify pixels. The filter can be based on one or more parameter values. For example, the filter can be based on an intensity of each pixel. In some implementations, the pixel identifier 1105 can selectively identify all of the pixels of each of the images.

The 3D world map manager 815 is configured to receive the motion data 870. For example, the 3D world map 815 can include a motion data receiver or tracker configured to receive the motion data 870. The motion data 870 can include velocity information and/or acceleration information regarding the movable entity or any other information from which velocity or acceleration data of the movable entity can be derived, ascertained or otherwise determined. The motion data 870 can also include attitude data or other data representing a motion state or energy state of the movable entity (e.g., attitude, thrust, heading, bearing, orientation). The motion data 870 can also include or represent a position of the movable entity (e.g., an absolute position, such as GPS coordinates; a relative position such as a position relative to a leader or follower object or a base station).

The 3D world map manager 815 (e.g., a component of the 3D world map manager such as the image receiver or the motion data receiver or tracker) can be configured to associate, to each image of the sequence of images 860*a-n*, a respective motion data value of the movable entity corresponding to a time the image was captured by the image capture device 855. In some implementations, each image can be tagged or associated with a timestamp and a current motion state or status of the movable entity at the time the image was taken. In some implementations, the current motion state can include an absolute or relative position of the movable entity, a velocity of the movable entity, an acceleration of the movable entity, among others. The position data can be 3D position data such that an aerial movable entity can have different position data values based on the different altitudes at which the dynamic object is flying. The 3D world map manager 815 can generate and store current motion state information regarding the movable entity, to generate a profile representing position, velocity, or other motion information over time. The profile can be used by the 3D world map manager 815 to determine depth information for each image or otherwise generate a model of the environment about the movable entity, as will be described further herein.

The pixel movement tracker 1110 is configured to track movement of pixels in or across the sequence of images 860a-n. The pixel movement tracker 1110 can be configured to track movement of at least a subset of the first plurality of pixels of the first image 860a across the sequence of images 860a-n. For example, as the movable entity changes in position and/or orientation, pixels may enter or exit the images 860 captured by the fixed camera of the movable entity (e.g., image capture device 855), such that only a subset of the first plurality of pixels of the first image 860a may be tracked across the sequence of images 860b-n. In some implementations, the pixel movement tracker 1110 can be configured to track each of the pixels of an image but only a subset of the pixels that were included in a first image remain as the pixel movement tracker 1110 tracks the same pixel across subsequent images as pixels corresponding to objects (or objects corresponding to the pixels) are no longer in the view of the camera and therefore, not captured. Some pixels in the sequence of images 860a-n may be associated with features in an environment about the movable entity that may be static (e.g., the absolute positions of the features do not change over time, though the pixels associated with those features in the images 860a-n may change as the relative position of the movable entity changes as compared to the features). Some other pixels in the sequence of images 860a-n may be associated with features in an environment about the movable entity that may be dynamic (e.g., the absolute positions of the features change over time regardless of whether the absolute position of the movable entity changes). For example, given an m-by-n arrangement of pixels, a feature (e.g., a pixel-sized feature as captured by the image capture device 855) of the environment may be associated with a pixel in position $[m_1, n_1]$ of the first image 860a, and with a pixel in position $[m_2, n_2]$ of the second image 860b. The pixel movement tracker 1110 can be configured to track movement of the pixel (e.g., movement of a feature represented by the pixel) from position $[m_1, n_1]$ to position $[m_2, n_2]$ from the first image 860a to the second image 860b. The pixel movement tracker 1110 can further compute a distance the pixel moved based on a difference between the coordinates of $[m_1, n_1]$ and $[m_2, n_2]$.

Figure 25A:
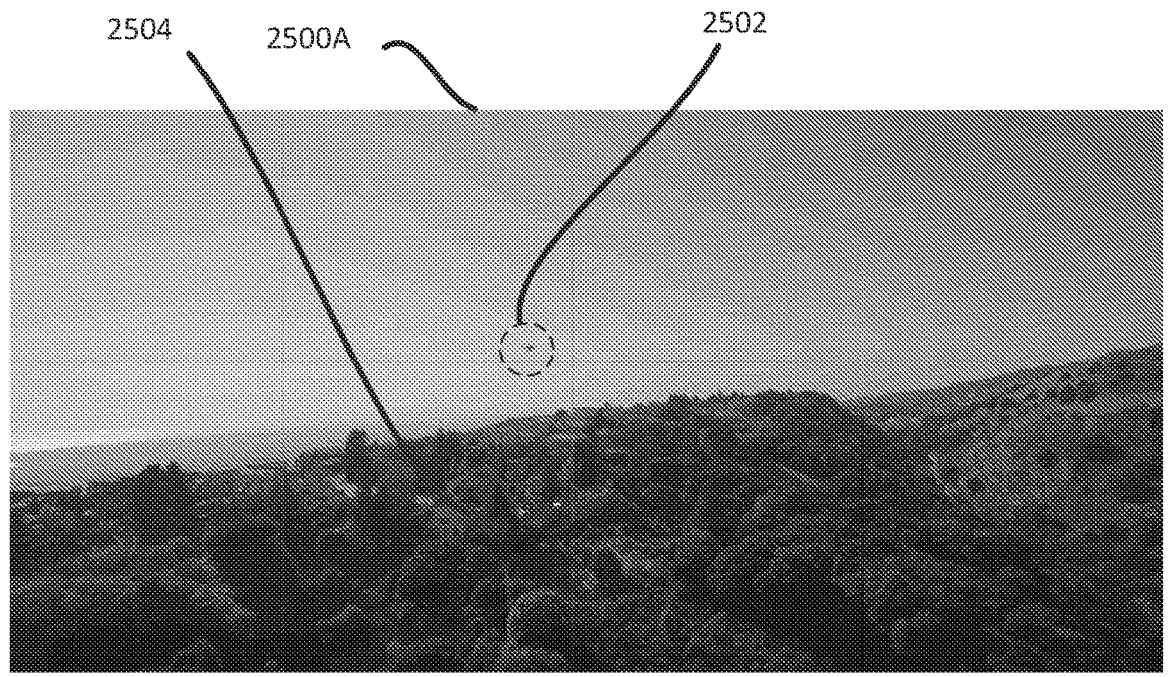
FIGS. 25A and 25B are images of an environment including a dynamic object moving closer to a movable entity, according to a non-limiting embodiment.
Figure 25B:
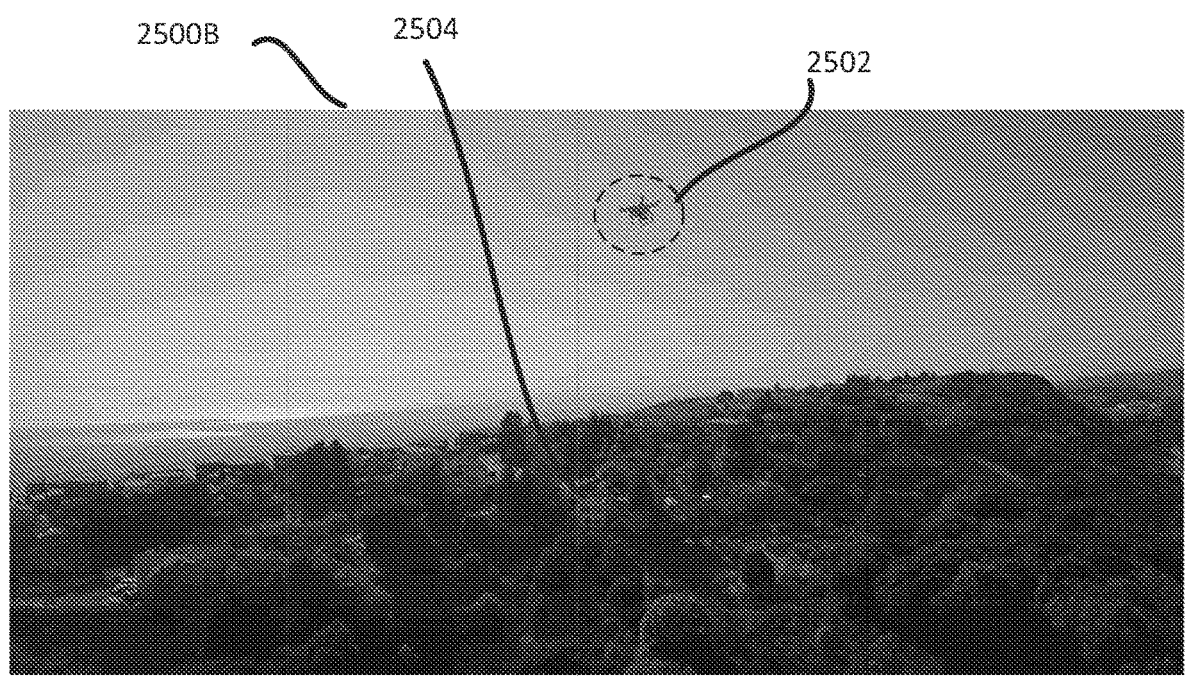

Referring briefly to FIGS. 25A and 25B are images of an environment including a dynamic object moving closer to a movable entity, according to a non-limiting embodiment. In some implementations, the pixel can represent a dynamic object such as a plane. As shown in FIGS. 25A and 25B, a plane 2502 represented by the pixel moves from a first pixel position of the first image 2500A to a second pixel position of the second image 2500B. For frame of reference, a static object shown as 2504 remains in approximately the same pixel position in the two images 2500A and 2500B.

In some implementations, the pixel movement tracker 1110 is configured to track movement of pixels based on or using parameter values. For example, the pixel movement tracker 1110 can track the movement of at least the subset of the first plurality of pixels of the first image 860a across the sequence of images 860a-n using the respective parameter values of the subset of the first plurality of pixels.

The pixel movement tracker 1110 can be configured to track movement of pixels based on determining a match between a first pixel of the first plurality of pixels and a second pixel of the second plurality of pixels. For example, the pixel movement tracker 1110 can identify the first pixel based on a first parameter value of the first pixel (e.g., a first intensity). The pixel movement tracker 1110 can search the second plurality of pixels to identify or determine one or more second pixels having a second parameter value (e.g., a second intensity) corresponding to or matching the first parameter value. In some implementations, the pixel movement tracker 1110 is configured to identify or determine a match or correspondence based on comparing the first parameter value to the second parameter value. For example, the pixel movement tracker 1110 can determine a difference between the first parameter value and the second parameter value, and compare the difference to a threshold value; if the difference is less than a threshold value, then the pixel movement tracker 1110 can determine that a match or correspondence exists between the first pixel and second pixel. In some implementations, the pixel movement tracker 1110 is configured to determine that a plurality of second pixels have an initial or preliminary match or correspondence to the first pixel, and further refine the matching to identify a final match or correspondence based on at least one of a greatest similarity (e.g., least difference) between the first pixel and second pixel or an expected location of the second pixel. In some implementations, the pixel movement tracker 1110 may use parameter values of pixels adjacent to the tracked pixel to facilitate identifying the tracked pixel across the multiple images. It should be appreciated that one skilled in the art may deploy one or more existing pixel tracking techniques to track the pixels across the sequence of images.

The depth value estimator 1115 is configured to estimate a depth value for pixels of the first plurality of pixels. In some implementations, the depth value estimator 1115 is configured to estimate, responsive to the tracked subset of the first plurality of pixels and using the received motion data, a depth value for each pixel of the subset of the first plurality of pixels. The depth value estimator 1115 can estimate the depth value based on determining an indication of movement from the motion data. For example, the depth value estimator 1115 can determine a motion state profile over time (e.g., position over time, velocity over time, attitude over time) of the movable entity, such as by comparing absolute or relative velocities of the movable entity associated with the motion data. In some implementations, as the magnitude of a change in the motion state of the movable entity increases between two points in time, the depth value estimator 1115 can associate a relatively greater difference in depth between the images 860 corresponding to the two points in time.

The keyframe manager (or generator) 1120 is configured to generate a keyframe to populate a point cloud. For example, the keyframe manager 1120 can generate, using the estimated depth value for each pixel of the subset of the first plurality of pixels, a keyframe to populate the point cloud. The point cloud can include a plurality of points. Each point can correspond to a respective pixel of the subset of the first plurality of pixels. Where the image data (e.g., the subset of the first plurality of pixels) may be a two-dimensional representation of the environment about the movable entity, the keyframe provides a 3D representation by including the depth value for each pixel. For example, the keyframe manager 1120 can apply a transformation to the subset of the first plurality of pixels to convert the subset of the first plurality of pixels from a two-dimension representation (e.g., an m-by-n arrangement of pixels which may have corresponding parameter values such as intensity and color) to a three-dimension representation (e.g., an m-by-n-by-k arrangement of pixels which may have the same corresponding parameter values such as intensity and color but with an additional associated depth/distance to each pixel).

In some implementations, the sequence of images 860a-n includes a first sequence of images 860a-m. The 3D world map manager 815 can be configured to receive a second sequence of images 860m+1-n after the first sequence of images 860a-m. The keyframe manager 1120 can be configured to update the keyframe responsive to receiving each image of the sequence of images 860m+1-n. Each of the keyframes generated by the keyframe manager can be updated as each subsequent image of the sequence of images is processed. In this way, as more and more images are processed, the keyframes are updated to include additional data, thereby improving the accuracy and quality of the keyframe, and as a result, the accuracy and quality of the 3D world map generated from the keyframes and corresponding point clouds.

In some implementations, the keyframe includes a first keyframe, and the keyframe manager 1120 is configured to update the point cloud with a second keyframe. The second keyframe can be generated using the first keyframe and a subset of the second sequence of images 860m+1-n captured after the first keyframe is generated. In various implementations, the first sequence of images 860a-m may or may not be consecutively or directly followed by the second sequence of images 860m+1-n. For example, the 3D world map manager 815 may continuously receive a stream of images in real-time. Various subsets of images within the stream may be used for generating a given keyframe, such as to resolve movement issues or determine depth information that may not be accessible or able to be determined from two consecutive sequences of images. In some implementations, a first sequence of images may capture a relatively static or time-invariant portion of the environment about the movable entity (e.g., an object which may be relatively far from the movable entity or relatively large as compared to the movable entity, such as a mountain or other feature of the terrain), such that the first sequence of images may be valuable for generating keyframes for several sequences of images.

In some implementations, the depth value estimator 1115 is configured to estimate the depth value for pixels using motion data of the movable entity. For example, the depth value estimator 1115 can be configured to estimate the depth value for each pixel of the subset of the first plurality of pixels using motion data for the movable entity such as velocity or acceleration information. The depth value may be an absolute depth (e.g., relative to a frame of reference which may be determined prior to receiving the sequence of images 860a-n or independent of the sequence of images 860a-n, such as a frame of reference based on GPS coordinates), or a relative depth (e.g., relative to a frame of reference which may be determined based on images captured by the image capture device 855 or otherwise related to the movable entity).

The keyframe manager 1120 can be configured to publish a depth map including the estimated depth values for each pixel of the subset of the first plurality of pixels for the first image that are being tracked across the sequence of images 860a-n. The depth map can include, for each tracked pixel, absolute distance information calculated based on a distance the tracked pixel moved across the sequence of images 860a-n and based on the motion data (e.g., velocity) of the movable entity.

The 3D world map generator 1125 is configured to generate a 3D world model. The 3D world map generator 1125 can generate the 3D world model using or based on the generated keyframe (e.g., generated by the keyframe manager 1120) and/or the point cloud. The 3D world map generator 1125 can maintain a representation of the 3D world model (e.g., a representation of expected features of the 3D world model and/or the environment about the movable entity). The 3D world map generator 1125 can compare the generated keyframe to the representation to determine if there are expected features of the 3D world model not present in the generated keyframe, and combine the expected features with the generated keyframe to generate the 3D world model.

The 3D world map generator 1125 can be configured to update the 3D world model over time. For example, the 3D world map generator 1125 can use a first keyframe and/or a first point cloud as a reference. As the 3D world map manager 815 receives additional sequences of images 860a-n and generates additional keyframes, the 3D world map generator 1125 can add the additional keyframes or associated point clouds (or features or pixels thereof) to the 3D world model.

In some implementations, the 3D world map generator 1125 selectively updates the 3D world model. For example, the 3D world map generator 1125 can compare one or more additional keyframes to the first keyframe, determine a difference based on the comparison, compare the difference to a threshold, and include features or pixels of the one or more additional keyframes in the 3D world model if the difference is less than the threshold (e.g., if the comparison indicates that at least some features or pixels of the one or more additional keyframes are similar to corresponding features or pixels of the first keyframe). In some implementations, the 3D world map generator 1125 can be configured to weigh keyframes based on at least one of a time associated with the keyframe (e.g., a time indicating recency of the keyframe) or motion data associated with the keyframe, which can facilitate combining information from across keyframes based on similarities across keyframes.

FIG. 12 is a flow chart depicting a method 1200 for generating a 3D world model, according to a non-limiting embodiment. It is to be emphasized, however, that method 1200 need not be performed in the exact sequence as shown, hence the elements of method 1200 are referred to herein as "blocks" rather than "steps."

At block 1205, a sequence of images is received, such as by an image receiver. The sequence of images can be received from an image capture device mounted on a movable entity, such as image capture device 855. The sequence of images can include a first image captured at a first time and a plurality of second images captured after the first time. For example, the sequence of images may be associated with sequential times or time stamps, such that the first image is captured at a first time prior to when the plurality of second images are captured. The image receiver can be configured to determine the time associated with each image from the sequence of images, such as by extracting the time from metadata transported with each image.

The first image of the sequence of images includes a first plurality of pixels. The plurality of second images also each include a respective second plurality of pixels. Each image can be represented as an ordered or organized set or plurality of pixels, such as an arrangement of m-by-n pixels (e.g., m rows of pixels by n columns of pixels).

Each pixel (e.g., the first plurality of pixels, the respective second plurality of pixels) has or is associated with one or more respective parameter values. The parameter values can store, encode, or otherwise represent image information captured in each image. For example, the parameter values may be associated with one or more of a color, intensity, luminance, or other parameter representing image information or indicative of the light associated with the pixel captured in the image. In some implementations, each pixel is associated with a greyscale intensity value and one or more values representing color (e.g., representing color in an RGB color format).

In some implementations, the pixels of the sequence of images are identified. For example, the pixels can be extracted from the sequence of images. A pixel identifier can receive an image and extract the pixels from the image, such as by storing parameter value information in a map or other data structure (such as a database) corresponding to each image of the sequence of images.

In some implementations, the pixel identifier selectively identifies pixels. For example, a filter can be applied to the sequence of images to selectively identify pixels. The filter can be based on one or more parameter values. For example, the filter can be based on an intensity of each pixel.

At block 1210, motion data of a movable entity is received. For example, a motion data receiver or tracker can receive the motion data. The motion data can include velocity information and/or acceleration information regarding the movable entity. The motion data can also include attitude data or other data representing a motion state or energy state of the movable entity (e.g., attitude, thrust, heading, bearing, orientation). The motion data can also include or represent a position of the movable entity (e.g., an absolute position, such as GPS coordinates; a relative position such as a position relative to a leader or follower object or a base station).

Each image of the sequence of images can be associated with a respective motion data value of the movable entity corresponding to a time the image was captured by the image capture device. As such, the dynamic information regarding the movable entity can be generated and stored, such as a profile representing position, velocity, or other motion information over time. The profile can be used to determine depth information for each image or otherwise generate a model of the environment about the movable entity At block 1215, movement of pixels in or across the sequence of images is tracked. Movement of at least a subset of the first plurality of pixels of the first image across the sequence of images can be tracked. For example, as the movable entity changes in position and/or orientation, pixels may enter or exit the images captured by a fixed camera of the movable entity, such that only a subset of the first plurality of pixels of the first image may be tracked across the sequence of images. The pixels in the sequence of images may be associated with features in an environment about the movable entity which may be static (e.g., the absolute positions of the features do not change over time, though the pixels associated with those features in the images may change as the relative position of the movable entity changes as compared to the features) or dynamic (e.g., the absolute positions of the features change over time regardless of whether the absolute position of the movable entity changes). For example, given an m-by-n arrangement of pixels, a feature (e.g., a pixel-sized feature as captured by the image capture device) of the environment may be associated with a pixel in position $[m_1, n_1]$ of the first image, and with a pixel in position $[m_2, n_2]$ of the second image. Movement of the pixel (e.g., movement of a feature represented by the pixel) can be tracked from position $[m_1, n_1]$ to position $[m_2, n_2]$ from the first image to the second image.

In some implementations, pixel movement is based on or using parameter values. For example, movement of at least the subset of the first plurality of pixels of the first image can be tracked across the sequence of images using the respective parameter values of the subset of the first plurality of pixels.

Movement can be tracked based on determining a match between a first pixel of the first plurality of pixels and a second pixel of the second plurality of pixels. For example, the first pixel can be identified based on a first parameter value of the first pixel (e.g., a first intensity). The second plurality of pixels can be searched to identify or determine one or more second pixels having a second parameter value (e.g., a second intensity) corresponding to or matching the first parameter value. In some implementations, a match or correspondence is determined or identified based on comparing the first parameter value to the second parameter value. For example, a difference can be determined between the first parameter value and the second parameter value, and compared to a threshold value; if the difference is less than a threshold value, then a match or correspondence can be determined to exist between the first pixel and second pixel. In some implementations, an initial or preliminary match or correspondence can be determined, and further refined to identify a final match or correspondence based on at least one of a greatest similarity (e.g., least difference) between the first pixel and second pixel or an expected location of the second pixel.

At block 1220, a depth value for pixels of the first plurality of pixels is estimated. In some implementations, the estimation is performed responsive to the tracked subset of the first plurality of pixels and using the received motion data, a depth value for each pixel of the subset of the first plurality of pixels. The depth value can be estimated based determining an indication of movement from the motion data. For example, a motion state profile over time (e.g., position over time, velocity over time, attitude over time) of the movable entity can be determined, such as by comparing absolute or relative velocities of the movable entity associated with the motion data. In some implementations, as the magnitude of a change in the motion state of the movable entity increases between two points in time, a relatively greater difference in depth between the images corresponding to the two points in time can be determined.

At 1225, a keyframe is generated to populate a point cloud. For example, using the estimated depth value for each pixel of the subset of the first plurality of pixels, a keyframe can be generated to populate the point cloud. The point cloud can include a plurality of points. Each point can correspond to a respective pixel of the subset of the first plurality of pixels. Where the image data (e.g., the subset of the first plurality of pixels) may be a two-dimensional representation of the environment about the movable entity, the keyframe provides a 3D representation by including the depth value for each pixel. For example, a transformation can be applied to the subset of the first plurality of pixels to convert the subset of the first plurality of pixels from a two-dimension representation (e.g., an m-by-n arrangement of pixels which may have corresponding parameter values such as intensity and color) to a three-dimension representation (e.g., an m-by-n-by-k arrangement of pixels which may have the same corresponding parameter values such as intensity and color).

In some implementations, the sequence of images includes a first sequence of images. A second sequence of images 860*m*+1-n can be received after the first sequence of images. The keyframe can be updated responsive to receiving each image of the sequence of images.

In some implementations, the keyframe includes a first keyframe, and the point cloud can be updated with a second keyframe. The second keyframe can be generated using the first keyframe and a subset of the second sequence of images captured after the first keyframe is generated. In various implementations, the first sequence of images may or may not be consecutively or directly followed by the second sequence of images. For example, a stream of images may be continuously received in real-time. Various subsets of images within the stream may be used for generating a given keyframe, such as to resolve movement issues or determine depth information that may not be accessible or able to be determined from two consecutive sequences of images. In some implementations, a first sequence of images may capture a relatively static or time-invariant portion of the environment about the movable entity (e.g., an object which may be relatively far from the movable entity or relatively large as compared to the movable entity, such as a mountain or other feature of the terrain), such that the first sequence of images may be valuable for generating keyframes for several sequences of images.

In some implementations, the depth value for pixels can be estimated using motion data of the movable entity. For example, the depth value for each pixel of the subset of the first plurality of pixels can be estimated using motion data for the movable entity such as velocity or acceleration information. The depth value may be an absolute depth (e.g., relative to a frame of reference which may be determined prior to receiving the sequence of images or independent of the sequence of images, such as a frame of reference based on GPS coordinates), or a relative depth (e.g., relative to a frame of reference which may be determined based on images captured by the image capture device 855 or otherwise related to the movable entity).

A depth map including the estimated depth values for each pixel of the subset of the first plurality of pixels for the first image that are being tracked across the sequence of images can be generated or published. The depth map can include, for each tracked pixel, absolute distance information calculated based on a distance the tracked pixel moved across the sequence of images and based on the motion data (e.g., velocity) of the movable entity.

At 1230, a 3D world model is generated. The 3D world model can be generated using or based on the generated keyframe and/or the point cloud. A representation of the 3D world model (e.g., a representation of expected features of the 3D world model and/or the environment about the movable entity) can be retrieved. The generated keyframe can be compared to the representation to determine if there are expected features of the 3D world model not present in the generated keyframe, and the expected features combined with the generated keyframe to generate the 3D world model.

The 3D world model can be updated over time. For example, a first keyframe and/or a first point cloud can be used as a reference. As additional sequences of images are received and additional keyframes are generated, the additional keyframes or associated point clouds (or features or pixels thereof) can be added to the 3D world model.

In some implementations, the 3D world model is selectively updated. For example, one or more additional keyframes can be compared to the first keyframe, a difference determined based on the comparison, the difference compared to a threshold, and features or pixels of the one or more additional keyframes included in the 3D world model if the difference is less than the threshold (e.g., if the comparison indicates that at least some features or pixels of the one or more additional keyframes are similar to corresponding features or pixels of the first keyframe). In some implementations, keyframes and their associated individual depth or pixel data can be weighed based on at least one of a time associated with the keyframe (e.g., a time indicating recency of the keyframe) or motion data associated with the keyframe, which can facilitate combining information from across keyframes based on similarities across keyframes. In some implementations, the position data of the pixels and/or the confidence level assigned to each of the pixels can be used to update the keyframes or to perform comparisons across keyframes.

E. Systems and Methods for Dynamic Object Tracking

Figure 13:
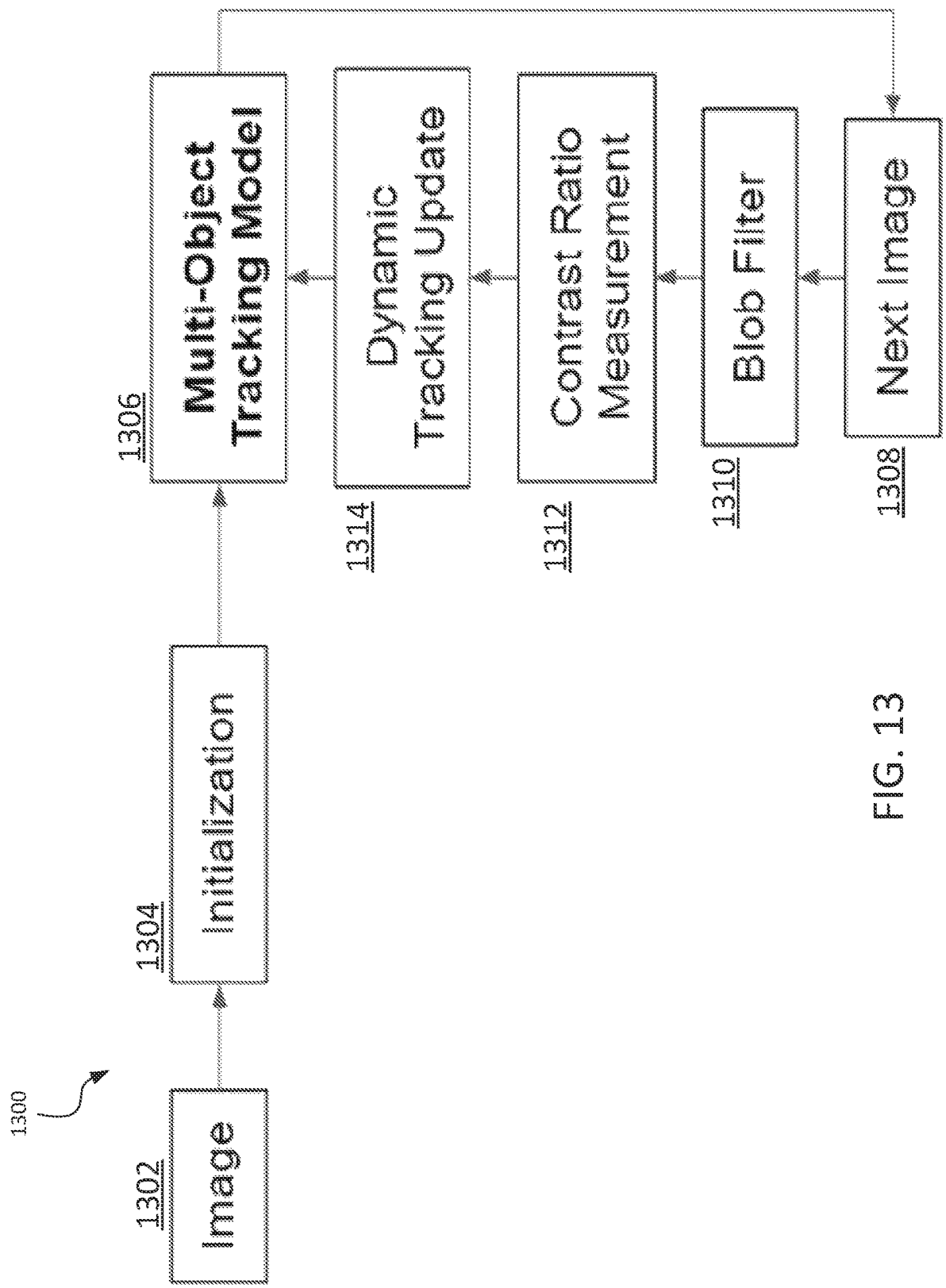
FIG. 13 is a flowchart depicting an overview for updating a dynamic object tracking model, according to a non-limiting embodiment.

FIG. 13 is a flowchart depicting a method 1300 for updating a dynamic object tracking model, according to a non-limiting embodiment. It is to be emphasized, however, that method 1300 need not be performed in the exact sequence as shown, hence the elements of method 1300 are referred to herein as "blocks" rather than "steps".

At block 1302, an image is captured. In some implementations, the image can be captured by the camera 104 on the device 100.

At block 1304, a dynamic object tracking model is initialized. Initialization of a dynamic object tracking model can be similar to updating a situational awareness model, as described at block 1314, with the added difference that the situational awareness model is being generated with a limited number of images. In some implementations, the situational awareness model is generated based on a completely random initialization process or a combination of random and non-random algorithmically selected images. The added difference could include algorithmic shortcuts in which confidence is temporarily decreased in order to create a full map in a small amount of steps.

At block 1306, a dynamic object tracking model is stored as a sequence of objects currently being tracked with their own parameters and stored information. The objects can be assigned a confidence level, which is also stored in the dynamic object tracking model. The stored dynamic object tracking model can be used in the generation or population of a sparse point cloud.

At block 1308, the next image is captured and is fed into the remaining blocks in the method.

At blocks 1310 and 1312, a blob filter can be used to detect anomalies in the environment and segment possible moving targets. Here, a number of sets of pixels ("blobs") can be identified. The contrast of the contents of the "blob" as compared to its surrounding can be used to create a contrast ratio quantity to be able to discard objects which are not real threats and simply background noise. Each segmented "blob" is given a certainty number based on the confidence measurement and contrast ratio and is tracked in order to determine velocity, direction and distance from the system. Where there is greater contrast, there may be a greater likelihood that the set of pixels is representing a dynamic object. In some implementations, other types of filters may also be employed. For instance, corner detection filters, feature detection filters and general interest point detection filters can be used to detect anomalies or features in the images, which can then be used to identify dynamic objects as well as static objects.

At block 1314, the dynamic object tracking model is updated with information obtained from the blob filter as well as one or more of the corner detection filters, feature detection filters and general interest point detection filters described above. This action can require a position matching step in which all currently tracked objects are matched to the new objects, propagating their states in order to update the model. The velocities and positions of these objects at the same time can also be updated.

Figure 14:
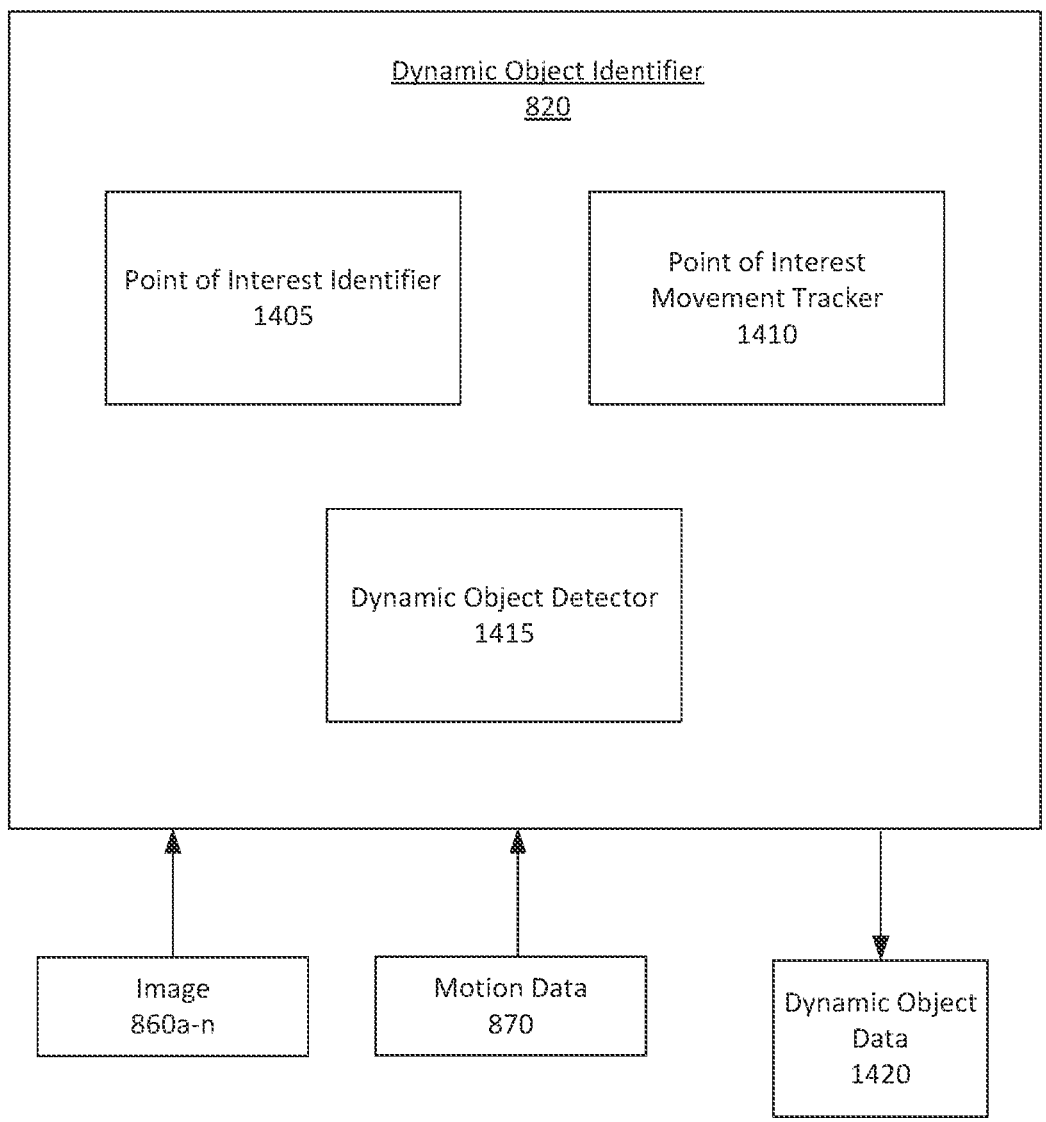
FIG. 14 is a block diagram depicting components of a dynamic object identifier used in the real time visual situational awareness system shown in FIG. 8, according to a non-limiting embodiment.

FIG. 14 is a block diagram depicting components of a dynamic object identifier 820 used in the real time visual situational awareness system shown in FIG. 8, according to a non-limiting embodiment. The dynamic object identifier 820 can include a point of interest identifier 1405, a point of interest movement tracker 1410, and a dynamic object detector 1415. The point of interest identifier 1405, point of interest movement tracker 1410, and dynamic objector detector 1415 can include or execute at least one computer program or at least one script, and can include combinations of software and hardware, such as one or more processors configured to execute one or more scripts.

The dynamic object identifier 820 is configured to receive images 860a-n. Similar to the 3D world map manager 815, the dynamic object identifier 820 can receive a sequence of images captured by an image capture device mounted on a movable entity such as the movable entity (e.g., image capture device 855). The sequence of images can include a first image captured at a first time and a plurality of second images captured after the first time. For example, the sequence of images may be associated with sequential times or time stamps, such that the first image is captured at a first time prior to when the plurality of second images are captured. The dynamic object identifier 820 can be configured to determine the time associated with each image from the sequence of images, such as by extracting the time from metadata transported with each image. As described with reference to the 3D world map manager 815, a first image 860a can include a plurality of pixels having or associated with one or more respective parameter values; the sequence of images 860a-n can also include a plurality of second images 860a-n each also including a respective second plurality of pixels that have or are associated with one or more respective parameter values. In some implementations, the dynamic object identifier 820 is configured to identify the first image 860a of the sequence of images 860a-n, such as by identifying or extracting a time or time stamp associated with each image to identify the first image 860a. The first image 860a may be the image captured chronologically first.

The point of interest identifier 1405 is configured to identify a point of interest in or on the first image 860a. For example, the point of interest identifier 1405 can identify a point of interest that includes one or more first pixels of the first image 860a. In some implementations, the point of interest identifier 1405 is configured to identify a plurality of points of interest on the first image. Each point of interest of the plurality of points of interest can be mapped to a respective pixel of the first plurality of pixels.

In some implementations, the point of interest identifier 1405 is configured to identify a point of interest using one or more image analysis techniques. For example, the point of interest identifier 1405 can determine a contrast ratio between pixels to identify pixels that are distinct relative to surrounding pixels. The point of interest identifier 1405 can execute an edge search, feature trace, or feature search algorithm to identify points of interest. The point of interest identifier 1405 can execute a blob detection or corner detection algorithm. The point of interest identifier 1405 can cluster groups of similar pixels (e.g., pixels having similar parameter values) which may be dissimilar to adjacent or surrounding groups of pixels to identify a point of interest.

The dynamic object identifier 820 can determine parameter values for the pixels to which points of interest are mapped. For example, the dynamic object identifier 820 can extract parameter values (e.g., intensity, luminance, color values) from the image data of the images 860a-n associated with particular pixels.

The point of interest identifier 1405 is configured to identify one or more pixels in one or more of the plurality of second images 860b-n (e.g., across the remaining images of the sequence of images 860a-n) that have parameter values that are statistically similar to the determined parameter values. The identified pixels included in the plurality of second images 860b-n can represent the points of interest identified on the first image 860a.

In some implementations, the point of interest identifier 1405 is configured to determine that parameter values are similar based on executing a similarity comparison algorithm. For example, the point of interest identifier 1405 can compare parameter values for two pixels to determine a difference between the parameter values, and compare the difference to a threshold value to determine if the pixels have similar parameters values (e.g., pixels having similar parameter values may represent the same point of interest). In some implementations, the threshold value is a predetermined value. In some implementations, the threshold value can be a value that is based on how similar other pixels in the image are to one another. In some implementations, the threshold value can be a value that is based on how similar pixels in the image within a predetermined distance from the point of interest pixel are to one another. In some implementations, the point of interest identifier 1405 can be configured to execute a population comparison algorithm (e.g., a t-test), to determine whether a first plurality of pixels associated with a point of interest in a first image is similar to a second plurality of pixels associated with a point of interest in a second image. In some implementations, the parameters associated with the point of interest identifier 1405 are used to match points of interest in the second image. The point of interest identifier 1405 may utilize certain parameters or parameter values to identify certain points of interests. The point of interest identifier 1405 can then use these parameters or parameter values to identify or match points of interests identified in the first image with points of interests in subsequent images, such as the second image. In some implementations, parameter values may be statistically similar if the values are within a certain threshold level of the parameter value of the pixel previously determined from one or more preceding images. In some implementations, the parameter values may be statistically similar if the values are less than at least 10%, 15%, 20% or, 25% of the parameter value of the pixel previously determined from one or more preceding images.

The point of interest movement tracker 1410 is configured to track movement of each point of interest across the plurality of second images 860b-n. The point of interest movement tracker 1410 can track movement of each point of interest by determining locations of the identified pixels having the parameter values statistically similar to the pixel to which the point of interest is mapped in the plurality of second images 860a-n.

In some implementations, the point of interest movement tracker 1410 is configured to track movement of each point of interest based on an expected motion profile, a trajectory, trended motion profile, or an extrapolated motion profile. For example, if two or more pixels in a second image 860m have parameter values that are statistically similar to the parameter value of a first pixel in the first image 860a, the point of interest movement tracker 1410 may determine that it is more likely that tracked movement is associated with one of the two or more pixels if the one pixel more closely aligns with the expected motion profile. In some implementations, the use of an expected motion profile can be applied across multiple second images 860*m* (or across at least the first image 860*a* and one or more second images 860*m*) to determine trends of pixel movement.

The dynamic object identifier 820 is configured to determine a confidence score of the point of interest indicating a likelihood that the point of interest represents a dynamic object. For example, the dynamic object identifier 820 can compare the tracked movement of the point of interest to a model or representation of object movement. The model or representation of object movement may indicate an expected motion profile, such as a straight-line or smooth curve profile, or a motion profile having acceleration and/or deceleration phases consistent with object movement (e.g., it may be less likely that tracked movement of pixels indicate a dynamic object if the tracked movement suggests acceleration or deceleration of several Gs, or suggests discontinuous or random motion).

In some implementations, the dynamic object identifier 820 is configured to determine the confidence score of the point of interest by comparing, for each image of at least a subset of the remaining images (e.g., the plurality of second images 860*b-n*), a distance between a first location within the image at which the pixel representing the point of interest was expected to be located and a second location within the image at which the pixel representing the point of interest was located.

In some implementations, the dynamic object identifier 820 is configured to determine that a point of interest represents a dynamic object based on comparing that the distance between the first location and the second location exceeds a predetermined distance. For example, if the distance is less than a predetermined distance, it may be more likely that the point of interest is static or stationary; if the distance is greater than a predetermined distance, it may be more likely that the point of interest is dynamic or otherwise represents a dynamic object. In some implementations, the dynamic object identifier 820 can be configured to compare the distance to a plurality of thresholds. For example, if the distance is less than a first distance (e.g., a first maximum distance associated with stationary objects), then the point of interest can be determined to be more likely to be stationary; if the distance is greater than a second distance greater than the first distance (e.g., a second minimum distance associated with dynamic objects), then the point of interest can be determined to be more likely to be moving; if the distance is greater than the first distance and less than the second distance, then the confidence score may not be adjusted based on the distance threshold evaluation.

In some implementations, the dynamic object identifier 820 is configured to determine that a second point of interest is a static object. For example, the dynamic object identifier 820 can determine a confidence score for the second point of interest, and determine that the confidence score fails to satisfy a threshold value based on the distance between the first location and second location of the second point of interest repeatedly being less than a predetermined distance (e.g., based on distance comparisons between the first image 860*a* and at least two of the second images 860*b-n*).

The dynamic object identifier 820 is configured to determine that at least one point of interest of the plurality of points of interest represents a dynamic object responsive to determining that the confidence score satisfies a threshold value. The threshold value may be a predetermined value, or may be determined and updated over time, such as by training the dynamic object identifier 820 to a training set having known dynamic objects.

The dynamic object identifier 820 is configured to identify, from at least one image of the sequence of images, a plurality of pixels that represent the dynamic object represented by the point of interest. For example, the dynamic object identifier 820 can use the tracked movement to identify the pixels in each image of the sequence of images 860*a-n* associated with the point of interest.

In some implementations, the dynamic object identifier 820 is configured to identify additional points of interest in the remaining images (e.g., images 860*b-n*) of the sequence of images 860*a-n*. The dynamic object identifier 820 can track movement of the additional points of interest across the remaining images to identify additional dynamic objects in the sequence of images. The dynamic object identifier 820 can be configured to apply a filter to the first image 860*a* to identify, isolate, distinguish, or categorize a plurality of points of interest (e.g., a blob filter). The dynamic object identifier 820 can be configured to track a plurality of points of interest across the sequence of images 860*a-n*.

In some implementations, the dynamic object identifier 820 is configured to receive motion data 870 (e.g., motion data 870 as described with reference to the 3D world map manager 815, such as by a motion data receiver or tracker). The dynamic object identifier 820 can be configured to associate, to one or more images of the sequence of images 860*a-n*, a velocity (or other parameter associated with motion) at which the movable entity is moving at the time the image was captured.

The velocity information can facilitate determining or identifying dynamic objects in the sequence of images 860*a-n* by providing a frame of reference for the sequence of images 860*a-n* (e.g., indicating a baseline for motion of pixels, features, and/or points of interest across the sequence of images 860*a-n*). For example, the dynamic object identifier 820 can determine an expected location for points of interest (or one or more pixels representing points of interest) in one or more of the remaining images based on the motion data. The dynamic object identifier 820 can determine an expected location of an object using camera parameters, movement of the object relative to the camera and the movable entity, and a relative scaling of the bounding box that bounds the object itself. The dynamic object identifier 820 can determine a size of the bounding box and use the determined size of the bounding box to determine the size of the object. The dynamic object identifier 820 can compare the expected location to an actual location at which the point of interest (or one or more pixels representing the point of interest) is located. Where the expected location and actual location are relatively close (e.g., spaced by a distance less than a threshold distance), it may be more likely that the point of interest represents a static feature rather than a dynamic object, such that the confidence score may be determined to be relatively low, or may be decreased relative to a determination of the confidence score that does not account for the motion data. Similarly, where the expected location and actual location are relatively far apart, it may be more likely that the point of interest represents a dynamic (or moving) object, such that the confidence score may be determined to be relatively high, or may be increased relative to a determination that does not account for the motion data.

In some implementations, the dynamic object identifier 820 is configured to determine a shape of the dynamic object. For example, the dynamic object identifier 820 can identify a subset of pixels adjacent to the point of interest representing the dynamic object. The dynamic object identifier 820 can identify the subset of pixels based on parameter values of the subset of pixels, such as by identifying edges around the point of interest based on the parameter values. The dynamic object identifier 820 can also identify the parameter values corresponding to the subset of pixels. The dynamic object identifier 820 (e.g., by the point of interest movement tracker 1410) can track movement of each of the subset of pixels across a second sequence of images received by the dynamic object identifier 820 after or subsequent to the first sequence of images. The dynamic object identifier 820 can compare a displacement of the subset of pixels to movement of the pixel representing the point of interest across the second sequence of images, such as to compare motion profiles or tracked movement of the subset of pixels. Responsive to determining that the displacement of the subset of pixels is statistically similar to the movement of the pixel representing the point of interest (e.g., the subset of pixels follow a similar path through the images as the point of interest), the dynamic object identifier 820 can determine or identify that the subset of pixels define a shape of the dynamic object.

In some implementations, as described above, once the dynamic object identifier 820 identifies a pixel identified as corresponding to the dynamic object, the dynamic object identifier 820 can analyze the pixel to identify one or more parameter values of the identified pixel. The dynamic object identifier 820 can then identify adjacent pixels to the identified pixel to determine one or more parameter values of the adjacent pixels. The dynamic object identifier 820 can then group pixels adjacent to or proximate to the identified pixel representing the moving object together based on common or similar parameter values. In some implementations, the dynamic object identifier 820 can analyze the intensity values of these pixels to group them together. In some implementations, the dynamic object identifier 820 can confirm that these pixels correspond to the movable entity by tracking their motion across the sequence of images and determining that these pixels move similar to the identified pixel representing the moving object.

In some implementations, the dynamic object identifier 820 may identify pixels that also correspond to the dynamic object by identifying pixels adjacent to or proximate to the identified pixel and identifying a contrast to other adjacent pixels. The dynamic object identifier 820 can then determine a peak group of contrast values that represent the most contrast to the background or surrounding pixels. Those pixels that have a contrast value that is within a threshold value of the peak group of contrast values can be identified as belonging to or defining the dynamic object, while pixels having contrast values that are not within the threshold are determined to correspond to the background.

In some implementations, the dynamic object identifier 820 is configured to determine a trajectory of the movable entity (for example, the vehicle) based on or using the motion data of the movable entity. For example, the dynamic object identifier 820 can use the motion data (e.g., position, velocity, and/or acceleration information) to calculate a trajectory of the movable entity, such as a series of points indicating positions of the movable entity over time (e.g., at times corresponding to the sequence of images 860*a-n*), as well as expected future positions of the movable entity.

The dynamic object identifier 820 can be configured to determine a collision between the movable entity and the dynamic object defined by the point of interest. For example, the dynamic object identifier 820 can determine a trajectory of the point of interest based on the tracked movement of the point of interest. The dynamic object identifier 820 can extrapolate a future location or path of the dynamic object defined by the point of interest, and compare the future location or path to the trajectory of the movable entity. The dynamic object identifier 820 can determine that the movable entity and the dynamic object defined by the point of interest are on a collision path (e.g., determine an intersection between paths travelled by the objects to a degree of confidence).

In some implementations, the dynamic object identifier 820 is configured to transmit a command indicating instructions to avoid a collision. For example, based on identifying the location of a collision, the dynamic object identifier 820 can generate instructions indicating a change in trajectory of the movable entity that will result in collision avoidance.

FIG. 15 is a flowchart depicting a method for updating a dynamic object tracking model, according to a non-limiting embodiment. It is to be emphasized, however, that method 1500 need not be performed in the exact sequence as shown, hence the elements of method 1500 are referred to herein as "blocks" rather than "steps".

At block 1505, a sequence of images captured by an image capture device mounted on a movable entity is received. The sequence of images can be captured by an image capture device mounted on a movable entity, such as the vehicle. The sequence of images can include a first image captured at a first time and a plurality of second images captured after the first time. For example, the sequence of images may be associated with sequential times or time stamps, such that the first image is captured at a first time prior to when the plurality of second images are captured. The time associated with each image from the sequence of images can be determined, such as by extracting the time from metadata transported with each image. As described with reference to the method 1200, a first image can include a plurality of pixels having or associated with one or more respective parameter values; the sequence of images can also include a plurality of second images each also including a respective second plurality of pixels that have or are associated with one or more respective parameter values.

At block 1510, a first image of the sequence of images including a first plurality of pixels is identified, the first image captured by the image capture device at a first time. The first image can be identified by identifying or extracting a time or time stamp associated with each image to identify the first image. The first image may be the image captured chronologically first.

At block 1515, using one or more image analysis techniques, a plurality of points of interest on the first image can be identified. Each point of interest of the plurality of points of interest can be mapped to a respective pixel of the first plurality of pixels. For example, the point of interest can be identified that includes one or more first pixels of the first image. In some implementations, a plurality of points of interest can be identified on the first image. Each point of interest of the plurality of points of interest can be mapped to a respective pixel of the first plurality of pixels of the first image. The image analysis techniques can include determining a contrast ratio between pixels to identify pixels that are distinct relative to surrounding pixels. The image analysis techniques can include executing an edge search, feature trace, or feature search algorithm to identify points of interest. The image analysis techniques can include executing a blob detection or corner detection algorithm. The image analysis techniques can include clustering groups of similar pixels (e.g., pixels having similar parameter values) which may be dissimilar to adjacent or surrounding groups of pixels to identify a point of interest.

At block 1520, parameter values for the pixels to which the plurality of points of interest are mapped can be determined. For example, parameter values (e.g., intensity, luminance, color values) can be extracted from the image data of the images associated with particular pixels.

At block 1525, across the remaining images of the sequence of images, using the determined parameter values for the pixels to which the plurality of points of interest identified on the first image are mapped, pixels included in the remaining images that have parameter values that are statistically similar to the determined parameter values can be identified, the identified pixels included in the remaining images representing the points of interest identified on the first image. The identified pixels included in the plurality of second images can represent the points of interest identified on the first image.

In some implementations, parameter values are determined to be similar based on executing a similarity comparison algorithm. For example, parameter values for two pixels can be compared to determine a difference between the parameter values, and the difference compared to a threshold value to determine if the pixels have similar parameters values (e.g., pixels having similar parameter values may represent the same point of interest). In some implementations, a population comparison algorithm (e.g., a t-test) can be executed to determine whether a first plurality of pixels associated with a point of interest in a first image is similar to a second plurality of pixels associated with a point of interest in a second image.

At block 1530, across the remaining images of the sequence of images, for each identified point of interest, movement of the point of interest can be tracked by determining locations of the identified pixels having the parameter values statistically similar to the pixel to which the point of interest is mapped in the remaining images. Movement of each point of interest can be tracked by determining locations of the identified pixels having the parameter values statistically similar to the pixel to which the point of interest is mapped in the plurality of second images.

In some implementations, movement of each point of interest can be tracked based on an expected motion profile, a trajectory, trended motion profile, or an extrapolated motion profile. For example, if two or more pixels in a second image have parameter values that are statistically similar to the parameter value of a first pixel in the first image, it may be determined that it is more likely that tracked movement is associated with one of the two or more pixels if the one pixel more closely aligns with the expected motion profile. In some implementations, the use of an expected motion profile can be applied across multiple second images (or across at least the first image and one or more second images) to determine trends of pixel movement.

At block 1535, a confidence score of the point of interest indicating a likelihood that the point of interest represents a dynamic object is determined by comparing, for each image of at least a subset of the remaining images, a distance between a first location within the image at which the pixel representing the point of interest was expected to be located and a second location within the image at which the pixel representing the point of interest was located. For example, the tracked movement of the point of interest can be compared to a model or representation of object movement. The model or representation of object movement may indicate an expected motion profile, such as a straight-line or smooth curve profile, or a motion profile having acceleration and/or deceleration phases consistent with object movement (e.g., it may be less likely that tracked movement of pixels indicate a dynamic object if the tracked movement suggests acceleration or deceleration of several Gs, or suggests discontinuous or random motion). In some implementations, the distance can be represented by a number of pixels. In some implementations, the distance can be represented by a distance the dynamic object appeared to travel. In some such implementations, the distance can be represented by a unit of measurement, such as meters, feet, among others.

At block 1540, it is determined that at least one point of interest of the plurality of points of interest represents a dynamic object responsive to determining that the confidence score of the point of interest satisfies a threshold value. The threshold value may be a predetermined value, or may be determined and updated over time, such as by training the dynamic object identifier 820 to a training set having known dynamic objects. The confidence score can be determined based on comparing a distance between an expected location of the point of interest and an actual location of the point of interest to a threshold. In some implementations, a point of interest represents a dynamic object based on comparing that the distance between the first location and the second location exceeds a predetermined distance. For example, if the distance is less than a predetermined distance, it may be more likely that the point of interest is static or stationary; if the distance is greater than a predetermined distance, it may be more likely that the point of interest is dynamic or otherwise represents a dynamic object. In some implementations, the distance can be compared to a plurality of thresholds. For example, if the distance is less than a first distance (e.g., a first maximum distance associated with stationary objects), then the point of interest can be determined to be more likely to be stationary; if the distance is greater than a second distance greater than the first distance (e.g., a second minimum distance associated with dynamic objects), then the point of interest can be determined to be more likely to be moving; if the distance is greater than the first distance and less than the second distance, then the confidence score may not be adjusted based on the distance threshold evaluation. In some implementations, a point of interest can be determined to be a static object based on multiple threshold comparisons, such as if the confidence score fails to satisfy a threshold value based on the distance between the first location and second location of the second point of interest repeatedly being less than a predetermined distance (e.g., based on distance comparisons between the first image and at least two of the second images).

At block 1545, it is identified, from at least one image of the sequence of images, a plurality of pixels that represent the dynamic object represented by the point of interest. For example, the tracked movement can be used to identify the pixels in each image of the sequence of images associated with the point of interest.

In some implementations, additional points of interest can be identified in the remaining images of the sequence of images. Movement of the additional points of interest can be tracked across the remaining images to identify additional dynamic objects in the sequence of images. A filter can be applied to the first image to identify, isolate, distinguish, or categorize a plurality of points of interest (e.g., a blob filter). A plurality of points of interest can be tracked across the sequence of images.

In some implementations, motion data can be received. A velocity (or other parameter associated with motion) at which the movable entity is moving at the time the image was captured can be configured to associated to one or more images of the sequence of images.

The velocity information can facilitate determining or identifying dynamic objects in the sequence of images by providing a frame of reference for the sequence of images (e.g., indicating a baseline for motion of pixels, features, and/or points of interest across the sequence of images). For example, an expected location for points of interest (or one or more pixels representing points of interest) can be determined or identified in one or more of the remaining images based on the motion data. The expected location can be compared to an actual location at which the points of interest (or one or more pixels representing points of interest) are located. Where the expected location and actual location are relatively close (e.g., spaced by a distance less than a threshold distance), it may be more likely that the point of interest represents a static feature rather than a dynamic object, such that the confidence score may be determine to be relatively low, or may be decreased relative to a determination of the confidence score that does not account for the motion data. Similarly, where the expected location and actual location are relatively far apart, it may be more likely that the point of interest represents a dynamic object, such that the confidence score may be determined to be relatively high, or may be increased relative to a determination that does not account for the motion data.

In some implementations, a shape of the dynamic object can be determined. For example, a subset of pixels adjacent to the point of interest representing the dynamic object can be identified. The subset of pixels can be identified based on parameter values of the subset of pixels, such as by identifying edges around the point of interest based on the parameter values. The parameter values corresponding to the subset of pixels can also be identified. Movement of each of the subset of pixels can be tracked across a second sequence of images received after or subsequent to the first sequence of images. A displacement of the subset of pixels can be compared to movement of the pixel representing the point of interest across the second sequence of images, such as to compare motion profiles or tracked movement of the subset of pixels. Responsive to determining that the displacement of the subset of pixels is statistically similar to the movement of the pixel representing the point of interest (e.g., the subset of pixels follow a similar path through the images as the point of interest), it can be determined or identified that the subset of pixels define a shape of the movable entity.

In some implementations, a trajectory of the movable entity can be determined based on or using the motion data of the movable entity. For example, the motion data (e.g., position, velocity, and/or acceleration information) can be used to calculate a trajectory of the movable entity, such as a series of points indicating positions of the movable entity over time (e.g., at times corresponding to the sequence of images), as well as expected future positions of the movable entity.

A collision can be determined between the movable entity and the dynamic object defined by the point of interest. For example, a trajectory of the point of interest can be determined based on the tracked movement of the point of interest. A future location or path of the dynamic object defined by the point of interest can be extrapolated, and compare the future location or path to the trajectory of the movable entity. It can be determined that the movable entity and the dynamic object defined by the point of interest are on a collision path (e.g., determine an intersection between paths travelled by the objects to a degree of confidence).

In some implementations, a command is transmitted indicating instructions to avoid a collision. For example, based on identifying the location of a collision, instructions can be generated indicating a change in trajectory of the movable entity that will result in collision avoidance.

F. Systems and Methods for Updating a Real-Time Situational Awareness Model

Figure 16:
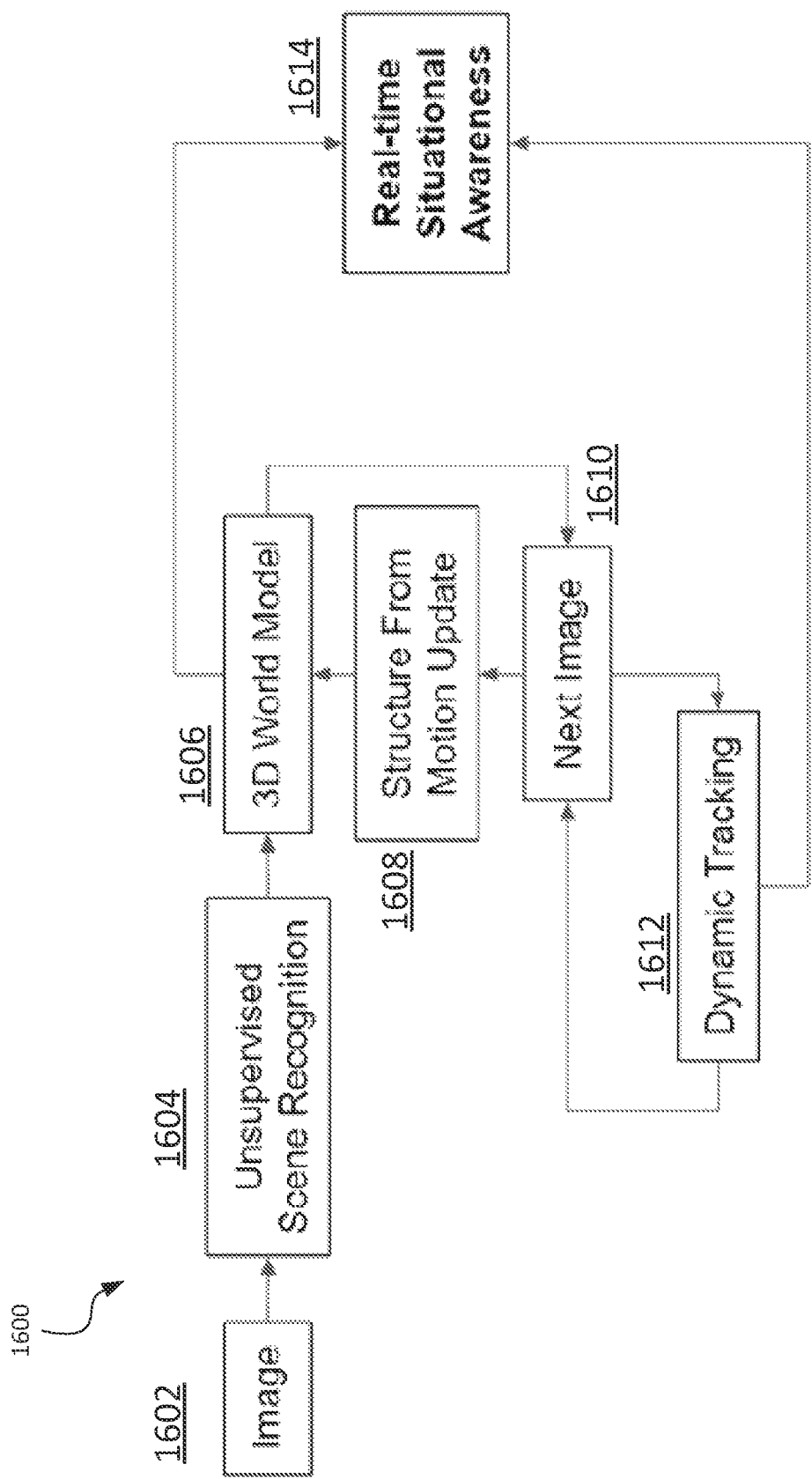
FIG. 16 is a flowchart depicting an overview for updating a real-time situational awareness model, according to a non-limiting embodiment.

FIG. 16 is a flowchart depicting a method 1600 for updating a real-time situational awareness model, according to a non-limiting embodiment. It is to be emphasized, however, that method 1600 need not be performed in the exact sequence as shown, hence the elements of method 1600 are referred to herein as "blocks" rather than "steps".

FIG. 16 illustrates how the guidance system feeds into the real-time situational awareness model. With each image collected, the photogrammetric range imaging algorithms and dynamic tracking algorithms function can combine to form a robust awareness of the environment.

At block 1602, an image is captured. In some implementations, the image can be captured by the camera 104 on the device 100.

At block 1604, unsupervised scene filtering is performed. It is through unsupervised scene filter that the visual system can handle the vast number of indoor and outdoor environments through the intelligent scene handling and detection system. This algorithm can use a set of features such as, but not limited to, image noise, contrast, lighting, shadows, and saturation to be able to quantify scenes. The images can then be given appropriate filtering based on the scene classification algorithm (e.g., contrast deviation in darker, cloudy scenes). The classification parameters can come from an unsupervised machine learning algorithm that is trained on thousands of sets of videos and reenactments of indoor and outdoor flight scenes. This process can lead to a more robust, filtered scene, which is primed for analysis by the rest of the computer vision algorithms employed in the system.

Traditionally, the external, unstructured environment is an issue for computer vision as light, contrast and the feature set are rarely consistent. The unsupervised algorithm used here is able to differentiate scenes and normalize to improve computer vision results, creating better accuracy down the entire computer vision pipeline. This preprocessing algorithm adds value to the entire visual situational awareness system by creating a better base from which to start creating structure and 3D depth maps.

At block 1606, the 3D world model is updated. This process is described in greater detail with reference to FIGS. 10-12.

At block 1608, the Structure From Motion update occurs. This process is described in greater detail with respect to FIG. 13.

At block 1610, an additional image is captured. This process is described in greater detail at block 1012 of FIG. 10 and block 1308 of FIG. 13.

At block 1612, a dynamic tracking model is updated. This process is described in greater detail with reference to FIGS. 13-15.

At block 1614, a situational awareness model is updated. This process is described in greater detail at block 906 of FIG. 9A and additional details are provided herein with respect to FIGS. 17-18.

Figure 17:
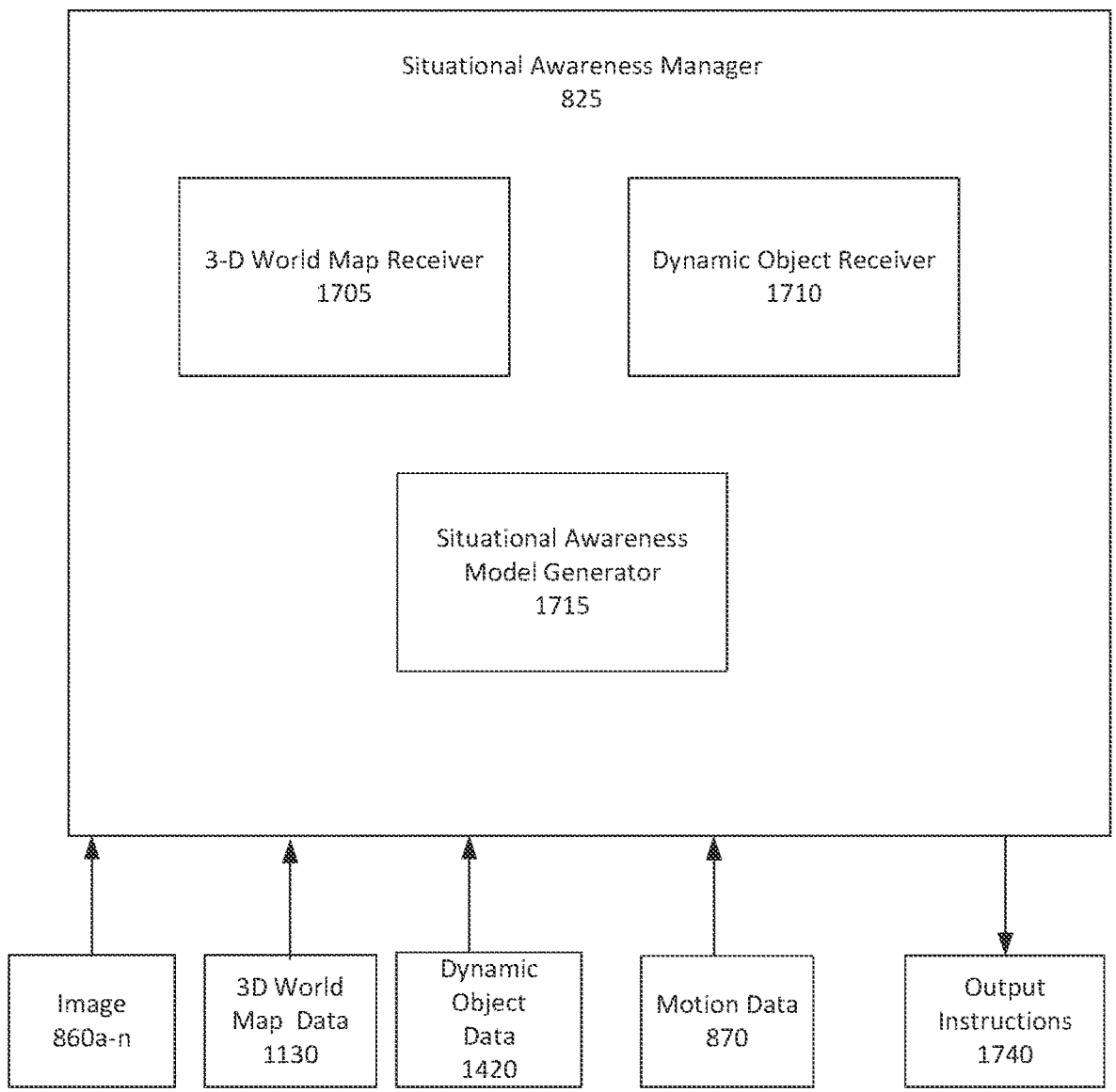
FIG. 17 is a block diagram depicting components of a situational awareness manager used in the real time visual situational awareness system shown in FIG. 8, according to a non-limiting embodiment.

FIG. 17 is a block diagram depicting components of a situational awareness manager used in the real time visual situational awareness system shown in FIG. 8, according to a non-limiting embodiment. Situational awareness manager 825 can include a 3D world map receiver 1705, a dynamic object receiver 1710, and a situational awareness model generator 1715. The 3D world map receiver 1705, dynamic object receiver 1710, and situational awareness model generator 1715 can include or execute at least one computer program or at least one script, and can include combinations of software and hardware, such as one or more processors configured to execute one or more scripts. Where the situational awareness manager 825 is tasked with or configured to perform similar functions as described with reference to the 3D world map manager 815 or the dynamic object identifier 820, the situational awareness manager 825 can include or be configured to execute similar routines, modules, programs, or scripts as those other components.

Similar to the 3D world map manager 815 and dynamic object identifier 820, the situational awareness manager 825 can receive or otherwise access the sequence of images 860*a-n* captured by an image capture device mounted on a movable entity such as the movable entity (e.g., image capture device 855).

The situational awareness manager 825 is configured to identify motion data of the movable entity, such as the vehicle. For example, the situational awareness manager 825 can receive motion data 870 and/or extract motion data from control data (e.g., control signals for controlling operation and motion of the movable entity). In some implementations, identifying the motion data includes receiving the motion data from the movable entity via a communication link. Identifying the motion data can include determining motion data via a velocity determination module that is executed using triangulation. For example, the velocity determination module can periodically determine a position of the movable entity (e.g., GPS coordinates) and compare the positions over time to determine the motion data.

The situational awareness manager 825 is configured to track movement of at least a subset of pixels (e.g., of the first plurality of pixels) of respective images across the sequence of images. For example, the situational awareness manager 825 can identify or extract parameter values of the subset of pixels in a first image, and search for similar pixels in the remaining images based on the identified or extracted parameter values. The situational awareness manager 825 can execute movement tracking algorithms similar to those executed by the dynamic object identifier 820.

The situational awareness manager 825 is configured to estimate depth values of the tracked subset of pixels. The situational awareness manager 825 can estimate the depth values responsive to tracking the subset of the first plurality of pixels. The situational awareness manager 825 can estimate the depth values based on the motion data 870. For example, the situational awareness manager 825 can process the motion data 870 to determine position, velocity, and/or acceleration information, which can be used to transform locations of pixels in each image into three-dimensional coordinates associated with depth values. In some implementations, relatively greater depth values are associated with or assigned to pixels (or features represented by pixels) that have a relatively lesser difference or disparity between images (or between distances indicated by the motion across images), as a relatively far object will tend to appear in a similar position or at a similar angle relative to the image capture device 855 while the image capture device 855 moves. The depth value may be an absolute depth value or a relative depth value.

In some implementations, the depth value is estimated without loop closure. For example, as compared to existing systems which may be required to perform loop closure to recognize a previously-visited location and/or establish a frame of reference, the situational awareness manager 825 can be configured to estimate the depth value independent of loop closure by estimating the depth value based on motion data. In addition, the depth value estimation is based on a pixel by pixel basis and independent of mapping the pixel to pixels of images captured from a different image capture device.

In some implementations, the depth value is estimated based on a distance that a pixel moves across images. For example, for each pixel of the tracked subset of pixels, a distance the pixel moved across the images can be estimated, such as by determining a difference between coordinates of the pixel and applying a multiplying factor to the difference based on known spatial information regarding the environment about the movable entity, the resolution or range of the image capture device 855, and/or the motion data.

The situational awareness manager 825 is configured to generate a 3D world map based on and/or using the estimated depth values of pixels of the tracked subset. For example, the situational awareness manager 825 can include routines similar to those included in the 3D world map manager 815, or can execute the 3D world map manager 815. The situational awareness manager 825 can retrieve a model of the 3D world map, and incorporate pixels of the tracked subset into the model based on the depth values of the pixels. In some implementations, the situational awareness manager 825 can use the 3D world map receiver 1705 to retrieve 3D world map data 1130 from the 3D world map manager 815.

In some implementations, the situational awareness manager 825 is configured to identify a plurality of points of interest to track dynamic objects. The plurality of points of interest can be identified from the sequence of images as being mapped to respective pixels of the plurality of pixels. The points of interest can be identified in a similar manner as to the identification performed or executed by the point of interest identifier 1405 of the dynamic object identifier 820. For example, the points of interest can be identified by extracting the parameter values of the plurality of pixels and identifying pixels having parameter values that are distinct relative to at least some adjacent pixels. The situational awareness manager 825 can include or execute routines similar to those of the dynamic object identifier 820 to identify points of interest associated with dynamic objects. The situational awareness manager 825 can apply a contrast filter to identify pixels based on a contrast ratio relative to pixels within a predetermined distance of the respective pixel (e.g., a relatively large contrast ratio may indicate an object or other point of interest, or an edge thereof).

In some implementations, the situational awareness manager 825 can use the dynamic object receiver 1710 to receive dynamic object data 1420 from the dynamic object identifier 820. The situational awareness manager 825 can identify the pixels or groups of pixels associated with each dynamic object as the dynamic object moves through the images 860*a-n*.

In some implementations, the situational awareness manager 825 can track movement of each point of interest across the plurality of images 860*a-n*. For example, the situational awareness manager 825 can determine or identify a trajectory or other motion profile of the point of interest. The situational awareness manager 825 can estimate parameters of the motion profile such as velocity.

The situational awareness manager 825 is configured to identify one or more dynamic objects from the tracked movements of the points of interest. For example, the situational awareness manager 825 can compare actual positions of the respective points of interest to expected positions of the respective points of interest. The expected positions of the respective points of interest can be determined based on known motion data regarding the movable entity. For example, given a trajectory of the movable entity (which may be determined in a similar manner as described with reference to the dynamic object identifier), the situational awareness manager 825 can estimate expected locations for points of interest across the plurality of images (e.g., if the points of interest are fixed, then any change in location of the point of interest should correspond to the motion or trajectory of the movable entity). If a difference between the expected location and actual location is less than a threshold distance, it may be more likely that the point of interest corresponds to a static object; if the difference is greater than a threshold distance (which may be greater than the distance used to determine that the point of interest is a static object), then it may be more likely that the point of interest corresponds to a dynamic object.

The situational awareness model generator 1715 is configured to generate a visual situational awareness model using the generated 3D world map (e.g., the 3D world map data or a world map generated based on the 3D world map data) and one or more dynamic objects. For example, the situational awareness model generator 1715 can use position information (including depth values) associated with the points of interest of the dynamic objects to add the dynamic objects to the 3D world map. The situational awareness model generator 1715 can add distinguishing features to the dynamic objects (e.g., trend or trajectory lines, highlights) to visually highlight the dynamic objects in the 3D world map, which can increase situational awareness for a user viewing the 3D world map. In some implementations, the 3D world map includes a plurality of points that correspond to respective pixels. The points can be associated with or correspond to an estimate depth value.

Figure 18:
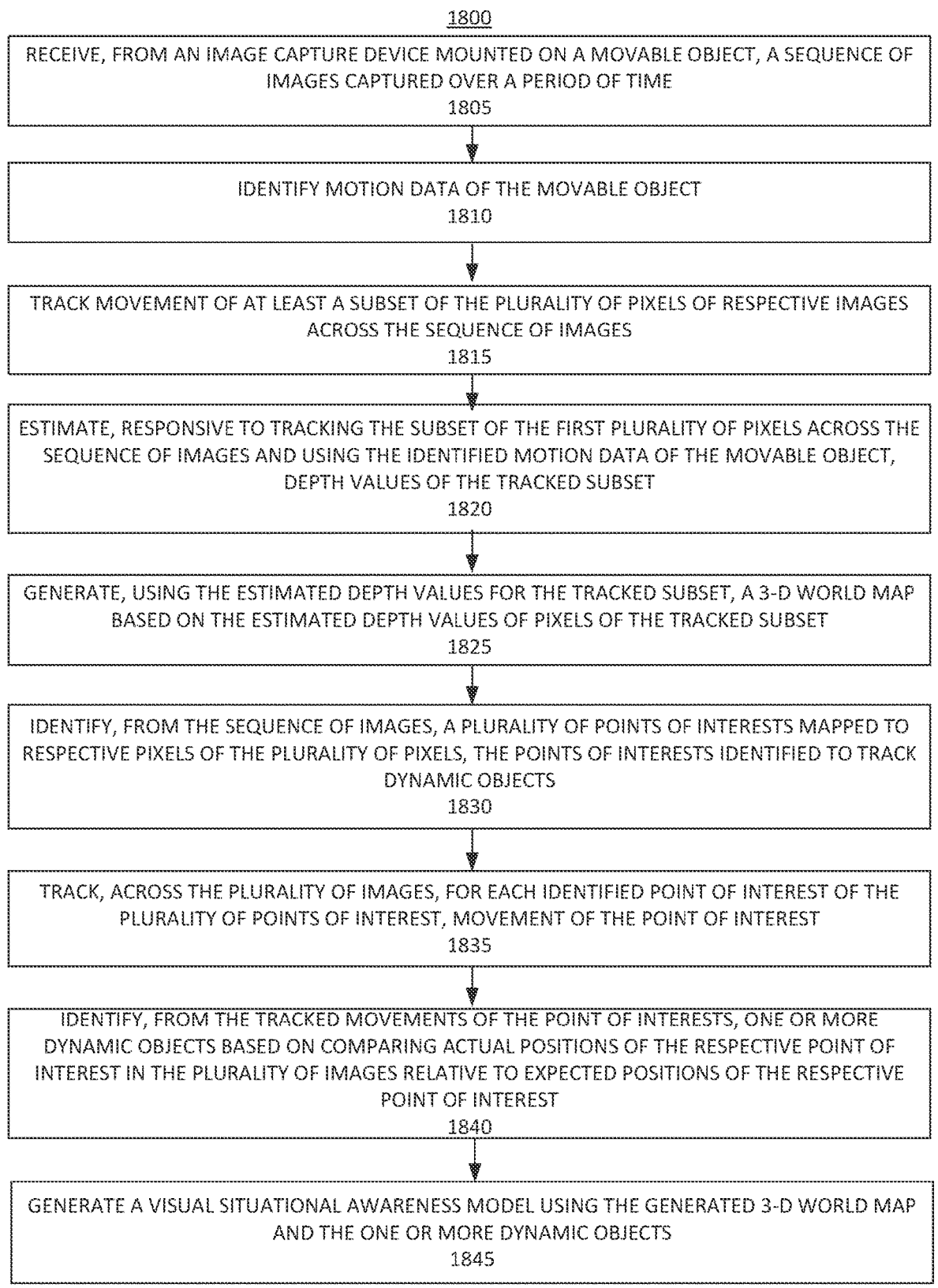
FIG. 18 is a flowchart depicting a method for updating a real-time situational awareness model, according to a non-limiting embodiment.

FIG. 18 is a flowchart depicting a method 1800 for updating a real-time situational awareness model, according to a non-limiting embodiment. It is to be emphasized, however, that method 1800 need not be performed in the exact sequence as shown, hence the elements of method 1800 are referred to herein as "blocks" rather than "steps".

At block 1805, a sequence of images captured over time is received from an image capture device mounted on a movable entity. The sequence of images can be received from an image capture device mounted on a movable entity.

At block 1810, motion data of the movable entity is identified or detected. Motion data can be received and/or extracted from control data (e.g., control signals for controlling operation and motion of the movable entity). In some implementations, identifying the motion data includes receiving the motion data from the movable entity via a communication link. Identifying the motion data can include determining motion data via a velocity determination module that is executed using triangulation. For example, the velocity determination module can periodically determine a position of the movable entity (e.g., GPS coordinates) and compare the positions over time to determine the motion data.

At block 1815, movement of at least a subset of the plurality of pixels of respective images is tracked across the sequence of images. Parameter values of the subset of pixels in a first image can be identified or extracted, and similar pixels in the remaining images can be searched for based on the identified or extracted parameter values. Movement tracking algorithms similar to those executed by the dynamic object identifier 820 can be executed.

At block 1820, depth values of the tracked subset of pixels are estimated. The depth values can be estimated responsive to tracking the subset of the first plurality of pixels. The depth values can be estimated based on the motion data. For example, the motion data can be processed to determine position, velocity, and/or acceleration information, which can be used to transform locations of pixels in each image into three-dimensional coordinates associated with depth values. In some implementations, relatively greater depth values are associated with or assigned to pixels (or features represented by pixels) that have a relatively lesser difference or disparity between images (or between distances indicated by the motion across images), as a relatively far object will tend to appear in a similar position or at a similar angle relative to the image capture device while the image capture device moves. The depth value may be an absolute depth value or a relative depth value.

In some implementations, the depth value is estimated without loop closure. For example, as compared to existing systems which may be required to perform loop closure to recognize a previously-visited location and/or establish a frame of reference, the depth value can be determined or estimated independent of loop closure by estimating the depth value based on motion data.

In some implementations, the depth value is estimated based on a distance that a pixel moves across images. For example, for each pixel of the tracked subset of pixels, a distance the pixel moved across the images can be estimated, such as by determining a difference between coordinates of the pixel and applying a multiplying factor to the difference based on known spatial information regarding the environment about the movable entity, the resolution or range of the image capture device, and/or the motion data.

At block 1825, a 3D world map can be generated using the estimated depth values for the tracked subset. A model of the 3D world map can be retrieved, and can have pixels of the tracked subset incorporated into the model based on the depth values of the pixels.

At block 1830, a plurality of points of interest mapped to respective pixels of the plurality of pixels are identified to track dynamic objects. The plurality of points of interest can be identified from the sequence of images as being mapped to respective pixels of the plurality of pixels. The points of interest can be identified in a similar manner as to the identification performed in the methods 1200, 1500. For example, the points of interest can be identified by extracting the parameter values of the plurality of pixels and identifying pixels having parameter values that are distinct relative to at least some adjacent pixels. A contrast filter can be applied to identify pixels based on a contrast ratio relative to pixels within a predetermined distance of the respective pixel (e.g., a relatively large contrast ratio may indicate an object or other point of interest, or an edge thereof). In some implementations, pixels or groups of pixels associated with each dynamic object can be identified as the dynamic object moves through the images.

At block 1835, movement of each identified point of interest can be tracked across the plurality of images. For example, a trajectory or other motion profile of the point of interest can be identified or determined. Parameters of the motion profile such as velocity can be estimated to facilitate movement tracking.

At block 1840, one or more dynamic objects are identified from the tracked movements of the points of interest. For example, actual positions of the respective points of interest can be compared to expected positions of the respective points of interest. The expected positions of the respective points of interest can be determined based on known motion data regarding the movable entity. For example, given a trajectory of the movable entity (which may be determined in a similar manner as described with reference to the dynamic object identifier), expected locations for points of interest across the plurality of images can be estimated (e.g., if the points of interest are fixed, then any change in location of the point of interest should correspond to the motion or trajectory of the movable entity). If a difference between the expected location and actual location is less than a threshold distance, it may be more likely that the point of interest corresponds to a static object; if the difference is greater than a threshold distance (which may be greater than the distance used to determine that the point of interest is a static object), then it may be more likely that the point of interest corresponds to a dynamic object.

At 1845, a visual situational awareness model is generated using the generated 3D world map and the one or more dynamic objects. For example, position information (including depth values) associated with the points of interest of the dynamic objects can be used to add the dynamic objects to the 3D world map. Distinguishing features can be added to the dynamic objects (e.g., trend or trajectory lines, highlights) to visually highlight the dynamic objects in the 3D world map, which can increase situational awareness for a user viewing the 3D world map. In some implementations, the 3D world map includes a plurality of points that correspond to respective pixels. The points can be associated with or correspond to an estimate depth value.

G. Systems and Methods for Trajectory Mapping

Figure 19:
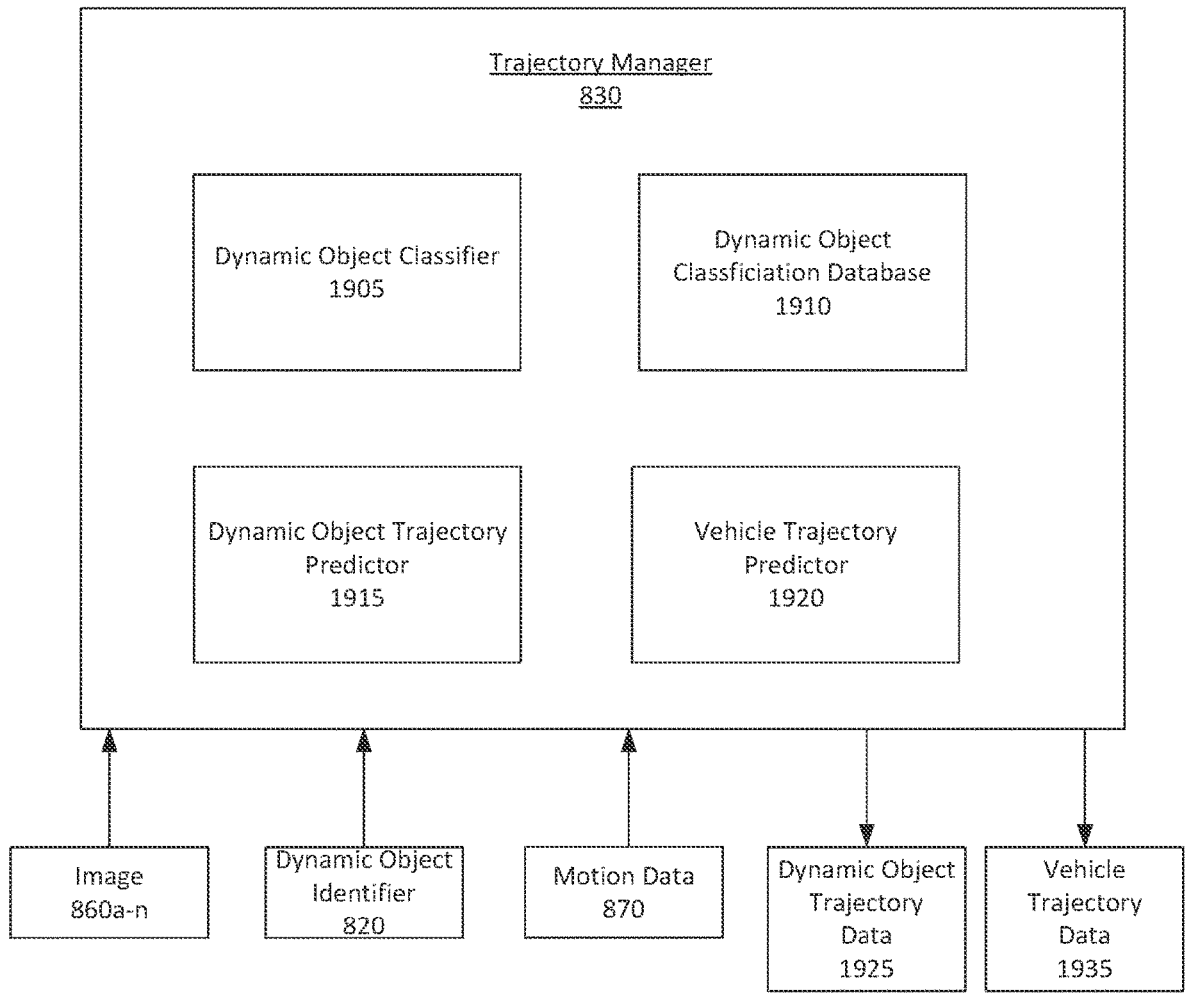
FIG. 19 is a block diagram depicting components of an object trajectory manager used in the real time visual situational awareness system shown in FIG. 8, according to a non-limiting embodiment.

FIG. 19 is a block diagram depicting components of a trajectory manager 830 used in the real time visual situational awareness system shown in FIG. 8, according to a non-limiting embodiment. The trajectory manager 830 can include a dynamic object classifier 1805, dynamic object classification database 1910, dynamic object trajectory predictor 1915, and vehicle trajectory predictor 1920. The dynamic object classifier 1805, dynamic object classification database 1910, dynamic object trajectory predictor 1915, and vehicle trajectory predictor 1920 can include or execute at least one computer program or at least one script, and can include combinations of software and hardware, such as one or more processors configured to execute one or more scripts. Where the trajectory manager 830 is tasked with or configured to perform similar functions as described with reference to the 3D world map manager 815, the dynamic object identifier 820, or the situational awareness manager 825, the trajectory manager 830 can include or be configured to execute similar routines, modules, programs, or scripts as those other components. The trajectory manager 830 can receive the sequence of images 860*a-n*, one or more dynamic objects from the dynamic object identifier 820, and motion data 870.

The trajectory manager 830 is configured to identify a pixel corresponding to a dynamic object based on movement of the pixel across a plurality of images. For example, the trajectory manager 830 can select a random pixel associated with the dynamic object, a distinct pixel (e.g., a pixel having a relatively great contrast ratio to other pixels of the dynamic object or to other pixels outside the dynamic object), or a pixel associated with an edge, outline, or border of the dynamic object. In some implementations, if the trajectory manager 830 does not receive the dynamic object as a plurality of pixels, the trajectory manager 830 can execute functions similar to those of the dynamic object identifier 820 to identify dynamic objects and pixels associated with dynamic objects.

The trajectory manager 830 is configured to identify, from the pixel, a plurality of pixels corresponding to the dynamic object. For example, the trajectory manager 830 compare parameter values of the identified pixel to parameter values of nearby pixels (e.g., within a threshold distance, which may be associated with an expected size for a dynamic object as informed by depth information) to identify similarities in the pixels or otherwise categorize the plurality of pixels as also corresponding to the dynamic object.

The trajectory manager 830 is configured to identify an outline defined by the identified plurality of pixels. For example, the trajectory manager 830 can execute an image analysis algorithm to distinguish the plurality of pixels associated with the dynamic object from pixels surrounding the dynamic object. The trajectory manager 830 can identify the outline based on a contrast ratio between pixels defining the outline and pixels outside the outline.

The dynamic object classifier 1905 is configured to determine visual characteristics of the dynamic object based on the outline defined by the identified plurality of pixels. For example, the dynamic object classifier 1905 can extract or trace features of the outline, such as edges, corners, curves, or other visual characteristics, from the outline. The dynamic object classifier 1905 can compare the extracted or traced features to known features associated with dynamic objects. For example, the dynamic object classification database 1910 can include a database storing visual characteristics of dynamic objects. The dynamic object classifier 1905 can retrieve the database of visual characteristics and compare the extracted or traced features to the retrieved characteristics to determine a match (e.g., a similarity-based match).

The dynamic object classification database 1910 can store information including types of dynamic objects, features associated with dynamic objects, and mappings of features or other visual characteristics to dynamic objects or types of dynamic objects. For example, the dynamic object classification database 1910 can store visual characteristics associated with known features of dynamic objects such as engines, wings, cockpits, and rotors, as well as relative sizes of such features, and map object-specific features to types of objects.

The dynamic object classifier 1905 is configured to determine a type of the dynamic object according to the visual characteristics. For example, the dynamic object classifier 1905 can determine the type of dynamic object based on determining that certain visual characteristics associated with or corresponding to certain type(s) of dynamic objects are present in the outline or match known features of the types of dynamic objects. The dynamic object classifier can determine the type of dynamic object based on comparing visual characteristics to visual characteristics of known objects stored in the dynamic object classification database 1910. In some implementations, the dynamic object classification database 1910 is configured to map visual characteristics to types of dynamic objects. The dynamic object classifier 1905 can process identified, extracted, or traced features or visual characteristics of the dynamic object, select one or more visual characteristics in the dynamic object classification database 1910 that are similar to the features or characteristics of the dynamic object, and retrieve the type of dynamic object associated with the selected visual characteristic.

The dynamic object trajectory predictor 1915 is configured to determine an absolute distance from the dynamic object. For example, the dynamic object trajectory predictor 1915 can use a relative depth value of pixels of the dynamic object, or compare an absolute depth value of the pixels of the dynamic object to an absolute location or depth value of the movable entity, to determine the absolute distance.

The dynamic object trajectory predictor 1915 is configured to generate, based on the type of the dynamic object and the absolute distance, a predicted trajectory of the dynamic object. For example, the dynamic object trajectory predictor 1915 can determine a profile of movement of the dynamic object in the sequence of images, such as by fitting a curve to pixels associated with the dynamic object across the sequence of images. The dynamic object trajectory predictor 1915 can determine a predicted trajectory based on an expected motion or velocity of the dynamic object based on the type of the dynamic object. For example, the dynamic object trajectory predictor 1915 can identify an expected velocity or range of velocities associated with a type of dynamic object (e.g., a fixed wing aircraft, a rotary wing aircraft, a bird, a hot air balloon).

In some implementations, the dynamic object trajectory predictor 1915 is configured to update or scale at least one of dynamic object information on a 3D world model based on motion data. For example, the dynamic object trajectory predictor 1915 can use the motion data (e.g., GPS data, velocity information) to determine an absolute distance traveled by the vehicle between a pair of images of the sequences of images 860*a*-*n*. Based on the absolute distance, the dynamic object trajectory predictor 1915 can measure a length of features within each image, such as a length of features or visual characteristics of dynamic objects, or a distance between dynamic objects.

The vehicle trajectory predictor 1920 is configured to generate, based on the motion data, a trajectory of the movable entity, such as the vehicle. For example, the vehicle trajectory predictor 1920 can use a current velocity (e.g., speed and heading) of the movable entity to predict a future location of the movable entity. In some implementations, the vehicle trajectory predictor 1920 is configured to extract a predicted maneuver from a plurality of past motion data (e.g., a plurality of past positions and/or velocities). Based on the plurality of past motion data, the vehicle trajectory predictor 1920 can estimate a maneuver being performed by the movable entity (e.g., a turn). The vehicle trajectory predictor 1920 can predict the trajectory of the movable entity such that the movable entity follows a path expected to complete the predicted maneuver.

In some implementations, the dynamic object classification database 1910 is configured to store a plurality of known maneuvers associated with types of dynamic objects, and the vehicle trajectory predictor 1920 can perform a lookup in the dynamic object classification database 1910 to identify known maneuvers associated with the movable entity, compare the plurality of past motion data to the known maneuvers, and determine a match in order to determine a predicted maneuver. In some implementations, certain types of dynamic objects may perform specific maneuvers that may be mandated or recommended by regulatory bodies or associated with rules of the environment in which the vehicle is expected to be operating.

In some implementations, the trajectory manager 830 is configured to estimate a collision based on the predicted trajectory of the dynamic object and the trajectory of the movable entity. For example, the trajectory manager 830 can determine whether an intersection will occur (e.g., to a degree of certainty) between the predicted trajectory of the dynamic object and the trajectory of the movable entity. The trajectory manager 830 can generate and transmit an alert configured to indicate the potential collision and/or a control instruction configured to alter the trajectory of the movable entity to avoid the collision.

FIG. 20 is a flowchart depicting a method for generating a predicted trajectory of an object, according to a non-limiting embodiment. It is to be emphasized, however, that method 1800 need not be performed in the exact sequence as shown, hence the elements of method 1800 are referred to herein as "blocks" rather than "steps".

At block 2005, a pixel corresponding to a dynamic object is identified based on a movement of the pixel across a plurality of images. A random pixel associated with the dynamic object, a distinct pixel (e.g., a pixel having a relatively great contrast ratio to other pixels of the dynamic object or to other pixels outside the dynamic object), or a pixel associated with an edge, outline, or border of the dynamic object can be selected. In some implementations, if the dynamic object is not received as a plurality of pixels, functions similar to those of methods 1200, 1500 can be executed to identify dynamic objects and pixels associated with dynamic objects.

At block 2010, identify, from the pixel, a plurality of pixels corresponding to the dynamic object. For example, parameter values of the identified pixel can be compared to parameter values of nearby pixels (e.g., within a threshold distance, which may be associated with an expected size for a dynamic object as informed by depth information) to identify similarities in the pixels or otherwise categorize the plurality of pixels as also corresponding to the dynamic object.

At block 2015, visual characteristics of the dynamic object are determined based on the outline defined by the identified plurality of pixels. For example, an image analysis algorithm can be executed to distinguish the plurality of pixels associated with the dynamic object from pixels surrounding the dynamic object. The outline can be determined based on a contrast ratio between pixels defining the outline and pixels outside the outline.

At block 2020, a type of the dynamic object can be determined according to the visual characteristics. For example, features of the outline, such as edges, corners, curves, or other visual characteristics, can be extracted or traced from the outline. The extracted or traced features can be compared to known features associated with dynamic objects. For example, a database can be provided, generated, or stored having visual characteristics of dynamic objects. The database of visual characteristics can be retrieved and compare the extracted or traced features to the retrieved characteristics to determine a match (e.g., a similarity-based match). The database can store information including types of dynamic objects, features associated with dynamic objects, and mappings of features or other visual characteristics to dynamic objects or types of dynamic objects. For example, the database can store visual characteristics associated with known features of dynamic objects such as engines, wings, cockpits, and rotors, as well as relative sizes of such features, and map object-specific features to types of objects.

The type of dynamic object can be determined based on determining that certain visual characteristics associated with or corresponding to certain type(s) of dynamic objects are present in the outline or match known features of the types of dynamic objects. The type of dynamic object can be determined based on comparing visual characteristics to visual characteristics of known objects stored in the database. In some implementations, visual characteristics are mapped to types of dynamic objects. Identified, extracted, or traced features or visual characteristics of the dynamic object can be processed, one or more visual characteristics in the database can be selected that are similar to the features or characteristics of the dynamic object, and the type of dynamic object associated with the selected visual characteristic can be retrieved.

At block 2025, an absolute distance from the dynamic object (vehicle) can be determined. For example, a relative depth value of pixels of the dynamic object can be used, or an absolute depth value of the pixels of the dynamic object can be compared to an absolute location or depth value of the movable entity, to determine the absolute distance. For example, a profile of movement of the dynamic object can be determined in the sequence of images, such as by fitting a curve to pixels associated with the dynamic object across the sequence of images. A predicted trajectory can be determined based on an expected motion or velocity of the dynamic object based on the type of the dynamic object. For example, an expected velocity or range of velocities can be determined that are associated with a type of dynamic object (e.g., a fixed wing aircraft, a rotary wing aircraft, a bird, a hot air balloon).

In some implementations, at least one of dynamic object information or a 3D world model based on motion data can be scaled or updated based on motion data. For example, motion data (e.g., GPS data, velocity information) can be used to determine an absolute distance between a pair of images of the sequences of images. Based on the absolute distance, a length of features within each image, such as a length of features or visual characteristics of dynamic objects, or a distance between dynamic objects, can be measured.

At block 2030, a previous path of the dynamic object can be determined based on the movement of the pixel representing the dynamic object across the plurality of images. Once a pixel being tracked is identified as corresponding to a dynamic object, the visual situational awareness system can determine a path of the dynamic object. The path of the dynamic object can be used to determine the future trajectory of the dynamic object. In some implementations, the path of the dynamic object can be determined by tracking the movement of the pixel corresponding to the dynamic object across the stream of images to determine a speed at which the pixel is travelling and a direction the pixel is moving. In some implementations, the path of the pixel can be used to determine a distance of the object from the movable entity, such as the vehicle.

At block 2035, a predicted trajectory of the dynamic object can be determined based on the type of the dynamic object, the absolute distance and the previous path travelled by the dynamic object. For example, a current velocity (e.g., speed and heading) of the movable entity can be used to predict a future location of the movable entity. In some implementations, a predicted maneuver can be extracted from a plurality of past motion data (e.g., a plurality of past positions and/or velocities). Based on the plurality of past motion data, a maneuver being performed by the movable entity can be predicted, estimated, or determined (e.g., a turn). The trajectory of the movable entity can be determined such that the movable entity follows a path expected to complete the predicted maneuver. In some implementations, a plurality of known maneuvers associated with types of dynamic objects can be stored in a database, and a lookup can be performed in the database to identify known maneuvers associated with the movable entity, compare the plurality of past motion data to the known maneuvers, and determine a match in order to determine a predicted maneuver. In some implementations, the predicted trajectory of one or more dynamic objects can be based on the previous locations of the dynamic objects in the 3D world map. In some implementations, the predicted trajectory can be based on the movement of the one or more tracked pixels representing each dynamic object across a plurality of previous images to determine the path the dynamic object previously was on, which can be used to then predict the further trajectory of the dynamic object.

In some implementations, a collision can be predicted or estimated based on the predicted trajectory of the dynamic object and the trajectory of the movable entity. For example, a determination can be made whether an intersection will occur (e.g., to a degree of certainty) between the predicted trajectory of the dynamic object and the trajectory of the movable entity. An alert can be generated and transmitted to indicate the potential collision and/or a control instruction configured to alter the trajectory of the movable entity to avoid the collision.

H. Systems and Methods for Collision Avoidance

Figure 21:
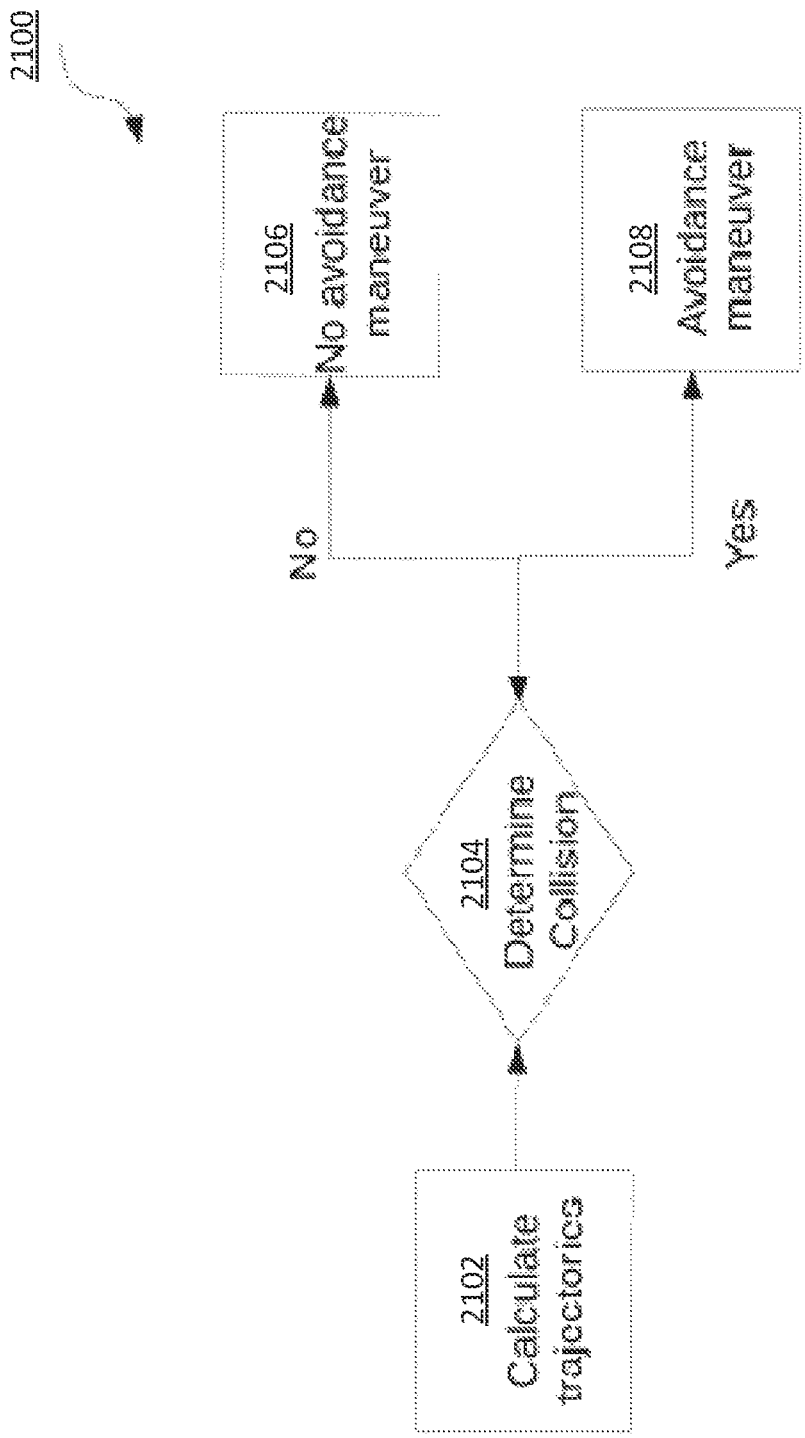
FIG. 21 is a flowchart depicting an overview for determining if collision avoidance instructions are needed, according to a non-limiting embodiment.

FIG. 21 is a flowchart depicting a method 2100 for making a collision avoidance instruction to a control system, according to a non-limiting embodiment. It is to be emphasized, however, that method 2100 need not be performed in the exact sequence as shown, hence the elements of method 2100 are referred to herein as "blocks" rather than "steps".

Referring also to the collision avoidance manager 835 of FIG. 8, at block 2102, the collision avoidance manager 835 can identify, receive, calculate or otherwise determine the trajectory of the vehicle, the one or more dynamic objects identified by the real-time visual situational awareness system 800. In addition, the collision avoidance manager 835 can identify locations of various static objects identified from the images to generate the 3D world model. The collision avoidance manager 835 or the trajectory manager 830 can calculate, for each of the dynamic objects identified, a trajectory of the dynamic object. The trajectory of the dynamic objects can be used to identify a location at which each of the dynamic objects will be at any given time.

The collision avoidance manager 835 can further determine locations at which the vehicle will be within the 3D world map based on a current velocity and acceleration of the vehicle. In some implementations, the collision avoidance manager 835 can determine the locations at which the vehicle will be at various points in time based on a preplanned route the vehicle is programmed to follow.

The collision avoidance manager 835 can be configured to generate updated 3D world maps that populate the position of the various dynamic objects relative to the vehicle over a period of time based on the predicted trajectories of dynamic objects. In addition, the location of various static objects are also updated to reflect their position relative to the vehicle as the vehicle moves along its trajectory.

At block 2104, the collision avoidance manager 835 can determine whether a collision between the vehicle and an object is imminent. In some implementations, the collision avoidance manager 835 can determine whether a collision is imminent based on the relative positions of the vehicle and one or more of the static or dynamic objects based on the pixel positions these objects will move to at various points in time.

At block 2106, if the collision avoidance manager 835 determines that there is no collision imminent, no avoidance maneuver is instructed. In some implementations, the collision avoidance manager 835 may periodically check to see if the trajectory of the vehicle is intersecting a trajectory of a dynamic object or if the trajectory of the vehicle is intersecting a static object. In some implementations, the collision avoidance manager 835 may compute, responsive to determining that the trajectory of the vehicle is likely to collide with another object if the vehicle continues to follow its trajectory, a distance from the obstacle (dynamic object or static object with which it is going to have a collision with).

The collision avoidance manager 835 can determine an absolute distance from the object or the projected path of a dynamic object based on the 3D model, which is based on the velocity at which the vehicle is travelling. In some implementations, the collision avoidance manager 835 may determine that the distance from the obstacle exceeds a minimum threshold and as a result, may determine to not perform an avoidance maneuver at that instant.

In some implementations, the collision avoidance manager 835 may further be determined to compute a predicted change in the distance from the obstacle over a time period based on the trajectory of the vehicle as well as the trajectory of the obstacle and compute a length of time, based on the current and future speed of the vehicle, from the instant after which the collision will occur if no action is taken.

The collision avoidance manager 835 can determine, based on the length of time, whether to execute an avoidance maneuver. If the collision avoidance manager determines that the length of time is greater than a threshold amount of time, the collision avoidance manager 835 can take no avoidance maneuver (2106). However, if the collision avoidance manager determines that the length of time is less than a threshold amount of time, the collision avoidance manager 835 can generate an instruction to perform a collision avoidance maneuver (2108). In some implementations, the collision avoidance manager can be configured to generate an alert to the vehicle or an operator of the vehicle indicating an imminent collision and can vary the intensity of the alert as the amount of time approaches the threshold amount of time. Once the amount of time reaches or is less than the threshold amount of time, the collision avoidance manager 835 can generate an instruction to cause the vehicle to maneuver such that the vehicle and the obstacle are no longer going to collide. The maneuver can include a change in direction or orientation, a change in speed, or both. In some implementations, the collision avoidance maneuver can be determined in part with reference to a set of standard right-of-way rules. In some implementations, the collision avoidance maneuver can be based on an alternate route of the vehicle. In some implementations, the collision avoidance maneuver can be an instruction to land, loiter, circle or deploy a parachute (to reduce speed or adjust altitude, incline or decline), among others.

Figure 26:
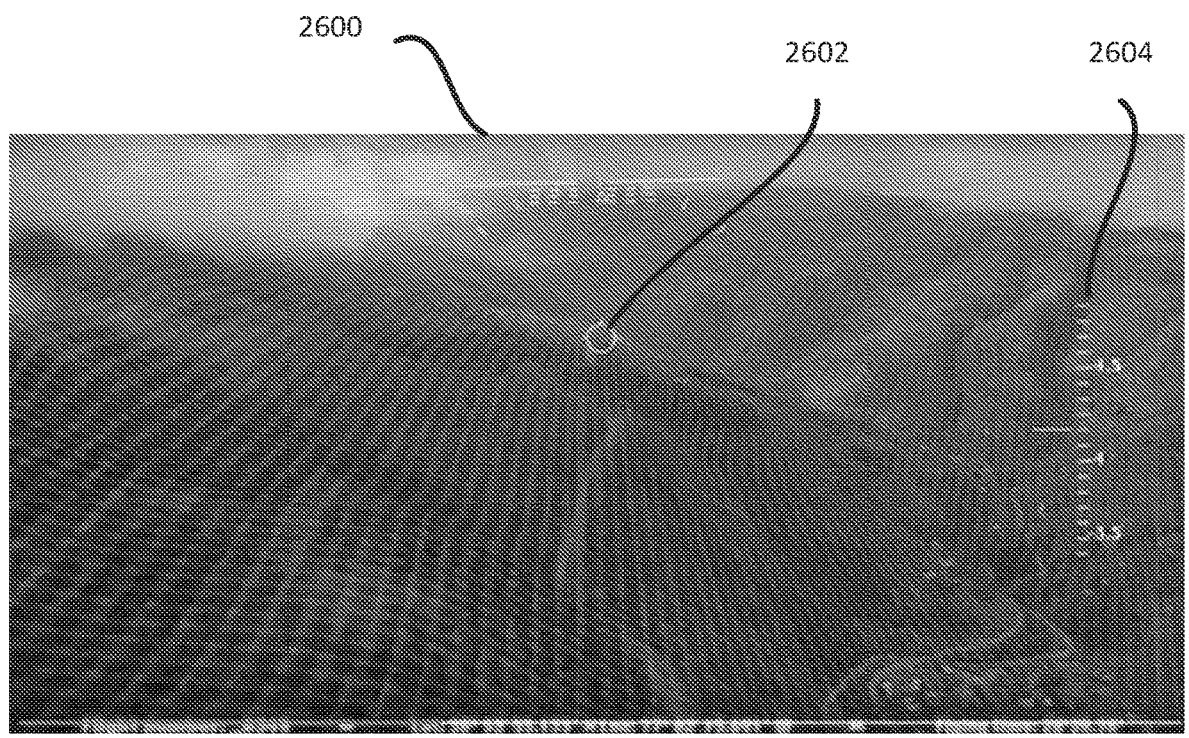
FIG. 26 is an image of an environment identifying points of interest in a terrain and a target indicator indicating a location towards which the movable entity is travelling, according to a non-limiting embodiment.

FIG. 26 is an image 2600 of an environment identifying points of interest in a terrain and a target indicator indicating a location towards which the movable entity is travelling, according to a non-limiting embodiment. The real-time visual situational awareness system 800 can recognize objects or scenery from the image and provide a visual indicator indicating the terrain in the environment. The real-time visual situational awareness system 800 can also provide a visual indicator indicating a position to which the movable entity is approaching. The size of the visual indicator can represent a potential collision object that the vehicle is potentially going to collide with if it continues on the same trajectory. The size of visual indicator be based on a distance from the potential collision object.

Figure 27A:
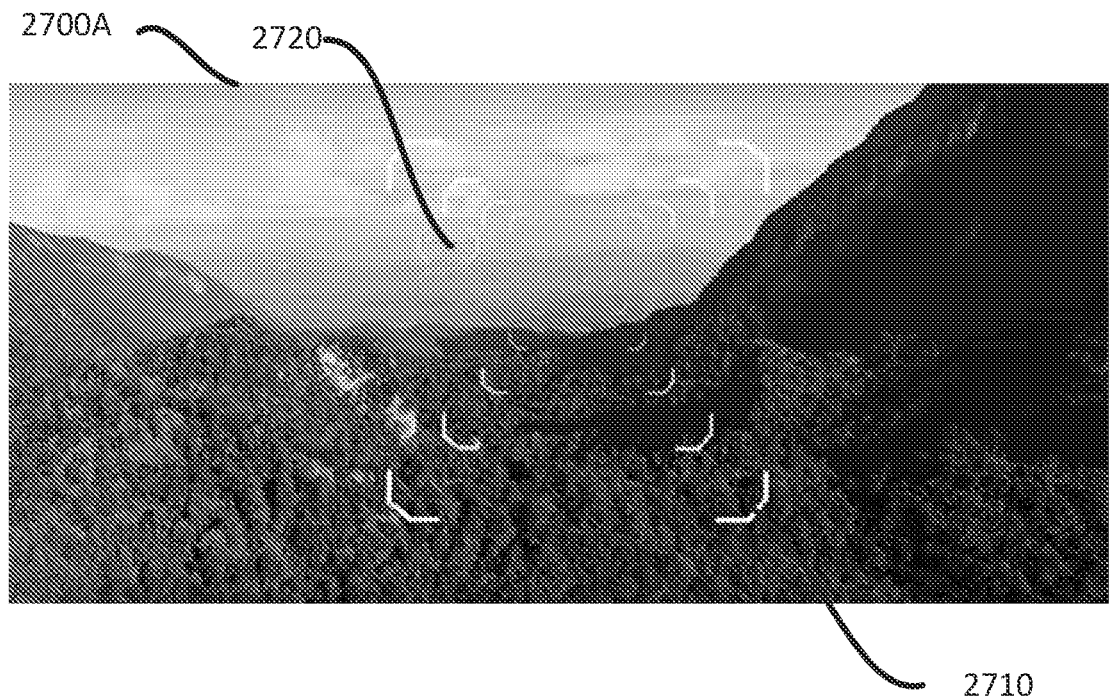
FIGS. 27A and 27B are images of an environment including a dynamic object and including a collision avoidance zone indicator indicating a zone within which dynamic objects will be classified as potential threats, according to a non-limiting embodiment.
Figure 27B:
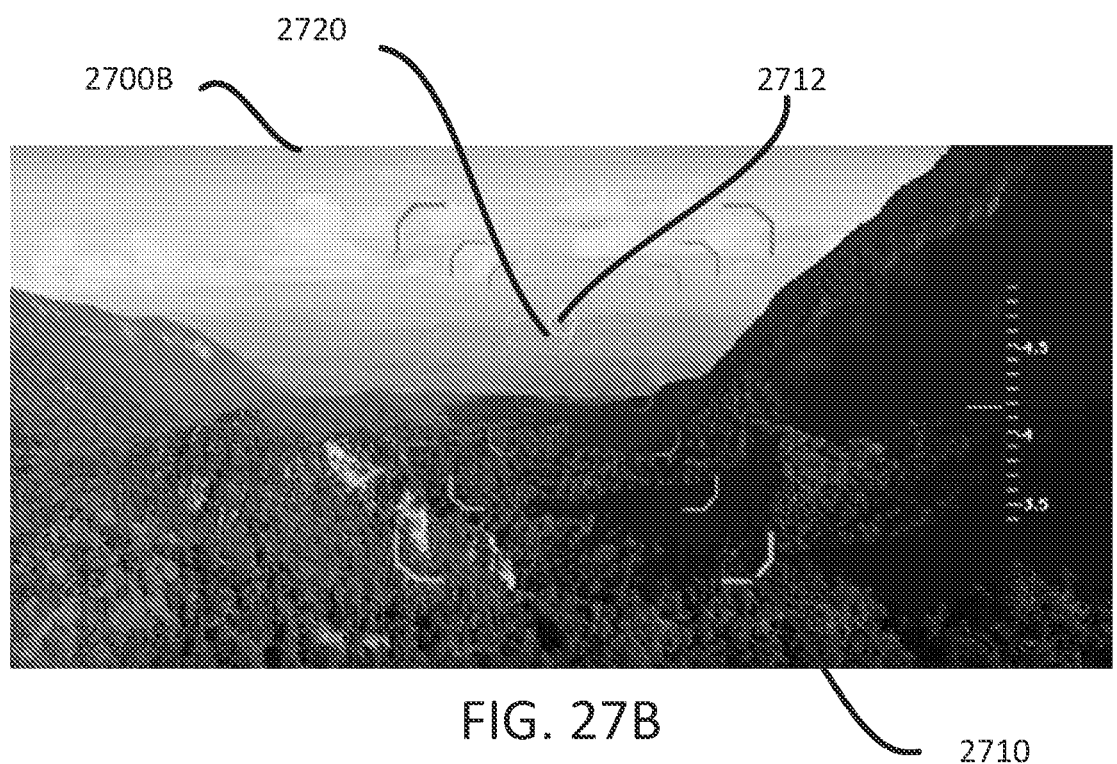

FIG. 27A is an image 2700A of an environment captured by a camera of a vehicle captured at a first time from a first position. FIG. 27B is an image 2700B of the same scene captured at a second time subsequent to the first time from the same camera from a new position of the camera of the vehicle based on the path travelled by the first image. The real-time situational awareness system 800 can provide, for display, a visual indicator 2710 indicating a path the vehicle is heading in. The visual indicator can represent an area within which objects entering the area may be identified or classified as potential collision objects. As the vehicle gets closer to the potential collision object within the area represented by the visual indicator, the visual indicator may change color, size, or shape to indicate that there is a collision likely to occur. In some implementations, the area defined by the visual indicator can be a collision avoidance zone indicator indicating a zone within which dynamic objects will be classified as potential threats. As shown in FIG. 2700B, the dynamic object 2720 is a potential threat and the real-time visual situational awareness system 800 may provide a visual indicator 2712 representing the potential threat. As the visual indicator 2712 enters the collision avoidance zone, the real-time visual situational awareness system 800 may generate an alert or notification indicating a likely collision.

Figure 28A:
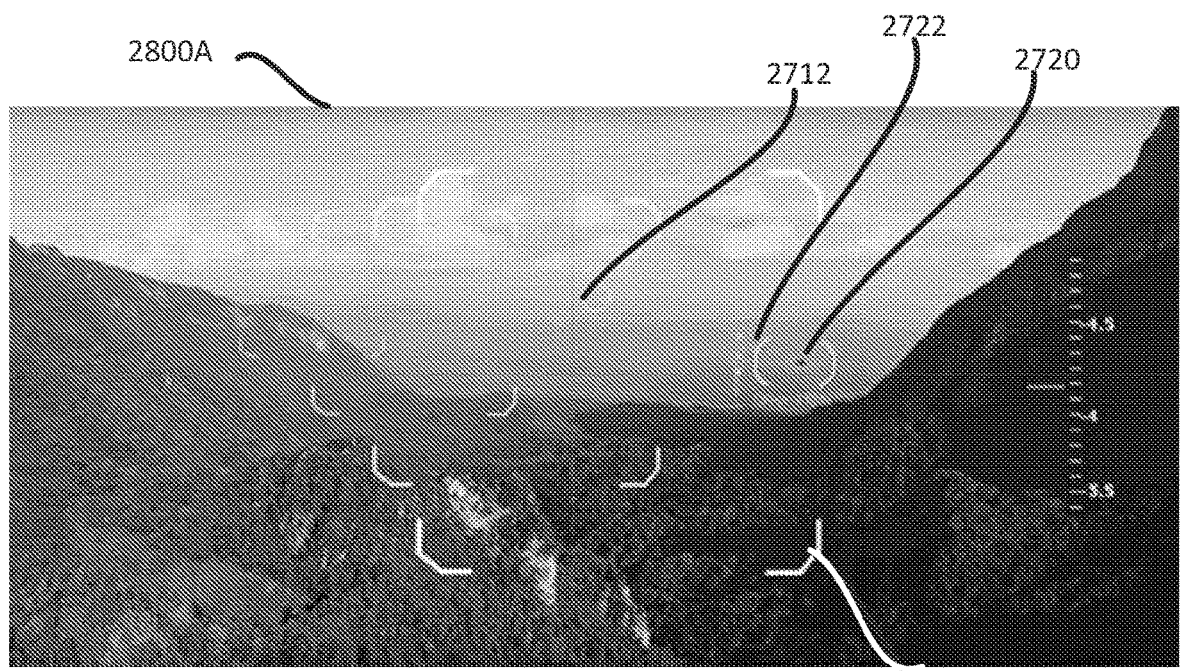
FIGS. 28A and 28B are images of an environment including a dynamic collision avoidance zone indicator indicating a zone within which dynamic objects will be classified as potential threats, according to a non-limiting embodiment.
Figure 28B:
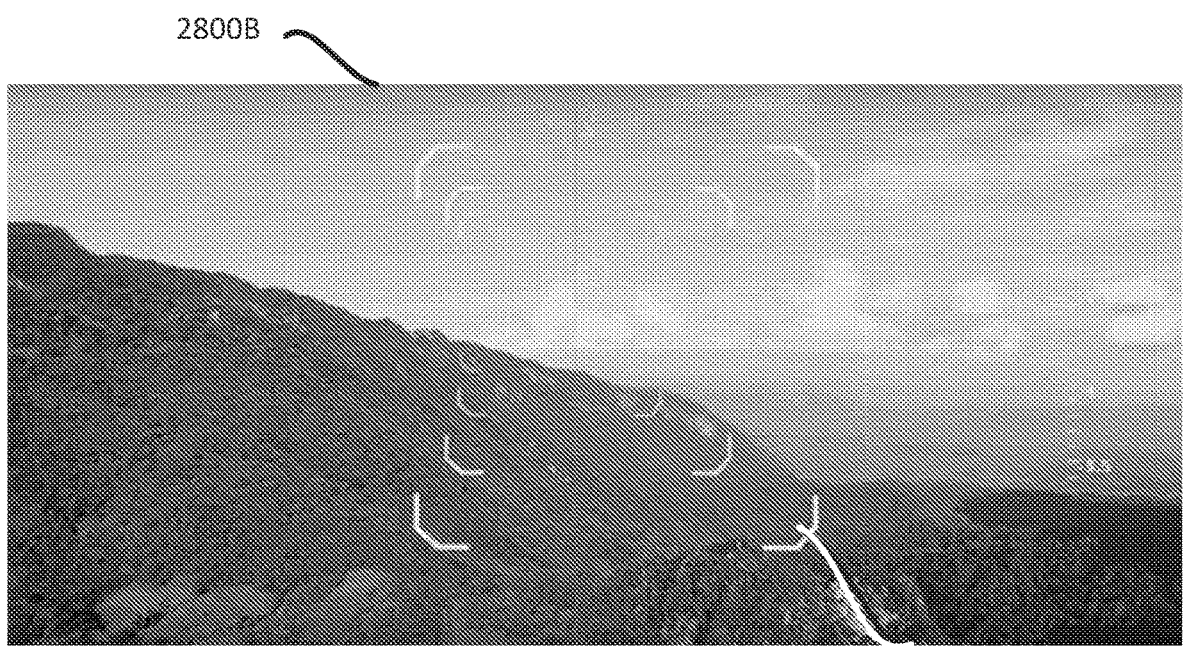

FIGS. 28A and 28B are images 2800A-B of an environment including a dynamic collision avoidance zone indicator indicating a zone within which dynamic objects will be classified as potential threats. In FIG. 28A, the vehicle is making a turn and as a result, the collision avoidance zone indicator 2710 is extending from right to left on the image corresponding to the direction of travel of the vehicle. The collision avoidance zone indicator can be based on control signals received from a control system of the vehicle indicating a direction the vehicle is heading towards. In FIG. 28A, a dynamic object 2720 is outside the central area of the collision avoidance zone indicator 2710. Referring now to FIG. 28B, the image 2800B is taken subsequent to image 2800A and the collision avoidance zone indicator is no longer extending from right to left on the image as the vehicle is now travelling straight.

Figure 29A:
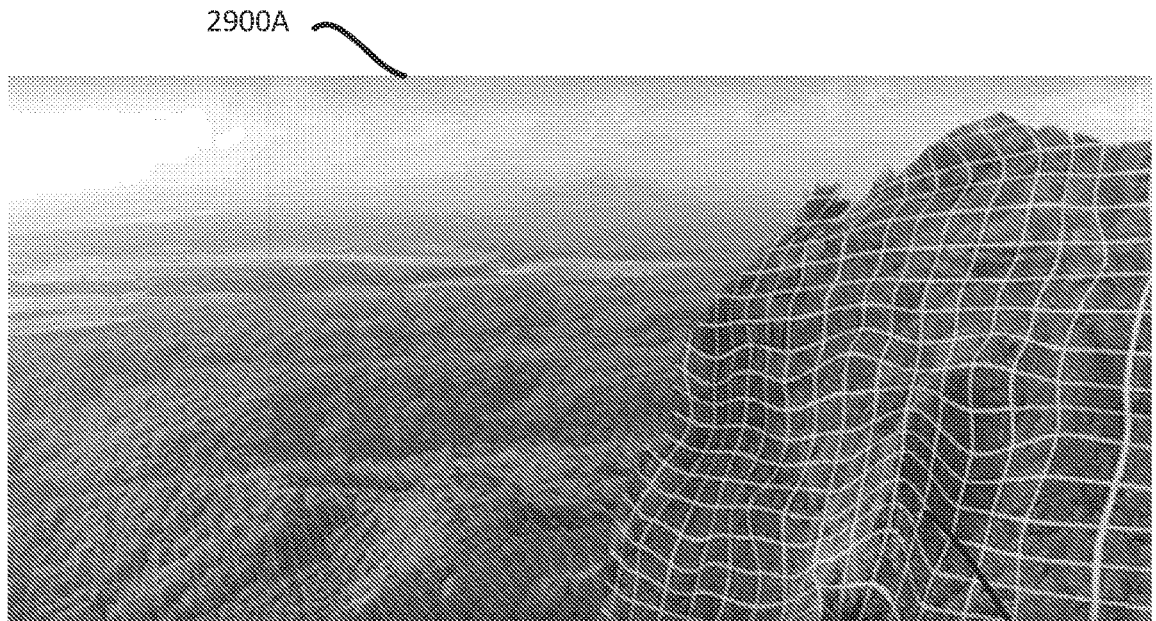
FIGS. 29A and 29B are images of an environment including a static object identifier that changes color as the trajectory of the movable entity approaches the static object, according to a non-limiting embodiment.
Figure 29B:
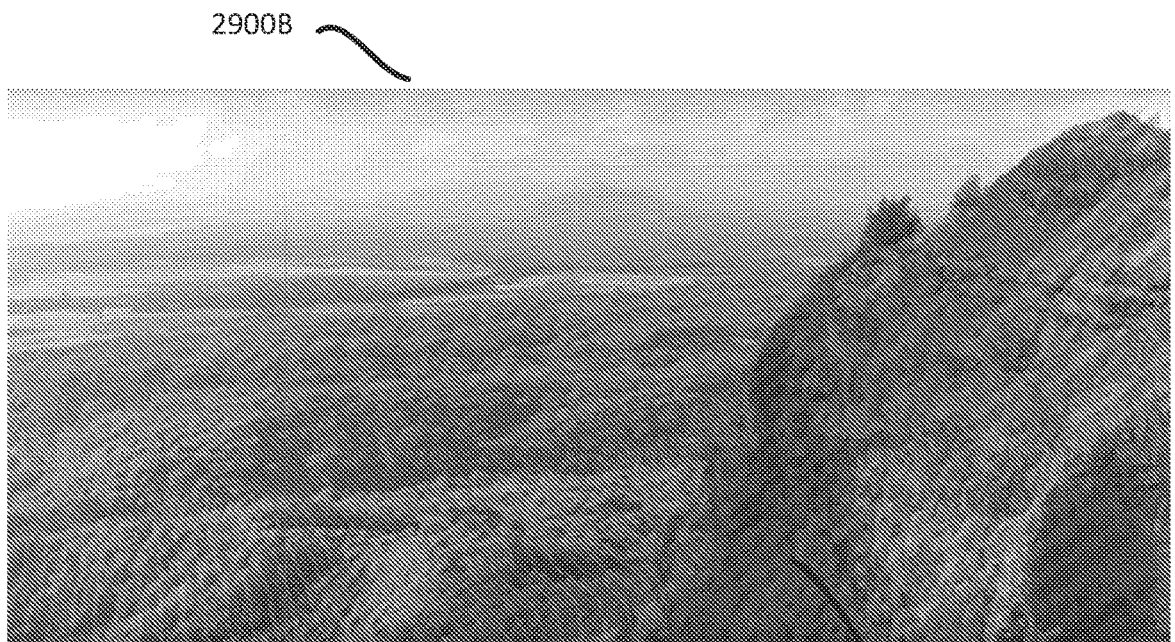

FIGS. 29A and 29B are images 2900A-B of an environment including a static object identifier that changes color as the trajectory of the movable entity approaches the static object, according to a non-limiting embodiment. In FIG. 29A, the vehicle is at a first distance away from the object 2910. In FIG. 29B, the vehicle is now closer to the object (as the object appears larger) relative to FIG. 29B. The collision avoidance manager can be configured to provide a visual indicator 2915 on the portion of the object 2910 with which the vehicle will collide as the vehicle reaches a certain distance from the object. The visual indicator can be lines of a certain color, but can be represented on the object or adjacent to the object to draw the attention of a user to the object. In some implementations, the indicator can be an auditory indicator. In some implementations, the indicator can be a haptic indicator. In some implementations, the indicator can be a combination of visual, audio and even haptic. IT should be appreciated that any of the indicators described herein can include any combination of visual, audio and haptic.

Figure 30:
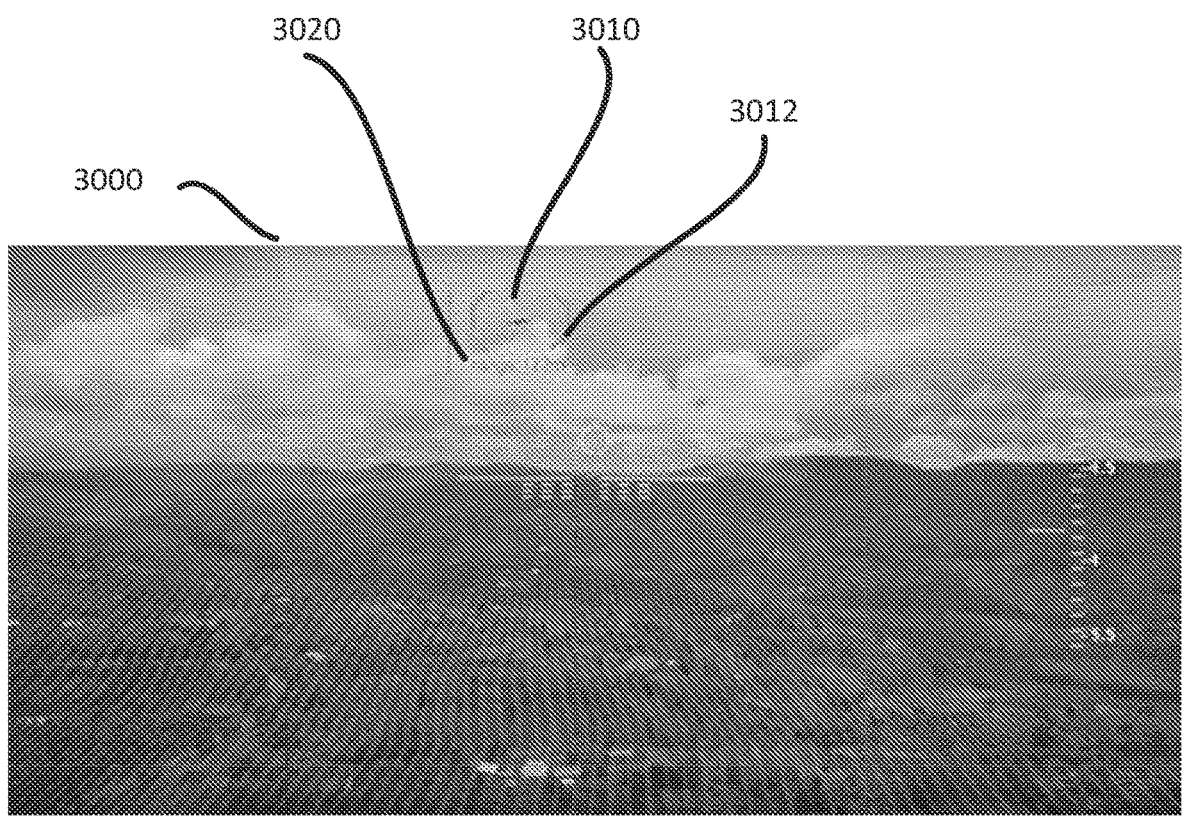
FIG. 30 is an image of an environment identifying a dynamic object and a range indicator indicating a distance of the dynamic object from the movable entity, according to a non-limiting embodiment.

FIG. 30 is an image 3000 of an environment identifying a dynamic object and a range indicator indicating a distance of the dynamic object from the movable entity, according to a non-limiting embodiment. The real-time visual situational awareness system 800 can be configured to display an indicator identifying a dynamic object 3010 identified by the dynamic object identifier and can also display a distance indicator 3020 indicating a distance between the vehicle and the dynamic object 3010. Details of how the distance is calculated are provided throughout the disclosure.

Figure 22:
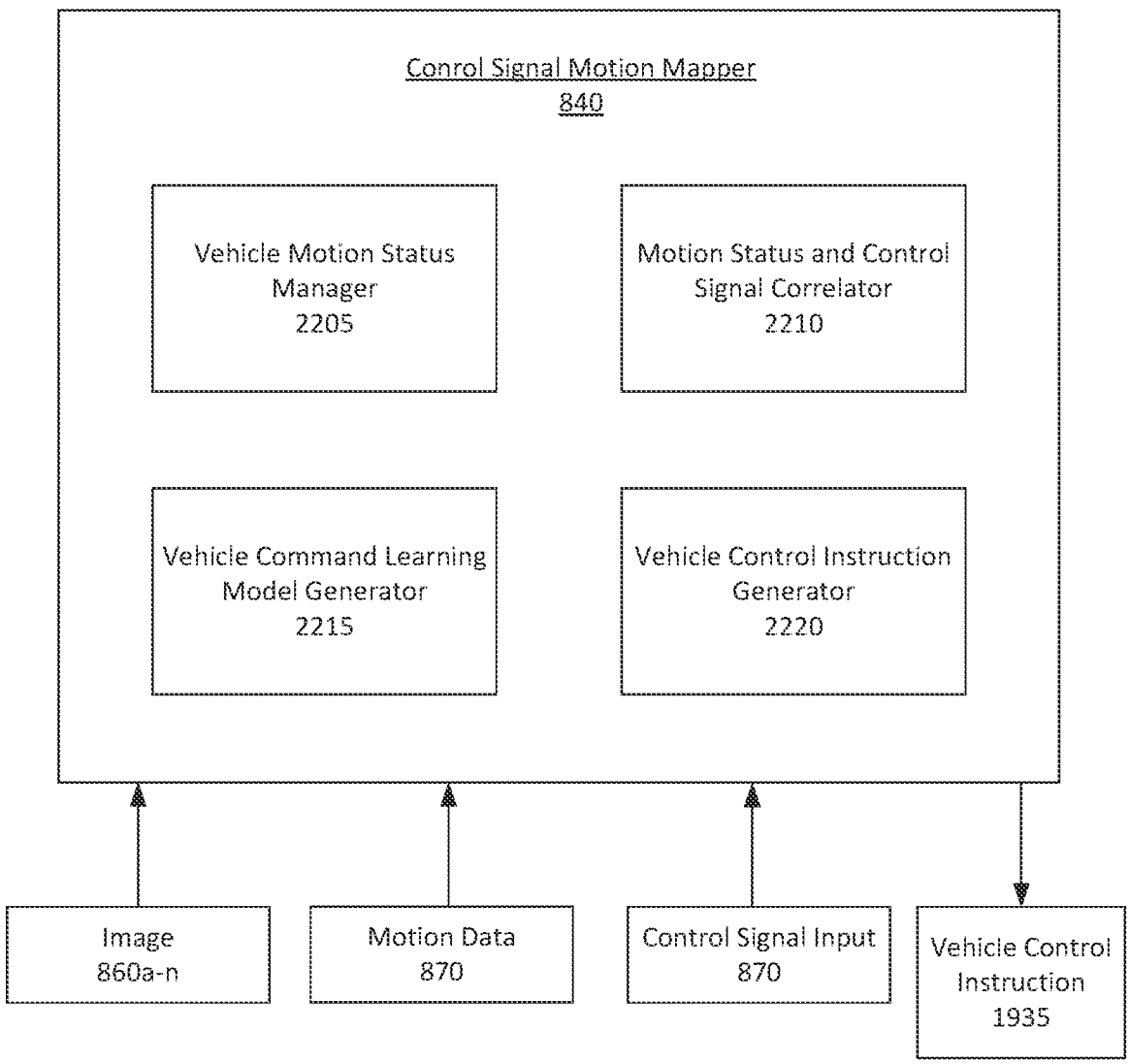
FIG. 22 is a block diagram depicting components of a control signal motion mapper used in the real time visual situational awareness system shown in FIG. 8, according to a non-limiting embodiment.

I. Systems and Methods for Mapping Control Signals to Vehicle Motion Based on Image Data FIG. 22 is a block diagram depicting components of an control signal motion mapper 840 used in the real time visual situational awareness system shown in FIG. 8, according to a non-limiting embodiment. The control signal motion mapper 840 can include a vehicle motion status manager 2205, a motion status and control signal correlator 2210, a vehicle command learning model generator 2215, and a vehicle control instruction generator 2220. The vehicle motion status manager 2205, motion status and control signal correlator 2210, vehicle command learning model generator 2215, and vehicle control instruction generator 2220 can include or execute at least one computer program or at least one script, and can include combinations of software and hardware, such as one or more processors configured to execute one or more scripts. Where the control signal motion mapper 840 is tasked with or configured to perform similar functions as described with reference to the 3D world map manager 815, the dynamic object identifier 820, the situational awareness manager 825, the trajectory manager 830, or the collision avoidance manager 835, the control signal motion mapper 840 can include or be configured to execute similar routines, modules, programs, or scripts as those other components. The trajectory manager 830 can receive the sequence of images 860*a-n*, one or more dynamic objects from the dynamic object identifier 820, and motion data 870.

The vehicle motion status manager 2205 is configured to identify control data sent to a vehicle drive system via an interface with the control system of the vehicle. For example, the control signal motion mapper 840 can receive a control signal input 875. The control signal input 875 can indicate control data sent to the vehicle drive system. The control data can include or indicate instructions for controlling operation of the vehicle, such as autopilot or other motion or maneuvering instructions. In some implementations, the control data is represented by a software driver in a motion controller language (e.g., hardware-specific instructions), and the control signal motion mapper 840 is configured to parse the motion controller language to identify the control data. In some implementations, the control data is represented at an application level by an application programming interface (e.g., hardware-independent instructions), and the control signal motion mapper 840 is configured to receive the control data via functions of the application programming interface exposed to the control signal motion mapper 840. In some implementations, the control signal motion mapper 840 is configured to receive the control data as hardware-specific instructions such as voltages required to cause targeted actions, and the control signal motion mapper 840 is configured to apply a motion control algorithm based on known properties of the control system of the vehicle to determine the original control instructions (e.g., detect a 10 V control signal to the accelerator and determine that the control instructions indicated an acceleration of 80 percent maximum acceleration). In some implementations, the vehicle motion status manager 2205 is configured to identify a control scheme based on the control signal input 875. For example, the vehicle motion status manager 2205 can determine that the control signal input 875 indicates a pulse width modulation scheme or other scheme composed of a plurality of electrical signals, and record the control scheme.

In some implementations, the vehicle motion status manager 2205 is configured to identify the control data independent of the vehicle hardware. For example, the vehicle motion status manager 2205 may only receive control signals in the form of hardware-specific instructions such as voltages to be applied to components, where the properties of those components are unknown. The vehicle motion status manager 2205 can store the control signals as being mapped to particular components and, as will be described herein, estimate, interpolate, learn, or otherwise determine the associated vehicle actions and instructions based on a detected change in position and/or velocity of the vehicle without knowing the properties of the vehicle hardware (e.g., without knowing a relationship between the electrical signal of a control signal and the response of vehicle hardware such as engines, steering wheels, rotors, airfoils, wing control surfaces, etc.). This can enable the control signal motion mapper 840 to map hardware-specific commands to vehicle maneuvers or other outcomes without being provided software drivers or other information indicating how to control the vehicle, which can allow application of the system in a "plug-and-play" manner even if the vehicle hardware information is proprietary or otherwise inaccessible.

The vehicle motion status and control signal correlator 2210 is configured to determine a change in position or velocity of the vehicle. For example, the vehicle motion status and control signal correlator 2210 can analyze the motion data 870 to identify the change in position or velocity. The vehicle motion status and control signal correlator 2210 can also determine the change using or based on a 3D world map generated from the sequence of images 860*a-n* as described herein. For example, the vehicle motion status and control signal correlator 2210 can identify motion of points of interest in the 3D world map (which are captured by the image capture device from the frame of reference of the vehicle) and determine the change in position or velocity based on the change in frame of reference of the vehicle.

The vehicle motion status and control signal correlator 2210 can map the change in position or velocity of the vehicle to the received control data. For example, the vehicle motion status and control signal correlator 2210 can associate time points or time stamps of the change in position or velocity with time points or time stamps of the received control data. In some implementations, the vehicle motion status and control signal correlator 2210 is configured to apply a time delay to the control data prior to associating the control data to the change in position or velocity. For example, the vehicle motion status and control signal correlator 2210 can determine that a signal delay occurs between a first point in time at which the control data is received and a second point in time at which the change in position or velocity occurs. In some implementations, the time delay is predetermined (e.g., by calibrating the control signal motion mapper 840). In some implementations, the vehicle motion status and control signal correlator 2210 is configured to discretize the control data and associate the discretized control data with the change in position or velocity. For example, the vehicle motion status and control signal correlator 2210 can determine that the control data indicates an instruction over a first duration of time (e.g., constantly accelerate at 50 percent of maximum acceleration for 3 seconds), that the change in position or velocity is mapped over a second duration of time (e.g., the vehicle is at a first position at time zero seconds, a second position at time 0.1 seconds, a third position at time 0.2 seconds, through an nth position at time 3 seconds), and associate the acceleration at each time point to the change in position or velocity.

In some implementations, the vehicle motion status and control signal correlator 2210 is configured to map the change in position or velocity (e.g., a known change in position or velocity) to the received control data based on an expected maneuver. For example, the vehicle motion status and control signal correlator 2210 can execute a motion detection algorithm based on the received control data to estimate an expected maneuver (e.g., a control signal may be expected to indicate acceleration at 50 percent for 2 seconds), determine an expected change in position or velocity based on the expected maneuver (e.g., execute a vehicle load algorithm to estimate an increase in velocity expected based on the acceleration at 50 percent for 2 seconds), and compare the expected change in position or velocity to the known change in position or velocity. Based on a difference between the expected change and the known change, the vehicle motion status and control signal correlator 2210 can calibrate the mapping to account for the difference.

The control signal motion mapper 840 (or another component of the system 800) is configured to determine a condition to maneuver the vehicle. For example, the vehicle command learning model generator 2215 can receive an indication of a condition (e.g., receive an indication of an altitude, current speed, distance to destination, distance to a leader or follower vehicle, distance to a dynamic object) and record the resulting maneuver performed by the vehicle based on the control data and/or change in position or velocity. The conditions may be stored in a database and associated with maneuvers. In some implementations, the conditions may be stored and associated with types of dynamic objects. In some implementations, the conditions may be categorized according to types of dynamic objects, types of conditions (e.g., known object in environment, unknown object in environment, position of vehicle relative to environment). The conditions may be stored with a confidence level indicating a confidence that a particular condition correlates to a particular maneuver, which can facilitate decision-making for executing the same maneuver to respond to the same condition.

In some implementations, the vehicle command learning model generator 2215 is configured to map control instructions to a change in position or velocity independent of the vehicle hardware. For example, the vehicle command learning model generator 2215 can receive hardware-specific control instructions (e.g., a voltage to be applied to a component, a control scheme including a plurality of electrical signals such as a pulse width modulation scheme) and associate the hardware-specific control instructions with the change in position or velocity. As such, the vehicle command learning model generator 2215 can learn that a particular control scheme (e.g., apply a voltage of 10 V for 3 seconds to a first component) corresponds to a particular vehicle maneuver (e.g., accelerate at 80 percent maximum acceleration for 3 seconds) without knowing the underlying functionality of the vehicle hardware or the vehicle motion controller. In some implementations, the control instructions are mapped and stored in a database. In some implementation, the control instructions are associated with conditions during which the maneuvers (e.g., changes in position and/or velocity) occurred that took place at the same time as the control instructions were received.

The vehicle control instruction generator 2220 is configured to generate control instructions to maneuver the vehicle. For example, given a mapping of control instructions to a change in position or velocity, the vehicle control instruction generator 2220 can generate a control signal (e.g., an electrical signal having a particular voltage, a pulse width modulation scheme) configured to cause a desired change in position or velocity.

The vehicle control instruction generator 2220 can generate control instructions to maneuver the vehicle responsive to determining the condition (e.g., determining that a dynamic object is on a collision course with the vehicle). For example, the vehicle control instruction generator 2220 can retrieve control instructions associated with a maneuver that the system 800 learned to have taken place in response to the same or a similar condition. The vehicle control instruction generator 2220 can retrieve control instructions from the various databases described herein based on conditions (e.g., given a known or expected condition, the vehicle control instruction generator 2220 can retrieve an expected maneuver to be used to respond to the condition).

The vehicle control instruction generator 2220 can transmit the control instructions to the control system of the vehicle via the interface. For example, the vehicle control instruction generator 2220 can output an electrical signal corresponding to the control instructions via the interface. In some implementations, the vehicle control instruction generator 2220 is configured to selectively output the control instructions based on a decision confidence. For example, when retrieving the control instructions from a database, the vehicle control instruction generator 2220 can determine a confidence by which the maneuver indicated by the control instructions is expected to be an appropriate solution to the condition (e.g., based on stored confidence values when the maneuver is mapped to the condition in the database, such as confidence values regarding whether the condition existed and/or whether the maneuver was performed responsive to the condition). The vehicle control instruction generator 2220 can transmit the control instructions responsive to determining that the decision confidence is greater than a threshold value. The threshold value can be a predetermined value. The threshold value can be adapted to the vehicle and/or the vehicle condition or a condition in an environment about the vehicle.

Figure 23:
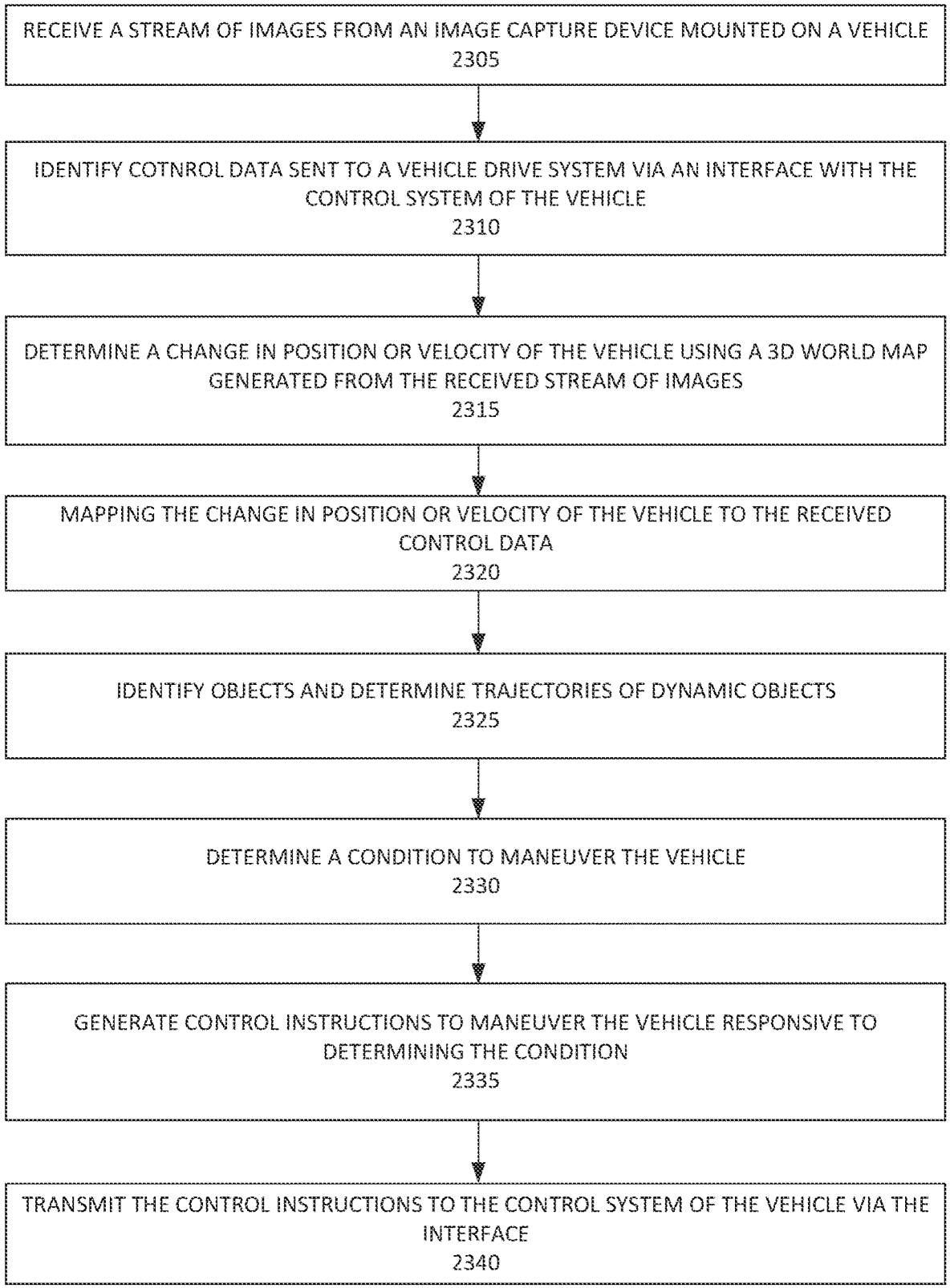
FIG. 23 is a flowchart for mapping control signals to vehicle motion, according to a non-limiting embodiment.

FIG. 23 is a flowchart for mapping control signals to vehicle motion, according to a non-limiting embodiment. It is to be emphasized, however, that method 2300 need not be performed in the exact sequence as shown, hence the elements of method 2300 are referred to herein as "blocks" rather than "steps".

At block 2305, a stream or sequence of images is received by a computing device including one or more processors, from an image capture device mounted on a vehicle. In some implementations, the images can be captured by multiple cameras. In some implementations, each of the sequence images can be captured by multiple cameras and individual images from the multiple cameras can be stitched or merged together to form the sequence image. It should be appreciated that other methods described herein with respect to FIGS. 9-23 may each utilize multiple cameras and merge or stitch images from the multiple cameras to form single images that together are the basis for the sequence of images.

At block 2310, control data sent to a vehicle drive system from a control system of the vehicle via an interface between the computing device and the control system of the vehicle is identified by the computing device. For example, a control signal input can be received. The control signal input can indicate control data sent to the vehicle drive system. The control data can include or indicate instructions for controlling operation of the vehicle, such as autopilot or other motion or maneuvering instructions. In some implementations, the control data is represented by a software driver in a motion controller language as a script (e.g., hardware-specific instructions), and the script in the motion controller language is parsed to identify the control data. In some implementations, the control data is represented at an application level by an application programming interface (e.g., hardware-independent instructions), and the control data is received via functions of the application programming interface that are exposed to the computing device. In some implementations, the control data is received as hardware-specific instructions such as voltages required to cause targeted actions, and a motion control algorithm is applied based on known properties of the control system of the vehicle to determine the original control instructions (e.g., detect a 10 V control signal to the accelerator and determine that the control instructions indicated an acceleration of 80 percent maximum acceleration). In some implementations, a control scheme is identified based on the control signal input. For example, the control signal input can be determined to indicate a pulse width modulation scheme or other scheme composed of a plurality of electrical signals, and record the control scheme.

In some implementations, the control data is identified independent of the vehicle hardware. For example, control signals may only be received in the form of hardware-specific instructions such as voltages to be applied to components, where the properties of those components are unknown. The control signals can be stored as being mapped to particular components and, as will be described herein, the computing device can estimate, interpolate, learn, or otherwise determine the associated vehicle actions and instructions based on a detected change in position and/or velocity of the vehicle without knowing the properties of the vehicle hardware (e.g., without knowing a relationship between the electrical signal of a control signal and the response of vehicle hardware such as engines, steering wheels, rotors, airfoils, wing control surfaces, etc.). This can enable the hardware-specific commands to be mapped to vehicle maneuvers or other outcomes without being provided software drivers or other information indicating how to control the vehicle, which can allow a "plug-and-play" implementation even if the vehicle hardware information is proprietary or otherwise inaccessible.

At block 2315, a change in a position or velocity of the vehicle using a 3D world map generated from the received stream of images is determined by the computing device. For example, the motion data can be analyzed to identify the change in position or velocity. The change can also be determined using or based on a 3D world map generated from the sequence of images as described herein. For example, motion of points of interest can be identified in the 3D world map (which are captured by the image capture device from the frame of reference of the vehicle) and the change in position or velocity determined based on the change in frame of reference of the vehicle.

At block 2320 the change in position or velocity of the vehicle can be mapped to the received control data. For example, the time points or time stamps of the change in position or velocity can be associated with time points or time stamps of the received control data. In some implementations, a time delay can be applied to the control data prior to associating the control data to the change in position or velocity. For example, a signal delay can be determined to occur between a first point in time at which the control data is received and a second point in time at which the change in position or velocity occurs. In some implementations, the time delay is predetermined (e.g., by calibrating the computing device). In some implementations, the control data is modified or discretized, and associated with the change in position or velocity. For example, the control data can be determined to indicate an instruction over a first duration of time (e.g., constantly accelerate at 50 percent of maximum acceleration for 3 seconds), that the change in position or velocity is mapped over a second duration of time (e.g., the vehicle is at a first position at time zero seconds, a second position at time 0.1 seconds, a third position at time 0.2 seconds, through an nth position at time 3 seconds), and associate the acceleration at each time point to the change in position or velocity.

At block 2325, static objects and dynamic objects that appear within one or more images of the stream of images can be identified and the predicted trajectories of dynamic objects can be determined. Using the dynamic object identifier of the visual situational awareness system, the visual situational awareness system can identify one or more pixels that correspond to dynamic objects based on the movement of the pixels across the stream of images. Details of dynamic object detection are provided above. Once a pixel corresponding to a dynamic object is identified, the type of dynamic object is determined and a predicted trajectory of the dynamic object is determined based on the movement of the pixel across the stream of images. In some implementations, the visual situational awareness system determines this for each of the pixels that correspond to dynamic objects. In some implementations, the trajectories of the dynamic objects may intersect with a trajectory of the vehicle.

At block 2330, a condition to maneuver the vehicle can be determined by the computing device. For example, a motion detection algorithm can be executed based on the received control data to estimate an expected maneuver (e.g., a control signal may be expected to indicate acceleration at 50 percent for 2 seconds), determine an expected change in position or velocity based on the expected maneuver (e.g., execute a vehicle load algorithm to estimate an increase in velocity expected based on the acceleration at 50 percent for 2 seconds), and compare the expected change in position or velocity to the known change in position or velocity. Based on a difference between the expected change and the known change, the mapping can be calibrated to account for the difference.

In some implementations, the condition to maneuver the vehicle can be based on a potential collision with one of a static object or a dynamic object that is moving along a predicted trajectory determined by the visual situational awareness system. In some implementations, the visual situational awareness system can identify one or more dynamic objects from the received stream of images and determine a predicted trajectory based on the type of the dynamic object. The condition can be triggered based on a relative distance between the vehicle and an estimated point of collision. Once the estimated point of collision is less than a threshold distance, the visual situational awareness system can determine to initiate an instruction to maneuver the vehicle.

At block 2335, control instructions are generated by the computing device to maneuver the vehicle responsive to determining the condition. The control instructions can correspond to a particular maneuver, which is determined based on whether the object with which the vehicle is likely to collide is a static object or a dynamic object. In some implementations, the control instructions can correspond to a maneuver that is based on a predicted trajectory of the dynamic object. If the dynamic object is moving from right to left, the control instructions may cause the vehicle to decrease (or increase) the vehicle's altitude or by moving from left to right by a distance sufficient to avoid the collision. For example, an indication of a condition can be received (e.g., receive an indication of an altitude, current speed, distance to destination, distance to a leader or follower vehicle, distance to a dynamic object) and the resulting maneuver performed by the vehicle recorded based on the control data and/or change in position or velocity. The conditions may be stored in a database and associated with maneuvers. In some implementations, the conditions may be stored and associated with types of dynamic objects. In some implementations, the conditions may be categorized according to types of dynamic objects, types of conditions (e.g., known object in environment, unknown object in environment, position of vehicle relative to environment). The conditions may be stored with a confidence level indicating a confidence that a particular condition correlates to a particular maneuver, which can facilitate decision-making for executing the same maneuver to respond to the same condition.

In some implementations, control instructions are mapped to a change in position or velocity independent of the vehicle hardware. For example, hardware-specific control instructions (e.g., a voltage to be applied to a component, a control scheme including a plurality of electrical signals such as a pulse width modulation scheme) can be received and associated with the change in position or velocity. As such a particular control scheme (e.g., apply a voltage of 10 V for 3 seconds to a first component) can be learned or determined to correspond to a particular vehicle maneuver (e.g., accelerate at 80 percent maximum acceleration for 3 seconds) without knowing the underlying functionality of the vehicle hardware or the vehicle motion controller. In some implementations, the control instructions are mapped and stored in a database. In some implementation, the control instructions are associated with conditions during which the maneuvers (e.g., changes in position and/or velocity) occurred that took place at the same time as the control instructions were received.

At block 2340, transmitting, by the computing device, the generated control instructions to the control system of the vehicle via the interface between the computing device and the control system. For example, given a mapping of control instructions to a change in position or velocity, a control signal (e.g., an electrical signal having a particular voltage, a pulse width modulation scheme) configured to cause a desired change in position or velocity can be generated. Control instructions associated with a maneuver that the computing device learned to have taken place in response to the same or a similar condition can be retrieved. The control instructions can be retrieved from the various databases described herein based on conditions (e.g., given a known or expected condition, an expected maneuver to be used to respond to the condition can be retrieved).

The control instructions can be transmitted to the control system of the vehicle via the interface. For example, an electrical signal corresponding to the control instructions can be outputted and transmitted via the interface. In some implementations, the control instructions are selectively outputted based on a decision confidence. For example, when retrieving the control instructions from a database, a confidence can be determined by which the maneuver indicated by the control instructions is expected to be an appropriate solution to the condition (e.g., based on stored confidence values when the maneuver is mapped to the condition in the database, such as confidence values regarding whether the condition existed and/or whether the maneuver was performed responsive to the condition). The control instructions can be transmitted responsive to determining that the decision confidence is greater than a threshold value. The threshold value can be a predetermined value. The threshold value can be adapted to the vehicle and/or the vehicle condition or a condition in an environment about the vehicle.

J. Computing Environment

Figure 24A:
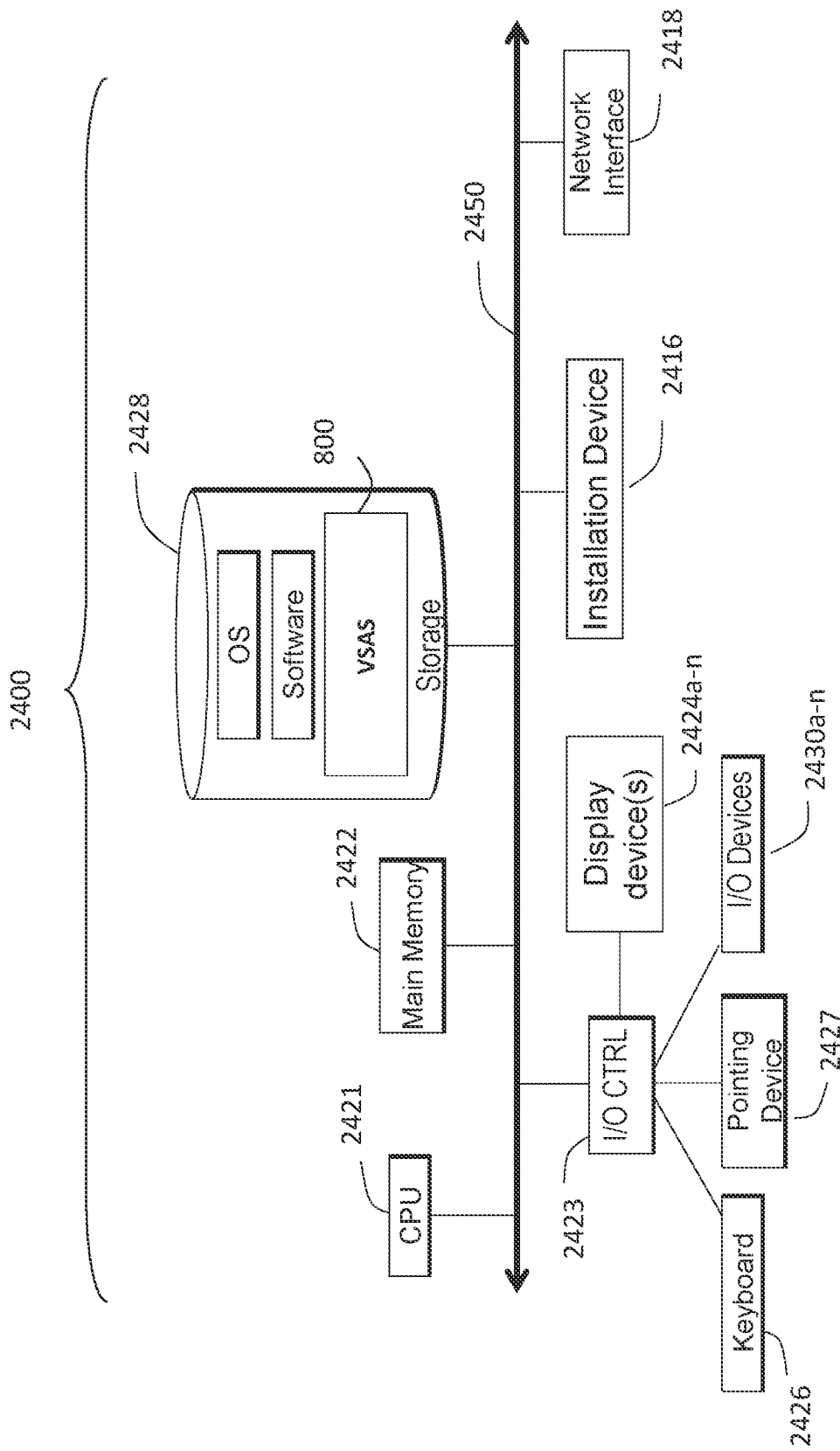
FIGS. 24A and 24B are block diagrams depicting embodiments of computing devices useful in connection with the systems and methods described herein.
Figure 24B:
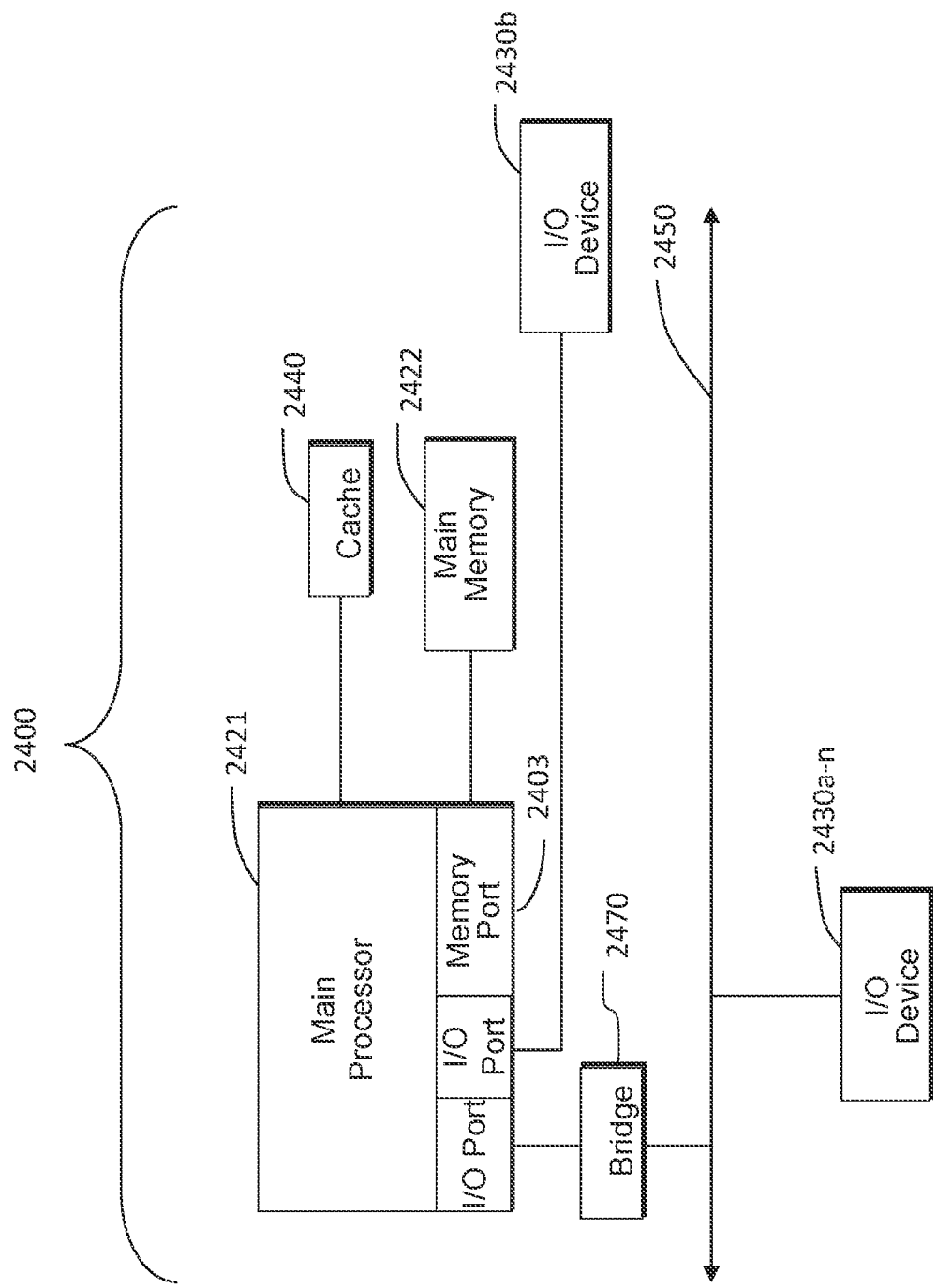

FIGS. 24A and 24B depict block diagrams of a computing device 2400. As shown in FIGS. 24A and 24B, each computing device 2400 includes a central processing unit 2421, and a main memory unit 2422. As shown in FIG. 24A, a computing device 2400 can include a storage device 2428, an installation device 2416, a network interface 2418, an I/O controller 2423, display devices 2424*a*-2424*n*, a keyboard 2426 and a pointing device 2427, e.g. a mouse. The storage device 2428 can include, without limitation, an operating system, software, and software of visual situational awareness system (VSAS) 800. As shown in FIG. 24B, each computing device 2400 can also include additional optional elements, e.g. a memory port 2403, a bridge 2470, one or more input/output devices 2430*a*-2430*n* (generally referred to using reference numeral 2430), and a cache memory 2440 in communication with the central processing unit 2421.

The central processing unit 2421 is any logic circuitry that responds to and processes instructions fetched from the main memory unit 2422. In many embodiments, the central processing unit 2421 is provided by a microprocessor unit, e.g.: those manufactured by Intel Corporation of Mountain View, California; those manufactured by Motorola Corporation of Schaumburg, Illinois; the ARM processor (from, e.g., ARM Holdings and manufactured by ST, TI, ATMEL, etc.) and TEGRA system on a chip (SoC) manufactured by Nvidia of Santa Clara, California; stand-alone ARM processors; the POWER7 processor, those manufactured by International Business Machines of White Plains, New York; or those manufactured by Advanced Micro Devices of Sunnyvale, California; or field programmable gate arrays ("FPGAs") from Altera in San Jose, CA, Intel Corporation, Xlinix in San Jose, CA, or MicroSemi in Aliso Viejo, CA, etc. The computing device 2400 can be based on any of these processors, or any other processor capable of operating as described herein. The central processing unit 2421 can utilize instruction level parallelism, thread level parallelism, different levels of cache, and multi-core processors. A multi-core processor can include two or more processing units on a single computing component. Examples of multi-core processors include the AMD PHENOM IIX2, INTEL CORE i5 and INTEL CORE i7.

Main memory unit 2422 can include one or more memory chips capable of storing data and allowing any storage location to be directly accessed by the microprocessor 2421. Main memory unit 2422 can be volatile and faster than storage 2428 memory. Main memory units 2422 can be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 2422 or the storage 2428 can be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 2422 can be based on any of the above described memory chips, or any other available memory chips capable of operating as described herein. In the embodiment shown in FIG. 24A, the processor 2421 communicates with main memory 2422 via a system bus 2450 (described in more detail below). FIG. 24B depicts an embodiment of a computing device 2400 in which the processor communicates directly with main memory 2422 via a memory port 2403. For example, in FIG. 24B the main memory 2422 can be DRDRAM.

FIG. 24B depicts an embodiment in which the main processor 2421 communicates directly with cache memory 2440 via a secondary bus, sometimes referred to as a backside bus. In other embodiments, the main processor 2421 communicates with cache memory 2440 using the system bus 2450. Cache memory 2440 typically has a faster response time than main memory 2422 and is typically provided by SRAM, BSRAM, or EDRAM. In the embodiment shown in FIG. 24B, the processor 2421 communicates with various I/O devices 2430 via a local system bus 2450. Various buses can be used to connect the central processing unit 2421 to any of the I/O devices 2430, including a PCI bus, a PCI-X bus, or a PCI-Express bus, or a NuBus. For embodiments in which the I/O device is a video display 2424, the processor 2421 can use an Advanced Graphics Port (AGP) to communicate with the display 2424 or the I/O controller 2423 for the display 2424. FIG. 24B depicts an embodiment of a computer 2400 in which the main processor 2421 communicates directly with I/O device 2430b or other processors 2421' via HYPERTRANSPORT, RAPIDIO, or INFINIBAND communications technology. FIG. 24B also depicts an embodiment in which local busses and direct communication are mixed: the processor 2421 communicates with I/O device 2430a using a local interconnect bus while communicating with I/O device 2430b directly.

A wide variety of I/O devices 2430a-2430n can be present in the computing device 2400. Input devices can include keyboards, mice, trackpads, trackballs, touchpads, touch mice, multi-touch touchpads and touch mice, microphones (analog or MEMS), multi-array microphones, drawing tablets, cameras, single-lens reflex camera (SLR), digital SLR (DSLR), CMOS sensors, CCDs, accelerometers, inertial measurement units, infrared optical sensors, pressure sensors, magnetometer sensors, angular rate sensors, depth sensors, proximity sensors, ambient light sensors, gyroscopic sensors, or other sensors. Output devices can include video displays, graphical displays, speakers, headphones, inkjet printers, laser printers, and 3D printers.

Devices 2430a-2430n can include a combination of multiple input or output devices, including, e.g., Microsoft KINECT, Nintendo Wiimote for the WII, Nintendo WII U GAMEPAD, or Apple IPHONE. Some devices 2430a-2430n allow gesture recognition inputs through combining some of the inputs and outputs. Some devices 2430a-2430n provides for facial recognition which can be utilized as an input for different purposes including authentication and other commands. Some devices 2430a-2430n provides for voice recognition and inputs, including, e.g., Microsoft KINECT, SIRI for IPHONE by Apple, Google Now or Google Voice Search.

Additional devices 2430a-2430n have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 2430a-2430n, display devices 2424a-2424n or group of devices can be augmented reality devices. The I/O devices can be controlled by an I/O controller 2421 as shown in FIG. 24A. The I/O controller 2421 can control one or more I/O devices, such as, e.g., a keyboard 126 and a pointing device 2427, e.g., a mouse or optical pen. Furthermore, an I/O device can also provide storage and/or an installation medium 116 for the computing device 2400. In still other embodiments, the computing device 2400 can provide USB connections (not shown) to receive handheld USB storage devices. In further embodiments, an I/O device 2430 can be a bridge between the system bus 2450 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 2424a-2424n can be connected to I/O controller 2421. Display devices can include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays can use, e.g. stereoscopy, polarization filters, active shutters, or autostereoscopy. Display devices 2424a-2424n can also be a head-mounted display (TIMD). In some embodiments, display devices 2424a-2424n or the corresponding I/O controllers 2423 can be controlled through or have hardware support for OPENGL or DIRECTX API or other graphics libraries.

In some embodiments, the computing device 2400 can include or connect to multiple display devices 2424a-2424n, which each can be of the same or different type and/or form. As such, any of the I/O devices 2430a-2430n and/or the I/O controller 2423 can include any type and/or form of suitable hardware, software, or combination of hardware and software to support, enable or provide for the connection and use of multiple display devices 2424a-2424n by the computing device 2400. For example, the computing device 2400 can include any type and/or form of video adapter, video card, driver, and/or library to interface, communicate, connect or otherwise use the display devices 2424a-2424n. In one embodiment, a video adapter can include multiple connectors to interface to multiple display devices 2424a-2424n. In other embodiments, the computing device 2400 can include multiple video adapters, with each video adapter connected to one or more of the display devices 2424a-2424n. In some embodiments, any portion of the operating system of the computing device 2400 can be configured for using multiple displays 2424a-2424n. In other embodiments, one or more of the display devices 2424a-2424n can be provided by one or more other computing devices 2400a or 2400b connected to the computing device 2400, via the network 140. In some embodiments software can be designed and constructed to use another computer's display device as a second display device 2424a for the computing device 2400. For example, in one embodiment, an Apple iPad can connect to a computing device 2400 and use the display of the device 2400 as an additional display screen that can be used as an extended desktop. One ordinarily skilled in the art will recognize and appreciate the various ways and embodiments that a computing device 2400 can be configured to have multiple display devices 2424a-2424n.

Referring again to FIG. 24A, the computing device 2400 can comprise a storage device 2428 (e.g. one or more hard disk drives or redundant arrays of independent disks) for storing an operating system or other related software, and for storing application software programs such as any program related to the software for the VSAS 800. Examples of storage device 2428 include, e.g., hard disk drive (HDD); optical drive including CD drive, DVD drive, or BLU-RAY drive; solid-state drive (SSD); USB flash drive; or any other device suitable for storing data. Some storage devices can include multiple volatile and non-volatile memories, including, e.g., solid state hybrid drives that combine hard disks with solid state cache. Some storage device 2428 can be non-volatile, mutable, or read-only. Some storage device 2428 can be internal and connect to the computing device 2400 via a bus 2450. Some storage device 2428 can be external and connect to the computing device 2400 via a I/O device 2430 that provides an external bus. Some storage device 2428 can connect to the computing device 2400 via the network interface 2418 over a network, including, e.g., the Remote Disk for MACBOOK AIR by APPLE. Some client devices 2400 may not require a non-volatile storage device 2428 and can be thin clients or zero clients 202. Some storage device 2428 can also be used as an installation device 2416, and can be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 2400 can also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc.

Furthermore, the computing device 2400 can include a network interface 2418 to interface to the network 140 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 2400 communicates with other computing devices 2400' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 can comprise a built-in network adapter, network interface card, PCMCIA network card, EXPRESS-CARD network card, card bus network adapter, wireless network adapter, USB network adapter, modem or any other device suitable for interfacing the computing device 2400 to any type of network capable of communication and performing the operations described herein.

A computing device 2400 of the sort depicted in FIG. 24A can operate under the control of an operating system, which controls scheduling of tasks and access to system resources. The computing device 2400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 24000, WINDOWS Server 2012, WINDOWS CE, WINDOWS Phone, WINDOWS XP, WINDOWS VISTA, and WINDOWS 24, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, can be used on zero clients or thin clients, including, e.g., CHROMEBOOKS.

The computer system 2400 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 2400 has sufficient processor power and memory capacity to perform the operations described herein. In some embodiments, the computing device 2400 can have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 2400 is a gaming system. For example, the computer system 2400 can comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, or an XBOX 360 device manufactured by the Microsoft Corporation of Redmond, Washington, or an OCULUS RIFT or OCULUS VR device manufactured by OCULUS VR, LLC of Menlo Park, California.

In some embodiments, the computing device 2400 is a digital audio player such as the Apple IPOD, IPOD Touch, and IPOD NANO lines of devices, manufactured by Apple Computer of Cupertino, California. Some digital audio players can have other functionality, including, e.g., a gaming system or any functionality made available by an application from a digital application distribution platform. For example, the IPOD Touch can access the Apple App Store. In some embodiments, the computing device 2400 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 2400 is a tablet e.g. the IPAD line of devices by Apple; GALAXY TAB family of devices by Samsung; or KINDLE FIRE, by Amazon.com, Inc. of Seattle, Washington. In other embodiments, the computing device 2400 is an eBook reader, e.g. the KINDLE family of devices by Amazon.com, or NOOK family of devices by Barnes & Noble, Inc. of New York City, New York.

In some embodiments, the communications device 2400 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 2400 is a laptop or desktop computer equipped with a web browser and a microphone and speaker system, e.g. a telephony headset. In these embodiments, the communications devices 2400 are web-enabled and can receive and initiate phone calls. In some embodiments, a laptop or desktop computer is also equipped with a webcam or other video capture device that enables video chat and video call.

In some embodiments, the status of one or more machines 2400 in the network are monitored, generally as part of network management. In one of these embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Variations to the above embodiments are also contemplated. For example, although the use case of the guidance device in UAVs is quite natural, this system and device are not limited solely to this use. Since the system only requires a connection to the primary vehicle controller to receive velocity updates and to be able to issue vehicle commands, the system can be implemented and used for obstacle detection and collision avoidance on, for example, rockets, missiles, manned aircraft and other autonomous aircraft. The system can also be employed for use on autonomous naval vessels for sailing or navigation around debris or other waterborne vehicles. The system could also be used in conjunction with other detection systems onboard autonomous road vehicles on urban highways, streets or in more rural environments.

Other variations on the arrangement of the device 100 are also contemplated. For example, the camera 104 can be fitted either outside or inside the case 106, or fitted directly within a side of the case 106. Furthermore, the camera 104 need not be limited to optical cameras, but can include infrared or ultraviolet cameras.

In another variation of the present disclosure, the system provided herein need not result in a communication of a direct command to a control system. It is contemplated that the system provided herein could be used to communicate a suggestion, warning, or other communication to a pilot, driver, or user of a vehicle without necessarily causing the vehicle to carry out a command, such as a collision avoidance maneuver.

The scope of the claims should not be limited by the embodiments set forth in the above examples, but should be given the broadest interpretation consistent with the description as a whole.

While this specification contains many specific implementation details, these should not be construed as limitations on the scope of any disclosures or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method for dynamic object tracking, comprising:
identifying, by one or more processors, a first image of a sequence of images, the first image including a first plurality of pixels, the sequence of images detected by an image capture device of the moveable entity at a plurality of times as the moveable entity operates, each image of the sequence of images associated with a respective velocity or acceleration of the moveable entity;
identifying, by the one or more processors, at least one point of interest mapped to at least one respective pixel of the first plurality of pixels;
determining, by the one or more processors, at least one parameter value of the at least one respective pixel;
tracking, by the one or more processors, across remaining images of the sequence of images based on the at least one parameter value, movement of the at least one point of interest, the remaining images detected by the image capture device at a subset of the plurality of times subsequent to detection of the first image;
determining, by the one or more processors, that the at least one point of interest represents at least a portion of a dynamic object based on the movement of the at least one point of interest and the respective velocity or acceleration of the moveable entity associated with at least one of the sequence of images; and
identifying, by the one or more processors, from at least one image of the sequence of images, a plurality of representative pixels that represent the dynamic object.

2. The method of claim 1, further comprising:
identifying, by the one or more processors, at least one second point of interest in the remaining images; and
tracking, by the one or more processors, across the remaining images, movement of the at least one second point of interest to identify additional dynamic objects in the sequence of images.

3. The method of claim 1, further comprising:
receiving, by the one or more processors, the respective velocity or acceleration data of the movable entity from at least one sensor of the moveable entity.

4. The method of claim 1, further comprising associating, by the one or more processors, the velocity or acceleration of the moveable entity to each image of the sequence of images as each image is captured.

5. The method of claim 3, further comprising determining, by the one or more processors, the movement of the at least one point of interest based on the velocity or acceleration data.

6. The method of claim 1, further comprising determining, by the one or more processors, the movement of the at least one point of interest by comparing a pixel location of the at least one respective pixel in the first image with a pixel location associated with the at least one point of interest in a second image of the remaining images.

7. The method of claim 1, further comprising determining, by the one or more processors, that the at least one point of interest represents a static object responsive to the movement of the at least one point of interest being less than a threshold.

8. The method of claim 1, wherein the image capture device is a first image capture device, the method further comprising determining, by the one or more processors, the sequence of images using a plurality of first images from the first image capture device and a plurality of second images from a second image capture device.

9. The method of claim 1, further comprising outputting, by the one or more processors, an instruction to cause a movable entity coupled with the image capture device to avoid a collision with the dynamic object.

10. The method of claim 1, further comprising tracking, by the one or more processors, the dynamic object using an expected movement profile of the dynamic object.

11. A system, comprising:
one or more processors configured to:
identify a first image of a sequence of images, the first image including a first plurality of pixels, the sequence of images detected by-an image capture device of the moveable entity at a plurality of times as the moveable entity operates, each image of the sequence of images associated with a respective velocity or acceleration of the moveable entity;
identify at least one point of interest mapped to at least one respective pixel of the first plurality of pixels;
determine at least one parameter value of the at least one respective pixel;
track, across remaining images of the sequence of images based on the at least one parameter value, movement of the at least one point of interest, the remaining images detected by the image capture device at a subset of the plurality of times subsequent to detection of the first image; and
determine that the at least one point of interest represents at least a portion of a dynamic object based on the movement of the at least one point of interest and the respective velocity or acceleration of the moveable entity associated with at least one of the sequence of images.

12. The system of claim 11, wherein the one or more processors are configured to:
identify at least one second point of interest in the remaining images; and
track, across the remaining images, movement of the at least one second point of interest to identify additional dynamic objects in the sequence of images.

13. The system of claim 11, wherein the one or more processors are configured to receive the respective velocity or acceleration data of the movable entity from at least one sensor of the moveable entity.

14. The system of claim 11, wherein the one or more processors are configured to associate the respective velocity or acceleration of the moveable entity to each image of the sequence of images as each image is captured.

15. The system of claim 13, wherein the one or more processors are configured to determine the movement of the at least one point of interest based on the velocity or acceleration data.

16. The system of claim 11, wherein the one or more processors are configured to determine the movement of the at least one point of interest by comparing a pixel location of the at least one respective pixel in the first image with a pixel location associated with the at least one point of interest in a second image of the remaining images.

17. The system of claim 11, wherein the one or more processors are configured to determine that the at least one point of interest represents a static object responsive to the movement of the at least one point of interest being less than a threshold.

18. The system of claim 11, further comprising a plurality of image capture devices, and wherein the one or more processors are configured to determine the sequence of images by at least one of stitching or merging respective images from each image capture device of the plurality of image capture devices.

19. The system of claim 11, wherein the one or more processors are configured to output an instruction to cause a movable entity coupled with the image capture device to avoid a collision with the dynamic object.

20. The system of claim 11, wherein the one or more processors are configured to track the dynamic object using an expected movement profile of the dynamic object.

* * * * *